(12) United States Patent
Ohashi et al.

(10) Patent No.: US 7,969,283 B2
(45) Date of Patent: Jun. 28, 2011

(54) RFID TAG INFORMATION COMMUNICATING DEVICE

(75) Inventors: Tsuyoshi Ohashi, Hashima (JP); Kentaro Ushiyama, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1434 days.

(21) Appl. No.: 11/420,435

(22) Filed: May 25, 2006

(65) Prior Publication Data
US 2006/0202800 A1 Sep. 14, 2006

Related U.S. Application Data

(63) Continuation-in-part of application No. PCT/JP2004/017381, filed on Nov. 24, 2004.

(30) Foreign Application Priority Data

Nov. 25, 2003 (JP) .................................. 2003-394298
Mar. 22, 2004 (JP) .................................. 2004-082634

(51) Int. Cl.
*H04Q 5/22* (2006.01)
(52) U.S. Cl. ...................... 340/10.3; 340/10.4; 340/10.5
(58) Field of Classification Search .................. 340/10.2, 340/10.4, 10.5, 539.23, 539.16, 5.61; 235/435, 235/375
See application file for complete search history.

(56) References Cited

U.S. PATENT DOCUMENTS

| | | | | |
|---|---|---|---|---|
| 5,294,931 A | * | 3/1994 | Meier | 342/44 |
| 6,246,326 B1 | * | 6/2001 | Wiklof et al. | 340/572.1 |
| 6,600,418 B2 | * | 7/2003 | Francis et al. | 340/572.1 |
| 6,970,518 B2 | * | 11/2005 | Kuffner et al. | 375/259 |

FOREIGN PATENT DOCUMENTS

| | | |
|---|---|---|
| EP | 0944015 | 9/1999 |
| JP | H01-259662 A | 10/1989 |
| JP | H06-326691 A | 11/1994 |
| JP | H07-250377 A | 9/1995 |
| JP | H08-242192 A | 9/1996 |

(Continued)

OTHER PUBLICATIONS

International Bureau of WIPO, International Search Report, Related Patent Application No. PCT/JP2004/017381 mailed Jan. 25, 2005.

(Continued)

*Primary Examiner* — Vernal U Brown
(74) *Attorney, Agent, or Firm* — Baker Botts L.L.P.

(57) ABSTRACT

The RFID tag information communicating device is provided with a cartridge constructed in such a manner that a plurality of RFID circuit elements are stored and can be sequentially taken out therefrom, and an antenna for performing transmitting/receiving operations in a radio communicating operation between the own antenna and an antenna of a sequentially derived RFID circuit element, first access information for accessing RFID tag information of an IC circuit part is produced by a signal processing circuit; and the produced first access information is transmitted by a transmitting portion so as to access the RFID tag information of the IC circuit part. After the access operation is carried out, a control circuit judges as to whether or not the access operation can succeed, and controls a magnitude of transmission power from the transmitting portion in response to this judgment result.

26 Claims, 26 Drawing Sheets

FOREIGN PATENT DOCUMENTS

| | | |
|---|---|---|
| JP | H09-148971 A | 6/1997 |
| JP | H11 344562 | 12/1999 |
| JP | H11-353434 A | 12/1999 |
| JP | 2002-008067 A | 1/2002 |
| JP | 2002-368629 A | 12/2002 |
| JP | 2003-108941 A | 4/2003 |
| JP | 2003 140548 | 5/2003 |

OTHER PUBLICATIONS

Japan Patent Office, Notice of Reasons for Rejection for counterpart Patent Application No. JP 2004-082634, mailed Aug. 24, 2009.

Japan Patent Office; Notice of Reasons for Rejection in Japanese Patent Application No. 2003-394298 (counterpart to the above-captioned U.S. patent application) mailed Dec. 1, 2009 (partial translation).

* cited by examiner

RFID TAG INFORMATION COMMUNICATING DEVICE

CROSS-REFERENCE TO RELATED APPLICATION

This is a CIP application PCT/JP2004/017381, filed Nov. 24, 2004, which was not published under PCT article 21(2) in English and claims the benefits of Japanese Patent application No. 2003-394298 filed Nov. 25, 2003 and Japanese Patent application No. 2004-082634 filed Mar. 22, 2004.

BACKGROUND OF THE INVENTION

1. Field of the Invention

The present invention is related to an RFID tag information communicating device which externally reads, or writes information with respect to RFID circuit elements provided on RFID tags capable of radio-communicating information from an external unit.

2. Description of the Related Art

RFID (Radio Frequency Identification) systems for reading/writing information between compact RFID tags and reader (reading device)/writer (writing device) are known in the field. For instance, an RFID circuit element provided in a label-shaped RFID tag is equipped with an IC circuit part for storing predetermined RFID tag information, and an antenna which is connected to this IC circuit part so as to transmit/receive information. Even in such a case that an RFID tag is soiled, or an RFID tag is arranged at a position which cannot be observed, the reader/writer can access (readable/writable information) with respect to RFID tag information of the IC circuit part, and practical uses of RFID systems can be expected in various fields, for instance, commercial goods management and investigation stages.

Conventionally, in such a case that RFID tag information communicating devices access RFID tag information of IC circuit parts of RFID circuit elements in the above-explained manner, while utilizing such a characteristic that the closer an RFID circuit element is located near a device antenna, the lower the power capable of accessing the RFID circuit element is decreased, there are such RFID tag information communicating devices operated in such a manner that a signal having a certain power value is transmitted so as to recognize a tag group which responds to this transmitted signal; thereafter this tag group is brought into an idle state, another signal having a slightly larger power value is transmitted so as to recognize that another tag group responding to this transmitted signal as a tag group located far from the above-described tag group under idle state; and since the above-described operation is repeated, distributed positions of all of the RFID tags are subdivided into a plurality of regions and these RFID tags are recognized (refer to, for example, patent publication 1).

On the other hand, conventionally, in the case that predetermined information is written in the IC circuit parts of the RFID circuit elements in the above-explained manner, the below-mentioned RFID tag information communicating devices have already been proposed (refer to, for example, patent publication 2) which determines feeding speeds of RFID circuit elements along a direction of device antenna in response to printing conditions (dimensions of labels) with respect to labels adhered to the RFID circuit elements, and also, communication conditions (dimensions of tag antennas, sorts of IC circuit parts) with respect to the RFID circuit elements, while considering the following possibilities. That is, the closer an RFID circuit element is located near a device antenna, the lower the power capable of writing the information is decreased. Also, if power becomes excessively high with respect to arranging intervals of the RFID circuit elements, then the information may also be written into RFID circuit elements which are located adjacent to an RFID circuit element to be written.

Patent Publication 1: JP,A,11-344562 (paragraph numbers 0019 to 0032)

Patent Publication 2: JP,A,2003-140548 (paragraph numbers 0008 to 0022)

However, the above-explained conventional techniques own the below-mentioned problems.

In the conventional technique described in the patent publication 1, in order to recognize the distances of the respective RFID circuit elements from the device antenna, the variable control operation for controlling the transmission power from the device antenna is the major subject, and thus, such a transmission power value is determined which becomes the minimum necessary power value as long as the writing operation, or the reading operation can be carried out with respect to the respective RFID circuit elements which should be accessed. Since the access operation is carried out based upon the determined power value, this conventional technique never paid a specific attention to such a fact that leakage electric power to an external unit except for mutual spaces between the device antenna and the antenna of the relevant RFID circuit element must be suppressed as much as possible.

On the other hand, in the conventional technique described in the patent publication 2, since the feeding speed is controlled in response to the printing conditions and the communication conditions, the information is continuously written into a plurality of RFID circuit elements while the carrying operations of the RFID circuit elements are not stopped, so that it is possible to avoid lowering of the throughput. However, while the writing operations are carried out with respect to the plural RFID circuit elements in the above-explained manner, the transmission power is continuously generated from the device antenna over time durations also containing such a time period that the communications with respect to the RFID circuit elements cannot always be established. As a consequence, useless transmission power of the electromagnetic waves occurs, resulting in a lower efficiency.

SUMMARY OF THE INVENTION

As previously explained, in the conventional techniques, it is practically difficult that the radio communicating operations can be carried out in a higher efficiency while the transmission power is reduced as lower as possible.

A first object of the present invention is to provide an RFID tag information communicating device capable of performing a radio communicating operation in a higher efficiency with lower transmission power.

A second object of the present invention is to provide an RFID tag information communicating device capable of performing a radio communicating operation in a higher efficiency by executing an access operation with lower transmission power under which either a reading operation or a writing operation can be carried out with respect to an RFID circuit element which should be accessed.

A third object of the present invention is to provide an RFID tag information communicating device capable of performing a radio communicating operation in a higher efficiency by that a continuous information writing process operation with respect to a plurality of RFID circuit elements is carried out with minimum transmission power.

Means for Solving the Problem

To achieve the above-explained objects, an RFID tag information communicating device, according to first invention, is featured by comprising: a device antenna for performing a transmitting/receiving operation in a radio communicating operation between a tag antenna (of a specific RFID circuit element and the own antenna among a plurality of RFID circuit elements each having an IC (integrated circuit) circuit part for storing a predetermined information and the tag antenna connected to the IC circuit part and for transmitting/receiving information; first information transmitting means for transmitting first access information which accesses RFID tag information of the IC circuit part via the device antenna to the tag antenna in a non-contact manner so as to access the RFID tag information of the IC circuit part; and first power control means for setting a magnitude of transmission power from the first information transmitting means in response to the access operation.

The first predetermined access information is transmitted from the first information transmitting means via the device antenna to the tag antenna in the non-contact manner so as to access (either read or write) the RFID tag information of the IC circuit part of the RFID circuit element to be accessed. In the first invention of the present invention, the first power control means sets the magnitude of transmission power from the first information transmitting means in response to the access operation. As a result, the access operation can be carried out with respect to the RFID circuit element to be accessed by the minimum necessary transmission power, so that the radio frequency communicating operation can be carried out in a higher efficiency.

Second invention is featured by that in the above-described first invention, the RFID tag information communicating device is further comprised of: access information producing means for producing the first access information; and first judging means for judging as to whether or not an access operation to the IC circuit part can succeed after the access operation has been executed; and in which the first information transmitting means the transmits the first access information produced by the access information producing means via the device antenna to the tag antenna in the non-contact manner so as to access the RFID tag information of the IC circuit part; and the first power control means controls the magnitude of the transmission power from the first information transmitting means in response to the access success/failure judging result obtained in the first judging means.

From the first information transmitting means, the first access information produced by the access information producing means is transmitted via the device antenna to the tag antenna in the non-contact manner so as to access (either read or write) the RFID tag information of the IC circuit part.

In the second invention of the present application, after the access operation has been carried out, the first judging means judges as to whether or not the access (either read or write) operation can succeed. Also, since the transmission power during the access operation is necessarily minimized, the first power control means controls the magnitude of the transmission power from the first information transmitting means in response to the judgment result of the first judging means. As a consequence, the access operation can be carried out by the minimum required transmission power as low as possible under which the reading or writing operation can be carried out with respect to the RFID circuit element which should be accessed, so that the radio communication operation can be carried out in a higher efficiency. As a result, the leakage power to the external region except for the mutual space between the device antenna and the antenna of the RFID circuit element can be suppressed as much as possible, and also, the power consumption can be suppressed.

Third invention is featured by that in the second invention, the first power control means increases the magnitude of the transmission power from the first information transmitting means in a stepwise manner in response to the access success/failure judging result obtained in the first judging means in such a case that the first judging means judges a failure of the access operation until the first judging means judges a success of the access operation.

The first access information is transmitted by the relatively low transmission power under which there is such a risk that the access operation may fail, and thereafter, the transmission power is gradually increased in the stepwise manner until it is so judged that the access operation can succeed. As a result, the access operation can be firmly carried out by the minimum required transmission power.

Fourth invention is featured by that in the second invention, the RFID tag information communicating device is further comprised of: first information receiving means operated in such a manner that after the first access information has been transmitted by the first information transmitting means, a first reply signal transmitted from the IC circuit part in response to transmitted first access information is received via tag antenna by device antenna in the non-contact manner and the received first response signal is read; and in which the first judging means judges a total number of accessible RFID circuit elements located in a communication range by checking as to whether or not the first reply signal read by the first information receiving means is present; and the first power control means controls the magnitude of the transmission power from the first information transmitting means in response to the judgment result.

In the fourth invention of the present application, the first reply signal transmitted from the IC circuit part in response to the first access information transmitted from the first information transmitting means is received via the tag antenna by the device antenna in the non-contact manner and the received first response signal is read; in the first information receiving means. Thereafter, the firs judging means judges a total number of accessible RFID circuit elements located in the communication range by checking as to whether or not the first reply signal read by the first information receiving means is present. At this time, while using such a characteristic that the closer the RFID circuit element is located near the device antenna, the lower the transmission power is decreased, the first output control means controls the magnitude of the transmission power from the first information transmitting means in response to the judging result by the first judging means. As a result, the access (reading) operation can be carried out by the minimum required transmission power as low as possible, by which only such one RFID circuit element which is located at the nearest position with respect to the device antenna can be accessed (read).

Fifth invention is featured by that in the fourth invention, the first power control means increases the transmission power from the first information transmitting means in the stepwise manner in response to the judgment result of the first judging means in the case that the first judging means judges that a total number of accessible RFID circuit elements is equal to 0 piece until the first judging means judges that the total number of the accessible RFID circuit element is equal to at least 1 piece.

The tag confirmation transmitting operation is performed by such a relatively low transmission power that an accessible (readable) tag circuit element becomes 0 piece. Thereafter, the transmission power is gradually increased until the first judging means judges that the total number of the accessible RFID circuit element is equal to at least 1 piece. As a result, the reading operation can be firmly performed by the minimum required transmission power.

Sixth invention is featured by that in the fifth invention, the first power control means decreases the transmission power from the first information transmitting means in the stepwise manner in the case that the first judging means judges that a total number of accessible RFID circuit elements is larger than, or equal to 2 pieces until the first judging means judges that the total number of the accessible RFID circuit element is equal to 1 piece.

After the tag confirmation transmitting operation is performed by such a relatively low transmission power that an accessible (readable) tag circuit element becomes 0 piece, in the case that the transmission power is gradually increased in the stepwise manner, there are some possibilities that the total number of the recognized tag circuit elements is suddenly changed from 0 piece to 2, or more pieces. In correspondence with this possibility, in the sixth invention, conversely, in such a case, the first power control means decreases the transmission power from the first information transmitting means in the stepwise manner in the case that the first judging means until the first judging means judges that the total number of the recognized RFID circuit element is equal to 1 piece. As a consequent, since the transmission power is gradually decreased in the stepwise manner until the first judging means judges that the total number of the recognized tag circuit elements is change from 2 pieces to 1 piece, the tag can be firmly read, or can be surely specified by the minimum required transmission power.

Seventh invention is featured by that in the fifth invention, the first power control means stores/learns a magnitude of transmission power of the first information transmitting means in the case that the first judging means judges that a total number of accessible RFID circuit elements is equal to 1 piece, and further increases the transmission power from the first information transmitting means from a value corresponding to the stored/learned transmission power value with respect to an RFID circuit element which is newly derived from the RFID circuit element storage means after the RFID circuit element being judged as the accessible element.

In the seventh invention of the present application, after the first judging means judges that a total number of accessible RFID circuit elements is equal to 0 piece, and determines the minimum transmission power, the transmission power of the first access information at this time is stored/learned, which is utilized. In other words, when a reading operation is carried out from such an RFID circuit element which is subsequently derived from the RFID circuit element storage means and should be read, the first power control means stepwisely increases the transmission power of the first access information from the value corresponding to the stored/learned power value. As previously explained, the stored/learned result obtained when the tag information is presently read is reflected to the subsequent tag information reading operation. As a result, the minimum transmission power can be easily determined within a short time, as compared with such a case that, for instance, the transmission power of the first access information is stepwisely increased in the independent manner.

Eighth invention is featured by that in the seventh invention, the first power control means increases the transmission power from the first information transmitting means in the stepwise manner from the stored/learned transmission power value with respect to the newly derived RFID circuit element.

When the transmission power of the first access information is increased in the stepwise manner, this transmission power is increased from the value equal to the transmission power of the first access information which has been stored/learned in the preceding operation, so that the minimum transmission power by which the RFID circuit element can be easily accessed in the relatively short time can be determined, or the RDID tag circuit element can be specified.

Ninth invention is featured by that in the seventh invention, the first power control means increases the transmission power from the first information transmitting means in the stepwise manner from a value smaller than the stored/learned transmission power value by a predetermined value with respect to the newly derived RFID circuit element.

When the transmission power of the first access information is stepwisely increased, this transmission power is increased from the value which is slightly smaller than the transmission power of the first access information which could be succeeded to be specified in the preceding operation and has been stored/learned. As a result, the minimum transmission power value can be determined by which the RFID circuit element can be accessed within the relatively short time without any leakage, or the RFID circuit element can be firmly specified.

Tenth invention is featured by that in the seventh invention, in the case that the RFID circuit element storage means is replaced, the first power control means to initializes the stored/learned transmission power value.

When the RFID circuit element storage means is replaced, the sort (antenna, use frequency, communication protocol etc.) of RFID circuit element is changed, and thus, there are some possibilities that validity as to the stored/learned transmission power value is deteriorated. In such a case, the transmission power is started to be increased which is larger than the proper transmission power value capable of originally specifying and accessing one RFID circuit element. As a result, there is some possibility that the increased transmission power cannot be reached to the proper power value, and the error occurs. To avoid this problem, in the tenth invention, when the RFID circuit element storage means is replaced, since the stored/learned value is entirely initialized, the above-described problem can be firmly prevented.

11-th invention is featured by that in the second invention, the RFID tag information communicating device is further comprised of: first information receiving means operated in such a manner that after the first access information has been transmitted by the first information transmitting means, a first reply signal transmitted from the IC circuit part in response to the transmitted first access information is received via the tag antenna by the device antenna in the non-contact manner and the received first response signal is read; and access confirmation instruction transmitting means for transmitting a confirmation instruction signal for confirming as to whether or not an access operation can access via the device antenna to the tag antenna in a non-contact manner after the first access information has been transmitted by the first information transmitting means; and in which the first information receiving means receives information read from the IC circuit part in response to the confirmation instruction signal via the tag antenna by the device antenna in the non-contact manner, and reads the received information; and the first judging means inputs both the information which is produced by the access information producing means and transmitted by the first information transmitting means, and the information which is read from the IC circuit part and read by the first information receiving means, and judges as to whether or not the access operation can succeed by checking as to whether or not the transmitted information is coincident with the read information.

In the case that the RFID tag information of the IC circuit part is written, the access confirmation instruction transmitting means transmits the confirmation instruction signal to the tag antenna, and the first information receiving means receives the information read from the IC circuit part in response to the confirmation instruction signal by the device antenna, and reads the received information. Then, the first judging means judges as to whether or no the information which is produced by the access information producing means and transmitted by the first information transmitting means is coincident with the information which is read from the IC circuit part and read by the first information receiving means, and judges as to whether or not the access operation can succeed. As a result, when the writing operation is carried out, the first judging means can judge as to whether or not the writing operation can be accomplished under normal condition.

12-th invention is featured by that in the 11-th invention, the device is further comprised of instruction transmission power control means for controlling the transmission power from the access confirmation instruction transmitting means.

When the communicating operation is performed with respective to the RFID circuit element in the non-contact manner so as to write thereinto, there is such a case that the magnitude of the transmission power from the device side which is required to write the information is different from the magnitude of the transmission power from the device side which is required when the access (writing) confirmation instruction is thereafter transmitted. In connection thereto, in the 12th invention, the instruction transmission power control means for controlling the transmission power from the access confirmation instruction transmitting means is provided independent from the first power control means. As a result, when the access confirmation instruction is transmitted, the magnitude of the transmission power from the device side can be properly controlled.

13-th invention is featured by that in the 12-th invention, the instruction transmission power control means continuously makes the magnitude of the transmission power from the access confirm instruction transmitting means irrespective of the magnitude of the transmission power from the first information transmitting means.

As previously explained, the magnitude of the transmission power which is required to transmit the access confirmation instruction is different from the magnitude of the transmission power which is required to transmit the information, and there are many cases that the first-mentioned transmission power is usually lower than the last-mentioned transmission power. In response to this fact, in the 13-th invention, in order to write the information by the minimum required transmission power, the transmission power when the information is transmitted is controlled by the first power control means so as to seek this power value, whereas the transmission power when the access confirmation instruction is transmitted is set to the substantially constant value, or a predetermined value. As a consequence, the leakage power and the power consumption related to the transmission of the access confirmation instruction can be suppressed, and also, the process operation can be carried out in a high speed.

14-th invention is featured by that in the 12-th invention, the instruction transmission power control means makes the magnitude of the transmission power from the access confirmation instruction transmitting means substantially equal to the magnitude of the transmission power from the first information transmitting means.

In the case that the transmission power when the information is transmitted by the first power control means in order to seek the value with having such a purpose that the information is written by the minimum required transmission power, the transmitting operations are alternately repeated in such a manner: the first access information is transmitted→the access confirmation instruction transmitted→the first access information is transmitted→the access confirmation instruction is transmitted→the first access information is transmitted→the access confirmation instruction is transmitted—are repeated. Also, the first power control means controls the power when the respective information is transmitted. In the 14-th invention, since the instruction transmission power control means makes the magnitude of the transmission power from the access confirmation instruction transmitting means substantially equal to the magnitude of the transmission power from the first information transmitting means, the control operation can be simplified, as compared with such a case that the control operation is performed with the separate values.

15-th invention is featured by that in the 11-th invention, the device is further comprised of: second information transmitting means for transmitting second access information via the device antenna to the tag antenna in the non-contact manner, the second access information confirming as to whether or not an accessible RFID circuit element is present in a communication range; second information receiving means for receiving a second reply signal transmitted from the IC circuit part in response to the second access information via the tag antenna by the device antenna in a non-contact manner, and for reading the received second reply signal; second judging means for judging a total number of accessible RFID circuit elements located in the communication range by checking as to whether or not there is such a response signal read by the second information receiving means; and second power control means for controlling the magnitude of the transmission power from the second information transmitting means in response to the judgment result by the second judging means.

In the 15-th invention, in order to specify the RFID circuit element which should be accessed (written), the second information transmitting means transmits the second access information via the device antenna to the tag antenna in the non-contact manner. The second information receiving means receives the second reply signal transmitted from the IC circuit part in response to the second access information via the tag antenna by the device antenna in a non-contact manner, and reads the received second reply signal. Thereafter, the second judging means judges a total number of accessible (writable) RFID circuit elements located in the communication range by checking as to whether or not there is such a response signal read by the second information receiving means. Then, the second power control means controls the magnitude of the transmission power from the second information transmitting means in response to the judgment result by the second judging means, while using such a fact that the closer the RFID circuit element is located near the device antenna, the lower the accessible transmission power becomes. As a result, the RFID circuit element to be accessed (written) can be easily specified which is located at the nearest position to the device antenna.

16-th invention is featured by that in the 15-th invention, the second power control means stepwisely increases the transmission power from the second information transmitting means in response to the judgment result made by the second judging means in the case that the second judging means judges that a total number of accessible RFID circuit elements is equal to 0 piece, until the second judging means judges that the total number of the accessible RFID circuit elements is equal to at least 1 piece.

After the tag confirmation instruction is transmitted by the relatively low transmission power by which a total number of the accessible (writable) tag circuit element becomes 0 piece, the transmission power is gradually increased in the stepwise manner until it is so judged the total number thereof is at least 1 piece. As a result, the tag can be specified by the minimum required transmission power.

17-th invention is featured by that in the 16-th invention, the second power control means stepwisely decreases the transmission power from the second information transmitting means in the case that the second judging means judges that a total number of accessible RFID circuit elements is larger than, or equal to 2 pieces, until the second judging means judges that the total number of the accessible RFID circuit elements is equal to 1 piece.

After the tag confirmation transmitting operation is performed by such a relatively low transmission power that an accessible (writable, or readable) tag circuit element becomes 0 piece, in the case that the transmission power is gradually increased in the stepwise manner, there are some possibilities that the total number of the recognized tag circuit elements is suddenly changed from 0 piece to 2, or more pieces. In correspondence with this possibility, in the 17-th invention, conversely, in such a case, the second power control means stepwisely decreases the transmission power from the second information transmitting means in the case that the second judging means judges that a total number of accessible RFID circuit elements is larger than, or equal to 2 pieces, until the second judging means judges that the total number of the accessible RFID circuit elements is equal to 1 piece. AS a result, the recording operation can be firmly carried out, or the tag can be surely specified by the minimum required transmission power.

18-th invention is featured by that in the 16-th invention, in the case that the second judging means judges that a total number of accessible RFID circuit elements is equal to 1 piece, the first information transmitting means specifies the tag antenna of the accessible RFID circuit element, and transmits the first access information.

As a result, the writing operation can be performed by the minimum required transmission power with respect to the tag which is specified as the accessible (writable) subject.

19-th invention is featured by that in the 16-th invention, the first power control means stepwisely increases transmission power from the first information transmitting means to the tag antenna of the specified one RFID circuit element from such a value which corresponds to the magnitude of the transmission power of the second access information when the second judging means previously specifies that the RFID circuit element is accessible.

Similar to the previously explained access confirmation instruction, the magnitude of the transmission power which is required to transmit the second access information is different from the magnitude of the transmission power which is required to transmit the information. Normally, there are many cases that the magnitude of the transmission power which is required to access (write) the information is larger than that which is required to transmit the second access information. As a consequence, in the 19-th invention, when the transmission power is stepwisely increased in order to write the information into the accessible (writable) RFID circuit element, the transmission power is increased from the value corresponding to the transmission power of the second access information when the specifying operation of this tag circuit element can succeed. As a result, the information can be easily written in the short time, for example, as compared with such a case that the transmission power is stepwisely increased from 0.

20-th invention is featured by that in the 19-th invention, the first power control means stepwisely increases transmission power from the first information transmitting means to the tag antenna of the specified one RFID circuit element from such a value which is equal to the magnitude of the transmission power of the second access information when the second judging means previously specifies that the RFID circuit element is accessible.

When the transmission power is stepwisely increased in order to write the information into the accessible (writable) RFID circuit element, the transmission power is increased from the value equal to the transmission power of the second access information when the specifying operation of this tag circuit element can succeed. As a result, the RFID circuit element can be easily specified within a relatively short time.

21-st invention is featured by that in the 19-th invention, the first power control means stepwisely increases transmission power from the first information transmitting means to the tag antenna of the specified one RFID circuit element from such a value which is larger than the magnitude of the transmission power of the second access information when the second judging means previously specifies that the RFID circuit element is accessible.

As previously explained, normally, the magnitude of the transmission power required to write the information is larger than the magnitude of the transmission power required to transmit the second access information. In the 21-st invention, when the transmission power is stepwisely increased in order to write the information into the accessible (writable) RFID circuit element, the transmission power is increased from the value larger than the transmission power of the second access information when the specifying operation of this tag circuit element can succeed. As a result, the RFID circuit element can be easily specified within a further short time.

22-nd invention is featured by that in the 16-th invention, the second power control means stores/learns a magnitude of transmission power of the second information transmitting means in the case that the second judging means judges that a total number of accessible RFID circuit elements is equal to 1 piece, and further, stepwisely increases the transmission power from the second information transmitting means from such a value which corresponds to the stored/learned transmission power value with respect to an RFID circuit element which is newly derived from the RFID circuit element storage means after the RFID circuit element being judged as the accessible circuit element.

In the 22-nd invention, the second judging means judges that the total number of the accessible RFID circuit element is 0 piece, and the RFID circuit element to be accessed (written) is specified. Thereafter, the transmission power of the second access information at this time is stored/learned and is utilized. In other words, when the RFID circuit element which is subsequently derived from the RFID circuit element storage means to be written is specified, the second power control means stepwisely increases the transmission power of the second access information from the value corresponding to this stored/learned power value. As previously explained, since the stored/learned result obtained when the tag is presently specified is reflected to that when the tag is subsequently specified, the RFID tag circuit can be easily specified in a short time, for instance, as compared with such a case that the transmission power of the second access information is stepwisely increased in the independent operations.

23-rd invention is featured by that in the 22-nd invention, the second power control means stepwisely increases the transmission power from the second information transmitting means from the stored/learned transmission power value with respect to the newly derived RFID circuit element.

When the transmission power of the second access information is stepwisely increased, the transmission power is increased from the value equal to the transmission power of the second access information which has been stored/learned in the preceding operation, the minimum transmission power can be readily determined, or the RFID circuit element can be readily specified within a relatively short time.

24-th invention is featured by that in the 22-nd invention, the second power control means stepwisely increases the transmission power from the second information transmitting means from such a value which is smaller than the stored/learned transmission power value by a predetermined value with respect to the newly derived RFID circuit element.

When the transmission power of the second access information is stepwisely increased, the transmission power is increased from the value slightly smaller than the transmission power of the second access information which has been stored/learned, and whose specifying operation could succeed in the previous operation. As a result, the minimum transmission power can be determined without any leakage, or the RFID circuit element can be firmly specified within a relatively short time.

25-th invention is featured by that in the 22-nd invention, the second power control means initializes the stored/learned transmission power value in the case that the RFID circuit element storage means is replaced.

When the RFID circuit element storage means is replaced, the sort (antenna, use frequency, communication protocol etc.) of RFID circuit element is changed, and thus, there are some possibilities that validity as to the stored/learned transmission power value is deteriorated. In such a case, the transmission power is started to be increased which is larger than the proper transmission power value capable of originally specifying and accessing one RFID circuit element. As a result, there is some possibility that the increased transmission power cannot be reached to the proper power value, and the error occurs. To avoid this problem, in the 25-th invention, when the RFID circuit element storage means is replaced, since the stored/learned value is entirely initialized, the above-described problem can be firmly prevented.

26-th invention is featured by that in the 18-th invention, in the case that the second judging means judges that a total number of accessible RFID circuit elements is larger than, or equal to 2 pieces, the first information transmitting means specifies the tag antenna of such an RFID circuit element that a signal strength of a reply signal received by the second information receiving means becomes maximum, and transmits thereto the first access information.

In such a case that a plurality of RFID circuit elements are located within the communicatable range with respect to the second access information transmitted by the second information transmitting means, as to communication strengths of reply signals returned from these circuit elements, the shorter the distance from the device antenna becomes, the larger the communication strength becomes. The 26-th invention utilizes this basic idea. That is, in the case that the second judging means judges that a total number of recognized RFID circuit elements is larger than, or equal to 2 pieces, the first information transmitting means specifies such an RFID circuit element that a signal strength of a reply signal becomes maximum, and transmits the predetermined information to the tag antenna thereof. AS a result, the information can be quickly and firmly written into the tag circuit element which should be originally accessed (written).

27-th invention is featured by that in the first invention, the first information transmitting means includes: position detecting signal transmitting means for transmitting a position detecting signal for detecting a position of the RFID circuit element as the first access information via the device antenna to the tag antenna in the non-contact manner; and writing information transmitting means for transmitting RFID tag information to be written into the IC circuit part as the first access information via the device antenna to the tag antenna in the non-contact manner; and the first power control means sets a magnitude of transmission power of the writing information transmitting means based upon a reply signal which is returned from the IC circuit part in response to the position detecting signal by the position detecting signal transmitting means.

In the 27-th invention, the position detecting signal transmitting means transmits the position detecting signal via the device antenna to the tag antenna of the RFID circuit element. When the RFID circuit element is fed to such a predetermined position that this position detecting signal can be reached, the reply signal is transmitted (returned) in response to this position detecting signal, and this reply signal is received via the device antenna. Since the position of this RFID circuit element can be detected at this receiving timing, the first power control means sets the magnitude of the transmission power from the writing information transmitting means based upon the received reply signal, and the writing information transmitting means transmits the RFID tag information to the RFID circuit element by this set power so as to perform the writing operation. As previously explained, the RFID tag information is transmitted so as to be written by the transmission power based upon the reply signal of the position detecting signal, with respect to a plurality of RFID circuit elements which are successively fed, the information writing process operation can be continuously carried out in an effective manner by the minimum required transmission power without employing the sensor, and the like.

28-th invention is featured by that in the 27-th invention, the device is further comprised of: reply signal receiving means for receiving the reply signal via the tag antenna by the device antenna in the non-contact manner; in which the writing information transmitting means transmits the RFID tag information to be written in the IC circuit part based upon the reply signal received by the reply signal receiving means via the device antenna to the tag antenna in the non-contact manner.

In the 28-th invention, the replay signal of the RFID circuit element which has been fed to the predetermined position where the position detecting signal can be reached is received via the device antenna by the reply signal receiving means. The writing information transmitting means transmits the RFID tag information to the RFID circuit element so as to be written therein based on this received reply signal. As a result, the information writing process operation can be continuously carried out in an effective manner by the minimum required transmission power.

29-th invention is featured by that in the 27-th invention, the device is further comprised of: feeding means capable of feeding the RFID circuit element in such a manner that the RFID circuit element is approached close to the device antenna.

The feeding means feeds the RFID circuit element to the predetermined position where the position detecting signal can be reached, and further, can feed the RFID circuit element to such a position which is located rear the device antenna and is suitable to write the information after the reply signal has been transmitted to the device antenna.

30-th invention is featured by that in the 29-th invention, the device is further comprised of: first control means for controlling a feeding sped of the RFID circuit element by the feeding means.

As a result, the speed of the feeding means for feeding that the RFID circuit element is approached to the device antenna can be controlled to become a proper magnitude.

31-st invention is featured by that in the 30-th invention, the first control means changes the feeding speed of the feeding means when the RFID circuit element fed by the feeding means is reached to a predetermined range in the vicinity of the device antenna.

As a result, the feeding speed can be adjusted in the optimum speed in correspondence with such a required time duration that the fed RFID circuit element is wanted to be located within a communicatable range in the vicinity of the device antenna.

32-nd invention is featured by that in the 31-st invention, the first control means reduces the feeding speed of the feeding means when the RFID circuit element fed by the feeding means is reached to a predetermined range in the vicinity of the device antenna.

When the information is written in the vicinity of the device antenna, the feeding speed can be relatively lowered; the time required to write the information can be relatively sufficiently secured; and also, the RFID circuit element can be stayed within the communicatable range near the device antenna for a relatively long time. As a result, the information can be furthermore firmly written.

33-rd invention is featured by that in any one of the 27-th invention, the device is further comprised of: second control means for controlling the transmission power by the position detecting signal transmitting means in a variable manner.

As a result, the transmission power of the position detecting signal for detecting the position of the RFID circuit element can be controlled to become a proper value.

34-th invention is featured by that in the 28-th invention, the device is further comprised of: third control means for controlling a time duration defined after the reply signal has been received by the reply signal receiving means until the RFID tag information is transmitted by the writing information transmitting means in a variable manner.

As a result, the waiting time for the device side can be properly adjusted to be set, while this waiting time is assumed that after the reply signal from the RFID circuit element has been received, this RFID circuit element is reached to the area near the device antenna.

35-th invention is featured by that in any one of the 27-th invention, the device is further comprised of: fourth control means for controlling the transmission power by the writing information transmitting means in a variable manner.

As a result, the transmission power of the writing information transmitting means for transmitting the RFID tag information to be written in the IC circuit part to the tag antenna can be controlled to become a proper magnitude. Also, since the magnitude of the transmission power is changed, the communication range from the device antenna can be properly set.

36-th invention is featured by that in any one of the 30-th invention, the device is further comprised of: judging means for judging as to whether or not the writing operation to the IC circuit part can succeed after the transmitting operation by the writing information transmitting means has been executed; and in which the first control means control in a variable manner any one of the corresponding feeding speed, the transmission power of the position detecting signal, and the transmission power of the writing information in response to the result of the writing success/failure judgment made by the judging means.

As a consequence, the predetermined waiting time can be adjusted to become a proper time based upon such a condition as to whether or not the writing operation to the IC circuit part of the RFID circuit element can succeed. This predetermine waiting time is defined after the feeding speed, the position detecting operation, the transmission power of the writing information, and the reply signal are received. As a result, for instance, when the writing operation fails, the transmission power is increased, or the waiting time is shortened, so that the writing information is transmitted just before the RFID circuit element is reached to the area near the device antenna. Therefore, the communicating operation can be firmly carried out, and since the feeding speed is lowered is prolonged, so that the writing success ratio can be increased.

37-th invention is featured by that in any one of the 30-th invention, the device is further comprised of: a housing; a cartridge holder unit provided on the housing, for detachably holding a cartridge equipped with the plurality of RFID circuit elements; and information detecting means for detecting parameter information which is formed in the cartridge in correspondence with a tag attribute parameter and a communication parameter of the corresponding RFID circuit elements; and in which the first control means control in a variable manner any one of the corresponding feeding speed, the transmission power of the position detecting signal, and the transmission power of the writing information in response to a detection signal of the information detecting means.

As a consequence, the writing process operation can be further firmly carried out by employing the proper feeding speed, transmission power, which correspond to the tag attribute parameter and the communication parameter of the RFID circuit element, which are formed in the cartridge.

In accordance with the invention recited in Claim 1, an access operation can be performed by minimum required low transmission power with respect to the RFID circuit element to be accessed, and a radio communication can be performed in a higher efficiency.

In accordance with the invention recited in Claim 2 to Claim 26, an access operation can be carried out by minimum required transmission power as long as the RFID circuit element to be accessed as a target can be read, or written, and a radio communication can be performed in a higher efficiency.

In accordance with the invention recited in claims 16, 17, and 18, a continuous information writing process operation is carried out by minimum required transmission power with respect to a plurality of RFID circuit elements, and a radio communication can be performed in a higher efficiency.

DETAILED DESCRIPTION OF THE PREFERRED EMBODIMENTS

Referring now to drawings, embodiment modes of the present invention will be described.

A first embodiment of the present invention will now be explained with reference to FIG. 1 to FIG. 13. This embodiment corresponds to an embodiment mode in the case that the present invention is applied to a manufacturing system of a readable (writing operation is not allowed) RFID tag.

Figure 1:
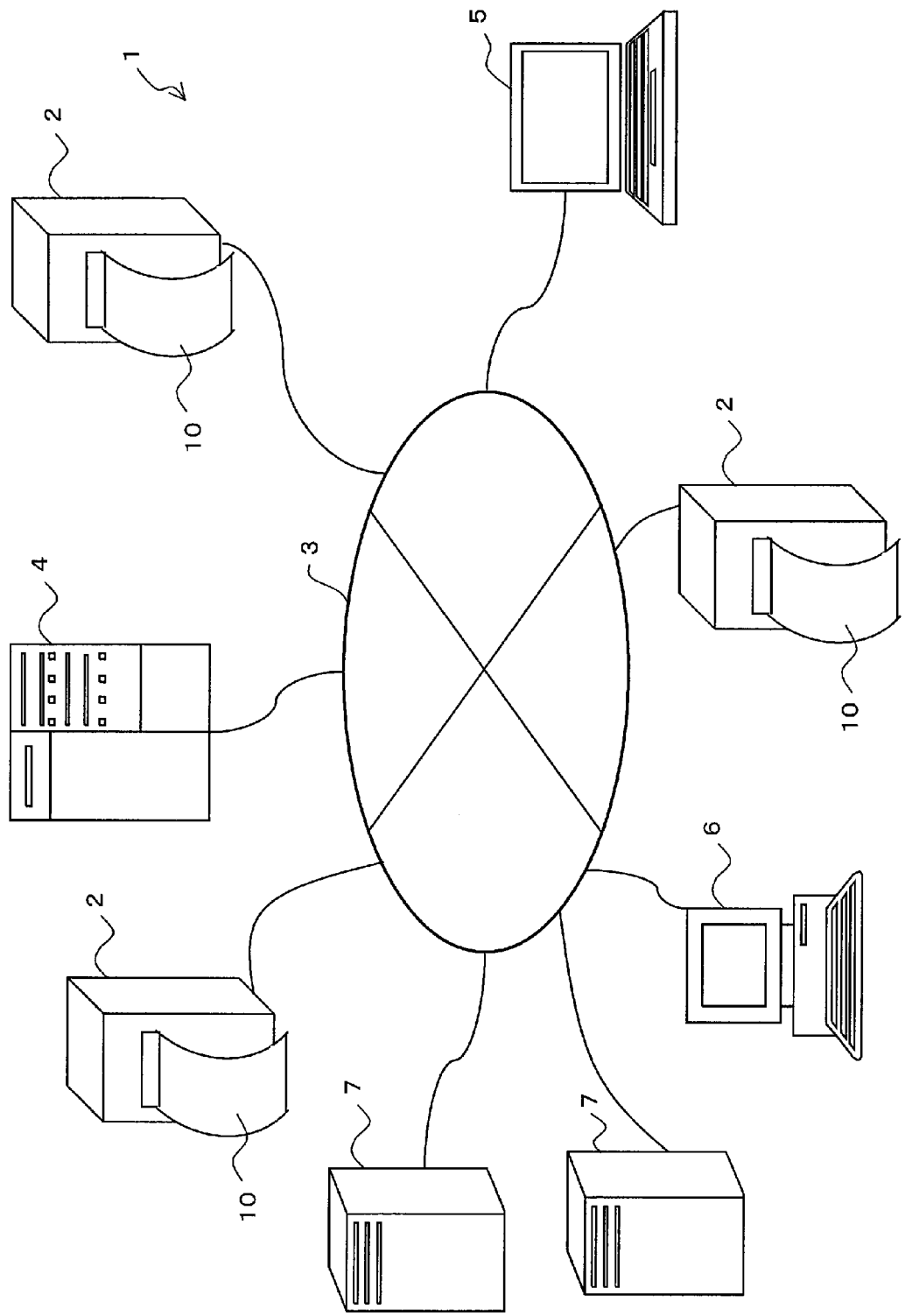
FIG. 1 is a system structural diagram for indicating an RFID tag manufacturing system to which an RFID tag information communicating device of a first embodiment of the present invention is applied.

FIG. 1 is a system structural diagram for indicating an RFID tag manufacturing system to which an RFID tag information communicating device of this first embodiment of the present invention.

In this RFID tag manufacturing system 1 shown in FIG. 1, an RFID tag information communicating device (reading device, writing device) 2 according to this first embodiment is connected via a communication line 3 in either a wired manner or a wireless manner to a route server 4, a terminal 5, a general-purpose computer 6, and a plurality of information severs 7.

Figure 2:
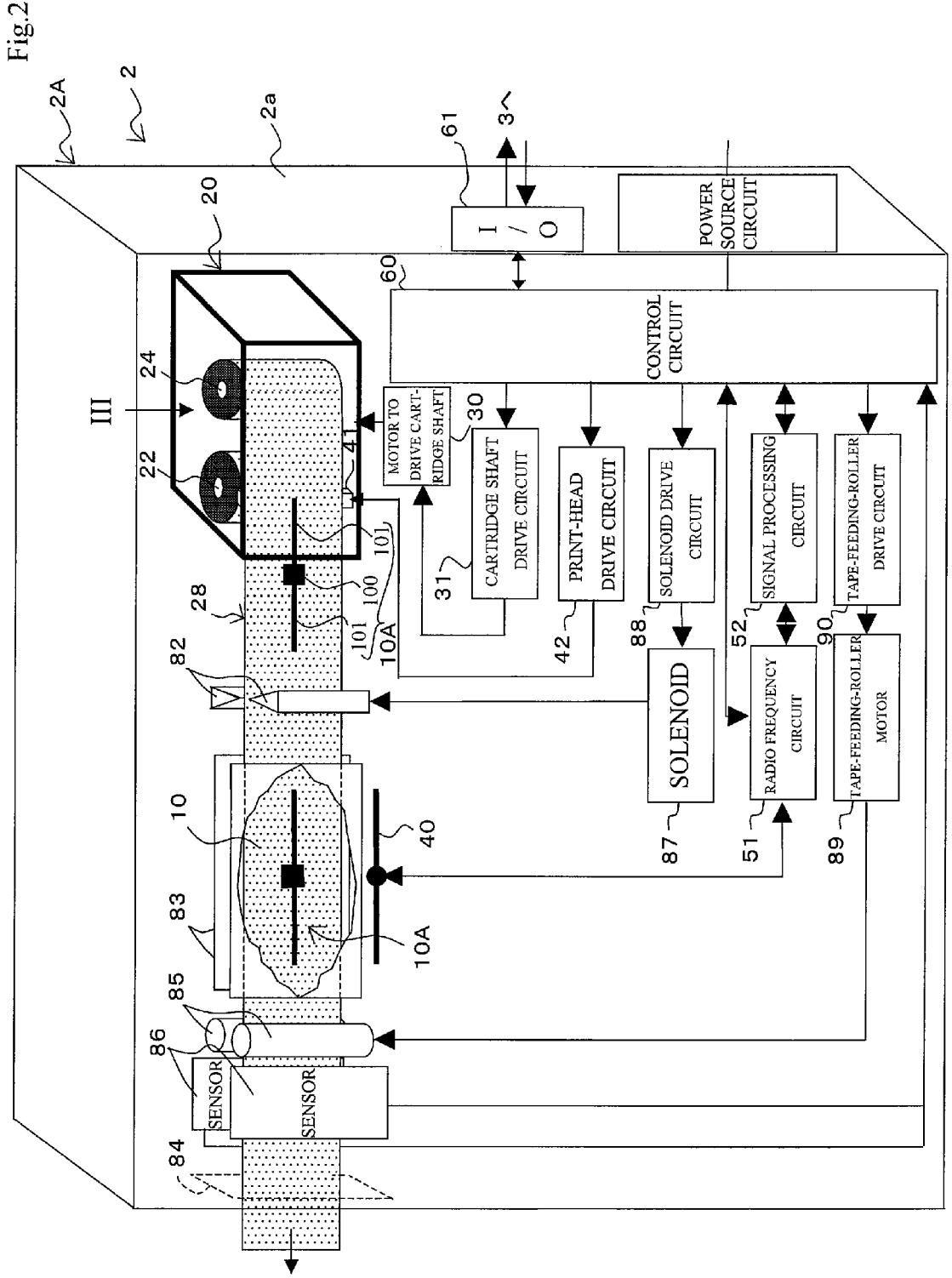
FIG. 2 is a conceptional structural diagram for showing a detailed structure of the RFID tag information communicating device shown in FIG. 1.

FIG. 2 is a conceptional diagram for showing a derailed structure of the above-explained RFID tag information communicating device 2.

In FIG. 2, a cartridge holder unit (not shown) and an open/close lid (not shown) are provided as a concave portion in a main body 2A of the RFID tag information communicating device 2, and a cartridge (RFID circuit element storing means) 20 is detachably mounted on this holder unit. The cartridge 20 is arranged in such a manner that the cartridge 20 can store thereinto a plurality of RFID circuit elements 10A and can sequentially derive these circuit elements 10A.

Also, the main body 2A of the device contains a housing 2a, an antenna (device antenna) 40, a signal processing circuit 52, a control circuit 60, a cutter 82, one pair of feeding guides (RFID circuit element holding unit) 83, a feeding roller 85, and a tape end sensor 86. The housing 2a is equipped with the cartridge holder unit which causes the cartridge 20 to be fitted, and constitutes an outer housing. The antenna 40 transmits and receives a signal by way of a radio communication manner by using a radio frequency such as the UHF frequency band between an RFID circuit element 10A equipped in a tag tape 28 with print and the own antenna 40, with respect to the tag tape 28 with print while this tag tape 28 with print passes through the feeding guides (will be explained later) 83 in conjunction with the below-mentioned printing operation. The radio frequency circuit 51 accesses (reading operation in this example) information (RFID tag information) of an IC circuit part 100 of the RFID circuit element 10A via this antenna 40. The signal processing circuit 52 processes a signal read out from the IC circuit part 100 of the RFID circuit element 10A so as to read information, and also, may function as an access information producing means for producing access information (first access information) used to access the IC circuit part 100 of the RFID circuit element 10A. The control circuit 30 controls entire operations of the RFID tag information communicating device 2 via the cartridge shaft drive circuit 31, the print-head drive circuit 42, the radio frequency circuit 51, the signal processing circuit 52, a solenoid driving circuit 88 (will be explained later), a tape-feeding-roller drive circuit 90, and the like. The cutter 82 is provided in the vicinity of an exit port of the cartridge 20, and cuts the pointed tag tape 28 in which RFID tag information has been read out from the IC circuit part 100 of the RFID circuit element 10A (writing operation has been completed in below-mentioned second embodiment, which will be explained in detail) by a predetermined length so as to sub-divide this printed tag tape 28 into label-shaped RFID tag labels (RFID tags) 10. One pair of the feeding guides 83 set/hold the RFID circuit element 10A to a predetermined access area (=reading position, =writing position in below-mentioned second embodiment, which will be explained in detail) located opposite to the antenna 40 during the reading operation, and guide the cut RFID tag labels 10. The carry-out roller 85 feeds the guided RFID tag label 10 to a carry-out exit 84 so as to carry out this RFID tag label 10. The tape end sensor 86 detects as to whether or not the RFID tag label 10 is present at the carry-out exit 84.

The control circuit 60 corresponds to a so-called "microcomputer." Although a detailed illustration is omitted, the control circuit 60 is arranged by a control processing unit (CPU), a ROM, a RAM, and the like. While the control circuit 60 utilizes a temporary storage function of the RAM, the control circuit 60 executes a signal process operation in accordance with a program previously stored in the ROM. Also, this control circuit 60 is connected via an input/output interface 61 to the communication line 3, and then, can transmit/receive information with respect to the route server 4, the terminal 5, the general-purpose computer 6, the information server 7, and the like, which are connected to this communication line 3.

The cutter 82 is driven by a solenoid 87 so as to perform a cutting operation, and the solenoid 87 is controlled by the solenoid driving circuit 88. Also, the feeding roller 85 is driven by a tape-feeding-roller motor 89, and this motor 89 is controlled by a tape-feeding-roller drive circuit 90. Also, the tape end sensor 86 corresponds to a transmission type (reflection type) photoelectric sensor constituted by, for instance, a light projecting device and a light receiving device. When an RFID tag label 10 is not present between the light projecting device and the light receiving device, light outputted from this light projecting device is entered to the light receiving device. On the other hand, when an RFID tag label 10 is present between the light projecting device and the light receiving device, light outputted from this light projecting device is shielded, so that a control output from the light receiving device is inverted.

Figure 3:
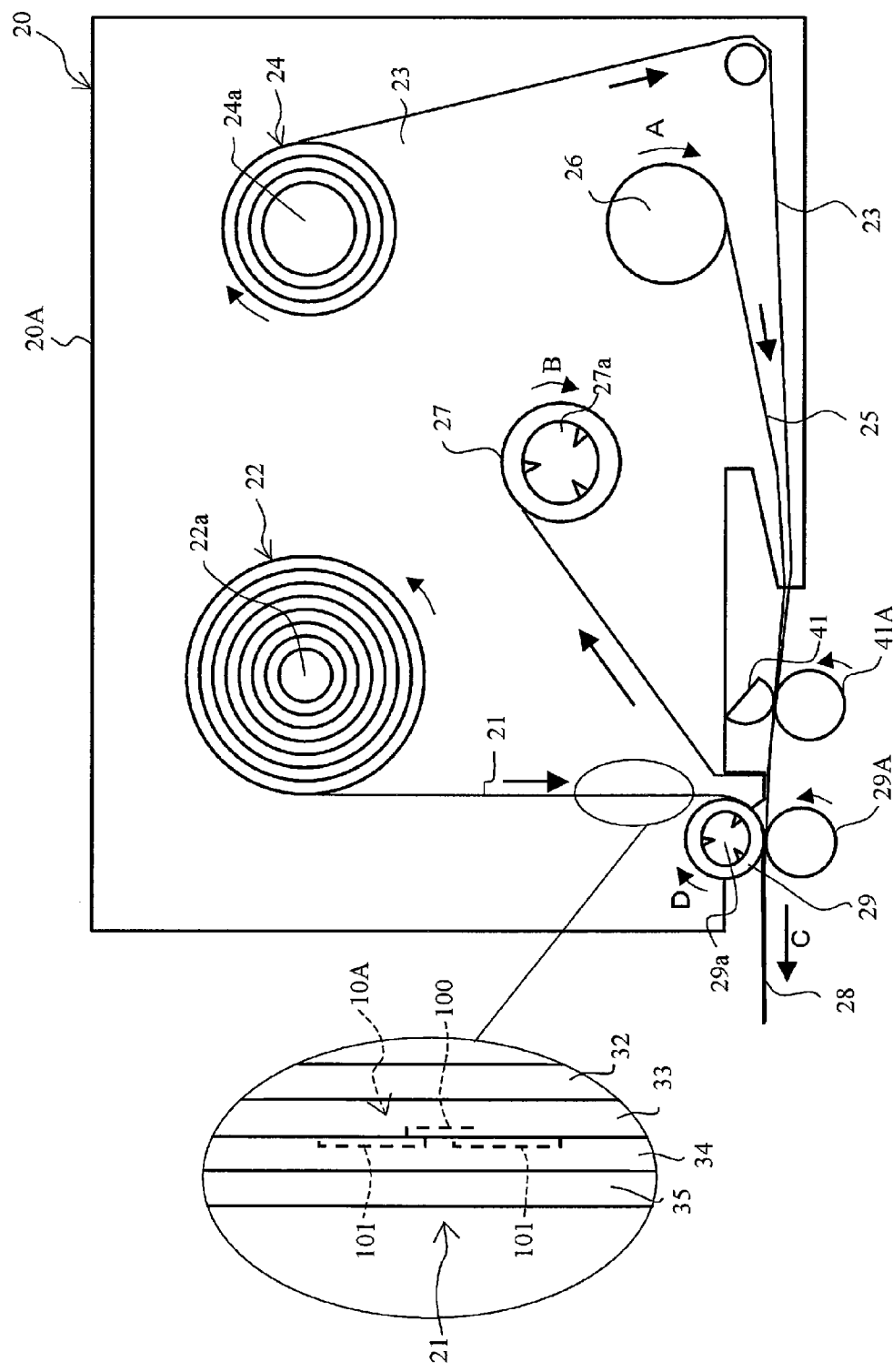
FIG. 3 is a diagram for showing a detailed structure of a cartridge shown in FIG. 2, as viewed from a direction III of FIG. 2.

FIG. 3 is a diagram for indicating a detailed structure of the cartridge 20, as viewed from an arrow direction of III in FIG. 2.

In FIG. 3 and the above-explained FIG. 2, as to the cartridge 20, a first roll 22 on which a belt-shaped base tape (tag tape, tape-shaped label material) 21 has been wound where a plurality of RFID circuit elements 10A have been sequentially formed along a longitudinal direction thereof; a second roll 24 on which a transparent cover film 23 having the substantially same width as that of the base tape 21 has been wound; an ink ribbon supply-side role 26; a ribbon take-up roller 27 for taking up a printed ink ribbon 25; and a pressure roller 29 (tape feeding roller) are freely rotatably provided around each of shaft centers. The ribbon supply-side role 26 feeds out an ink ribbon 25 for printing purpose along a direction of an arrow "A." The pressure roller 29 depresses the base tape 21 against the cover film 23 so as to adhere the cover film 23 to the base tape 21 to constitute a tag tape 28 with print, and feeds this tag tape 28 with print along a direction indicated by an arrow "C." These rolls and rollers 22, 24, 26, 27, 29 have been provided within the cartridge housing (cartridge main body) 20A. Among these members, both the take-up roller 27 and the pressure roller 29 are rotated by such a drive force of the motor to drive cartridge shaft 30 (refer to FIG. 2) corresponding to, for example, a pulse motor provided outside the cartridge 20, since thus drive force is transferred to a take-up roller driving shaft 27a for driving the ribbon take-up roller 27, and a pressure roller driving shaft 29a for driving the pressure roller 29. This drive force of the motor to drive cartridge shaft 30 is controlled by a cartridge driving circuit (see FIG. 2).

In the first roll 22, the above-described base tape 21 has been wound on a reel member 22a. As partially indicated in FIG. 3 in an enlarging manner, this base tape 21 has a 4-layer structure. The base tape 21 has been constituted by stacking an adhesive layer 32 for a cover film; a colored base film 33 made of PET (polyethyleneterephthalate), or the like; another adhesive layer 34; and a separation sheet 35 in this order from the inside wound side (namely, wound in inner side, right side in FIG. 3) toward the opposite side (namely, left side in FIG. 3). The adhesive layer 34 is provided with an adhesive material used to adhere the RFID tag label 10 onto an adhering subject. The separation sheet 35 covers the adhesive side of this adhesive layer 34.

The IC circuit part 100 has been provided on a rear side (left side in FIG. 3) of the base film 33 in an integral body; an antenna (tag antenna) 101 has been formed on a surface of the rear side of the base film 33. The RFID circuit element 10A has been constituted by the IC circuit part 100 and the antenna 101 (refer also to FIG. 7). The antenna 101 is connected to the IC circuit part 100 so as to transmit/receive information.

The cover film-purpose adhesive layer 32 which will adhere the cover film 23 later is formed on the front side (right side in FIG. 3) of the base film 33. Also, the separation sheet 35 has been adhered to the rear side of the base film 33 by the adhesive layer 34. It should be understood that when an RFID tag label 10 which has been finally accomplished in a label shape is adhered to a predetermined commercial goods, or the like, this separation sheet 35 is separated, so that the RFID tag label 10 can be adhered to this commercial goods, or the like by the adhesive layer 34.

In the second roll 24, the cover film 23 has been wound around a reel member 24a, and the cover film 23 is fed.

Both the ribbon supply-side role 26 and the ribbon take-up roller 27 have been arranged on the rear surface side of the cover film 23, namely, on the side adhered to the base tape 21. The ink ribbon 25 is driven by these rollers. At this time, a thermal head 41 (printing head) is provided in the vicinity of the cartridge 20, while the terminal head 41 is driven by the print-head drive circuit 42 (refer to FIG. 2) so as to perform a predetermined printing operation on the cover film 23. Since the ink ribbon 25 is depressed by this thermal head 41, this ink ribbon 25 may abut against the rear surface of the cover film 23.

When the cartridge 20 having such a structure is mounted on the main body 2A, and a roller holder (not shown) is moved from a separated position to an abutting position, both the cover film 23 and the ink ribbon 25 are sandwiched between the print head 41 and the platen roller 41A, and further, both the base tape 21 and the cover film 23 are sandwiched between the pressure roller 29 and the sub-roller 29A. Then, both the ribbon take-up roller 27 and the pressure roller 29 are rotated in respective synchronism modes along directions indicated by an arrow "B" and a arrow "D" by drive force of the cartridge driving motor 30. Furthermore, the sub-roller 29A and the platen roller 41A are rotated in conjunction with the drive force. A plurality of heating elements of the thermal head 41 are energized by the print-head drive circuit 42.

As a result, the base tape 21 is fed out from the first roll 22 so as to be supplied to the pressure roller 29, and while the cover film 23 is fed out from the second roll 24, the ink ribbon 25 is fed out from the ribbon supply-side role 26, as explained above. Thus, such a print 43 (refer to FIG. 6(a), will be explained later) as predetermined character, symbol, and bar code is printed on the rear surface (surface of cover film 23 on the side adhered to adhesive layer 32, refer to FIG. 7) of the cover film 23 (it should be noted that since print 43 is printed from rear surface, character and the like are printed which are mirror-symmetrical, as viewed from printing side). Then, both the base tape 21 and the cover film 23 where the printing operation has been accomplished are adhered to each other by the pressure roller 29 and the sub-roller 29A so as to be formed in an integral body as a tag label tape 28 with print. This tag label tape 28 with print is carried out from the cartridge 20. It should also be noted that the ink ribbon 25 whose printing operation to the cover film 23 has been accomplished is taken up by the ribbon take-up roller 27 by the drive force of the ribbon take-up roller driving shaft 27a.

Figure 4:
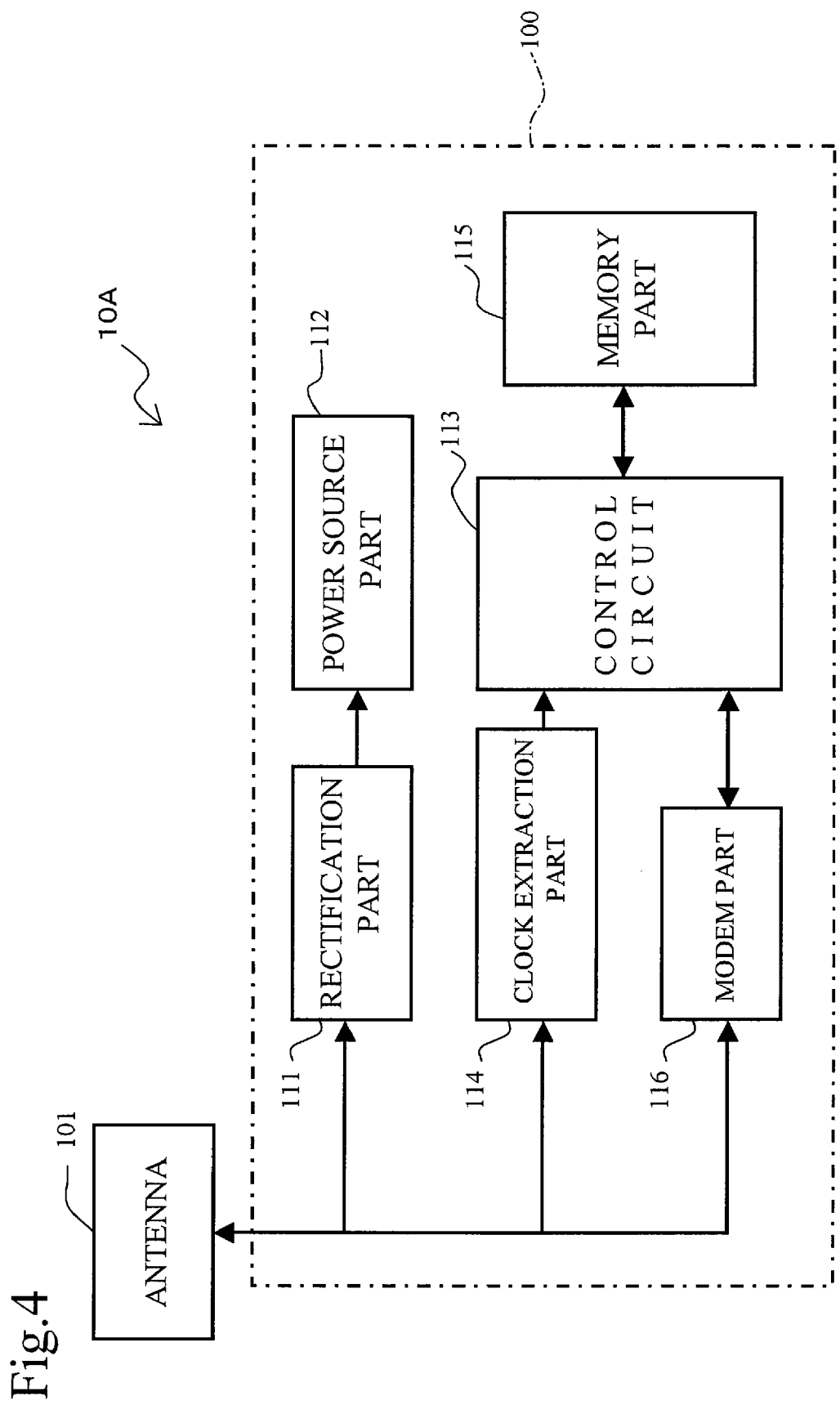
FIG. 4 is a functional block diagram for indicating a functional structure of an RFID circuit element shown in FIG. 3.

FIG. 4 is a functional block diagram for indicating a functional structure of the above-explained RFID circuit element 10A.

In FIG. 4, the RFID circuit element 10A contains an antenna 40 (will be explained in detail), the antenna (tag antenna) 104, and an IC circuit part 100 connected to the antenna 101. The antenna 104 transmits and receives a signal in a non-contact manner by employing a radio frequency of the UHF band, or the like, and also the antenna 40 is provided on the side of the RFID tag information communicating device 2.

The IC circuit part 100 is equipped with a rectification part 111, a power source part 112, a clock extraction part 114, a memory part 115, a modem part 116 connected to the antenna 101, and a control unit 113. The rectification part 111 rectifies a carrier wave received from the antenna 101. The power source part 112 stores thereinto energy of the carrier wave rectified by the rectification part 111 so as to use the stored energy as a drive power source. The clock extraction part 114 extracts a clock signal from the carrier wave received from the antenna 101 and supplies the extracted clock signal to the above-described control unit 113 (will be explained later). The memory part 115 functions as an information storage means capable of storing thereinto a predetermined information signal. The control unit 113 is employed so as to control operations of the RFID circuit element 10A via the rectification part 111, the clock extraction part 114, the modem part 116, and the like.

The modem part 116 demodulates a communication signal from the antenna 40 of the RFID tag information communicating device 2 received by the antenna 101, and also, modulates/reflects a carrier wave received by the antenna 101 based upon a response signal supplied from the control unit 113.

The control unit 113 executes a basic control operation. That is, the control unit 113 interprets the receiving signal demodulated by the modem part 116, produces a reply signal based upon the information signal stored in the memory part 116, and returns the return signal by the modem part 116. In this first embodiment, the IC circuit part 100 has been arranged by that the information stored in the memory part 115 via the control unit 113 can be read (writing operation is not allowed).

Figure 5:
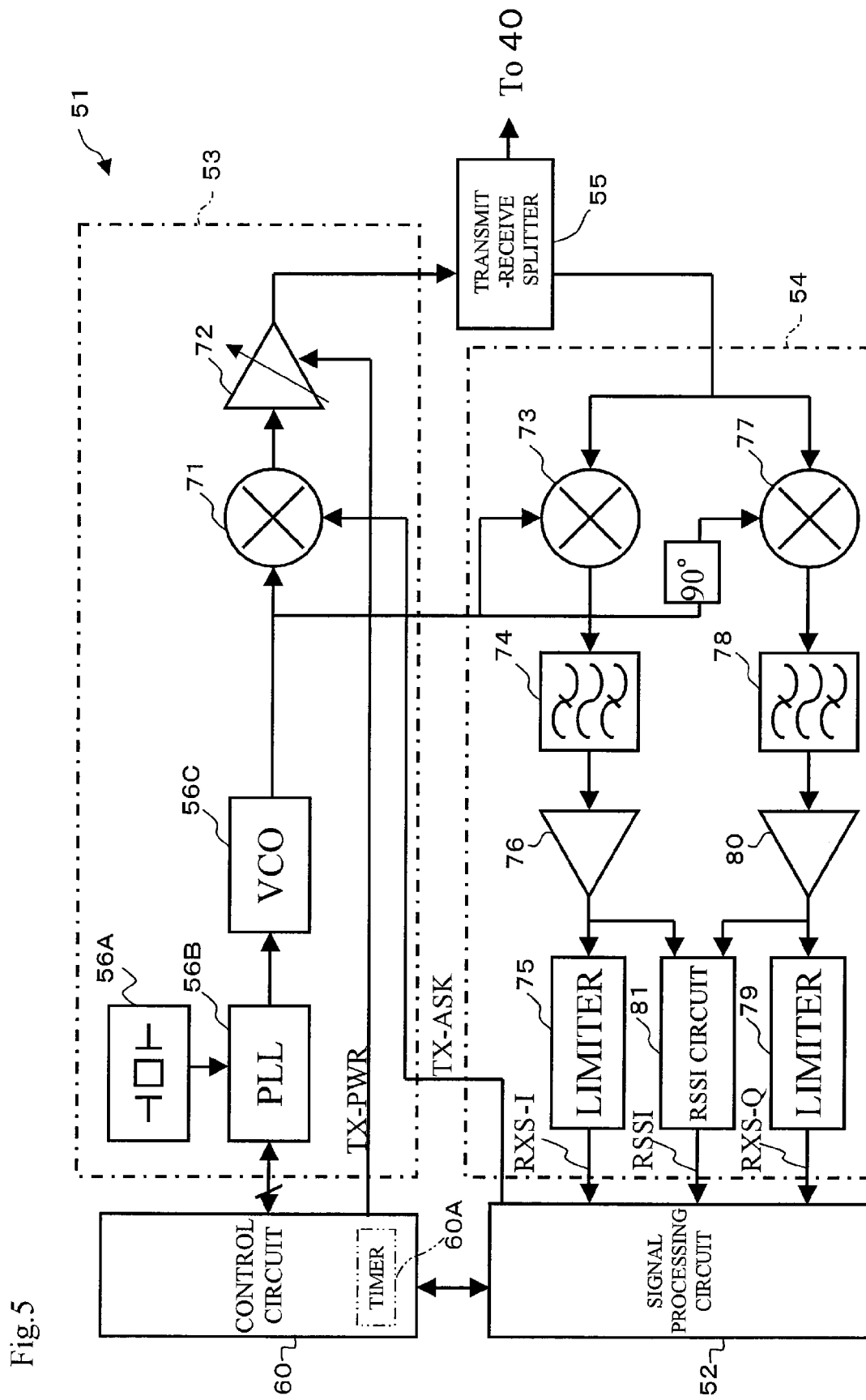
FIG. 5 is a functional block diagram for indicating a detailed function of a radio frequency circuit indicated in FIG. 2.

FIG. 5 is a functional block diagram for showing detailed functions of the radio frequency circuit 51.

In this FIG. 5, the radio frequency circuit 51 is arranged by a transmitting portion 53, a receiving portion 54, and a transmit-receive splitter 55. The transmitting portion 53 transmits a signal via the antenna 40 to the RFID circuit element 10A. The receiving portion 54 inputs a reflection wave from the RFID circuit element 10A received by the antenna 40.

The transmitting portion 53 is provided with a crystal oscillator 56A, a PLL (Phase-Locked Loop) 56B, a VCO (Voltage-Controlled Oscillator) 56C, a transmission multiplying circuit 71, and a variable transmission amplifier 72. The crystal oscillator 56A functions as a carrier wave generating unit which generates a carrier wave which is used to access (read in this example) RFID tag information stored in the IC circuit part 100 of the RFID circuit element 10A. The transmission multiplying circuit 71 functions as a carrier wave modulating unit which modulates the generated carrier wave based upon the signal supplied from the signal processing circuit 52. In this example, the transmission multiplying circuit 71 modulates the carrier wave based upon a "TX_ASK" signal supplied from the signal processing circuit 52 in this example, and an amplification factor variable amplifier may be employed in the case of the amplitude modulation. The variable transmission amplifier 72 functions as a modulated wave amplifying unit which determines an amplification factor by a "TX_PWR" signal supplied from the control circuit 60, and amplifies the modulation wave modulated by the transmission multiplying circuit 72 (refer to FIG. 9). Then, the carrier wave generated from the carrier wave generating unit may preferably use a frequency of 300 MHz, or higher frequencies of the UHF band. The output signal of the variable transmission amplifier 72 is transmitted to the antenna 40 via the transmit-receive splitter 55, and then, is supplied to the IC circuit part 100 of the RFID circuit element 10A.

The receiving portion 54 is equipped with a first receiving signal multiplying circuit 73, a first band-pass filter 74, a first receiving signal amplifier 76, a second receiving signal multiplying circuit 77, a second band-pass filter 78, and a second receiving signal amplifier 80. The first receiving signal multiplying circuit 73 multiplies the reflection wave from the RFID circuit element 10A received by the antenna 40 by the carrier wave generated from the carrier wave generating unit. The first band-pass filter 74 is used to derive only a signal of a required frequency band from the first receiving signal multiplying circuit 73. The first receiving signal amplifier 76 amplifies the output signal filtered by the first band-pass filter 74, and supplies the amplified signal to a first limiter 75. The second receiving signal multiplying circuit 77 multiplies the reflection wave from the RFID circuit element 10A received by the antenna 40 by a carrier wave whose phase has been shifted by 90 degrees after the carrier wave has been generated from the carrier wave generating unit. The second band-pass filter 78 is used to derive only a signal of a required band from the output of the second receiving signal multiplying circuit 77. The second receiving signal amplifier 80 inputs the output filtered by the second band-pass filter 78, and amplifies this inputted signal to be supplied to a second limiter 79. Then, a signal "RXS-I" outputted from the first limiter 75 and a signal "RXS-Q" outputted from the second limiter 79 are inputted to the signal processing circuit 52 so as to be processed.

Also, the output signals from the first receiving signal amplifier 76 and the second receiving signal amplifier 80 are inputted to an RSSI (Received Signal Strength Indicator) circuit 81, and thus, signals "RSSI" indicative of the strengths of these signal are entered to the signal processing circuit 52. As previously explained, in the RFID tag information communicating device 2 of this first embodiment, a demodulating operation of the reflection wave from the RFID circuit element 10A is carried out by an I-Q quadrature demodulating operation.

Figure 6:
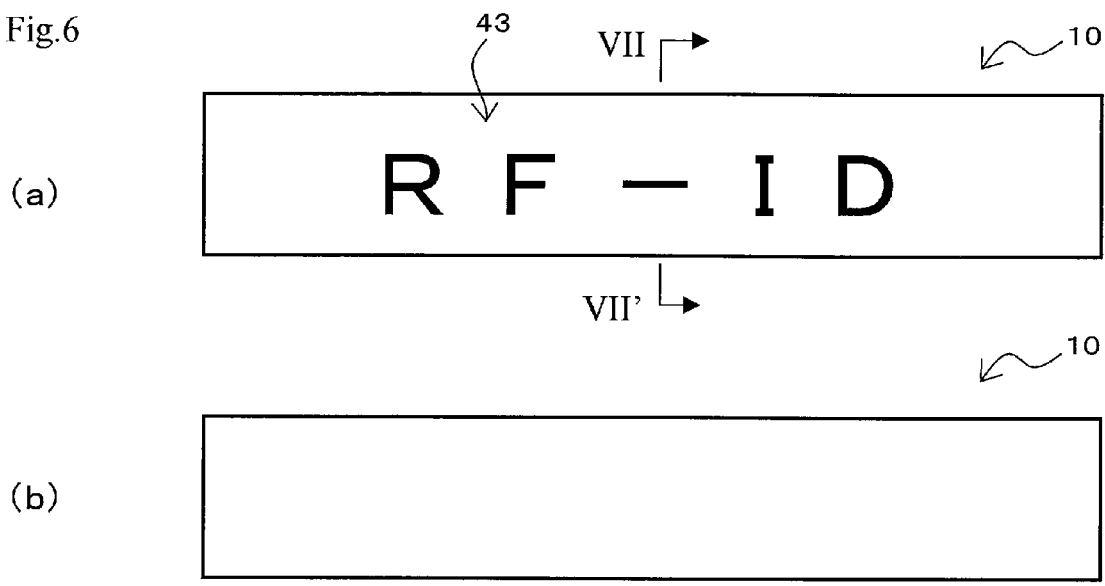
FIG. 6 is an upper view and a lower view, which show an example of an outer view of an RFID tag.
Figure 7:
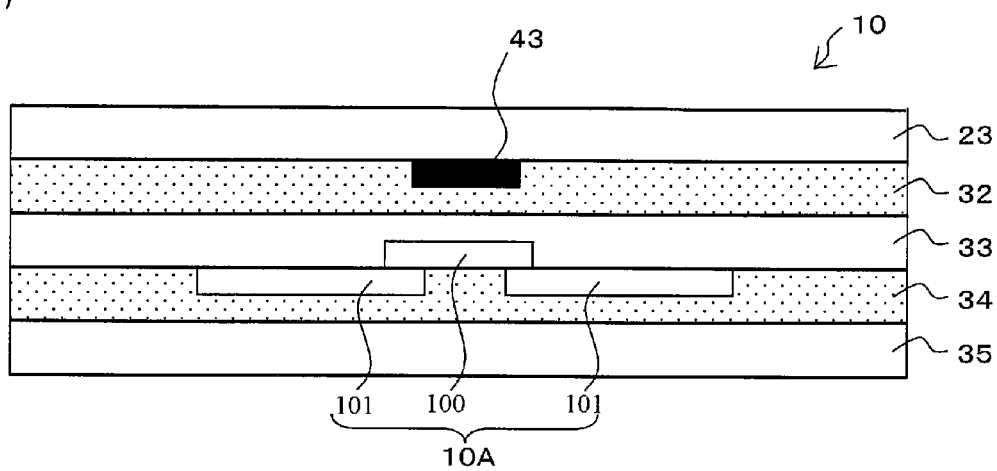
FIG. 7 is a lateral sectional view, taken along a line VII-VII' of FIG. 6.

FIG. 6(a) and FIG. 6(b) are diagrams for indicating one example as to an outer appearance of the RFID tag label 28 manufactured by completing the information reading operation (or writing operation, refer to below-mentioned modification) of the RFID circuit element 10A and the cutting operation of the tag label tape 28 with print in the above-explained manner, and has been carried out. FIG. 6(a) is an upper view of the RFID tag label 10 and FIG. 6(b) is a lower view thereof. FIG. 7 is a lateral sectional view of the RFID tag label, taken along a line VII-VII' of FIG. 6.

In FIG. 6(a), FIG. 6(b), and FIG. 7, the RFID tag label 10 is made of a 5-layer structure by adding the cover film 23 to the 4-layer structure shown in FIG. 3. The 5 layers are constituted by the cover film 23, the cover film-purpose adhesive layer 32, the base film 33, the adhesive layer 34, and the separation sheet 35 from the side of the cover film 23 (namely, upper side shown in FIG. 7) toward the opposite side thereof (namely, lower side shown in FIG. 7). Then, as explained above, the RFID circuit element 10A made of the IC circuit part 100 and the antenna 101 is provided on the rear surface of the base film 33, and a print 43 (in this example, character of "RF-ID" indicative of sort of RFID tag label 10) has been printed on the rear surface of the cover film 23.

Figure 8:
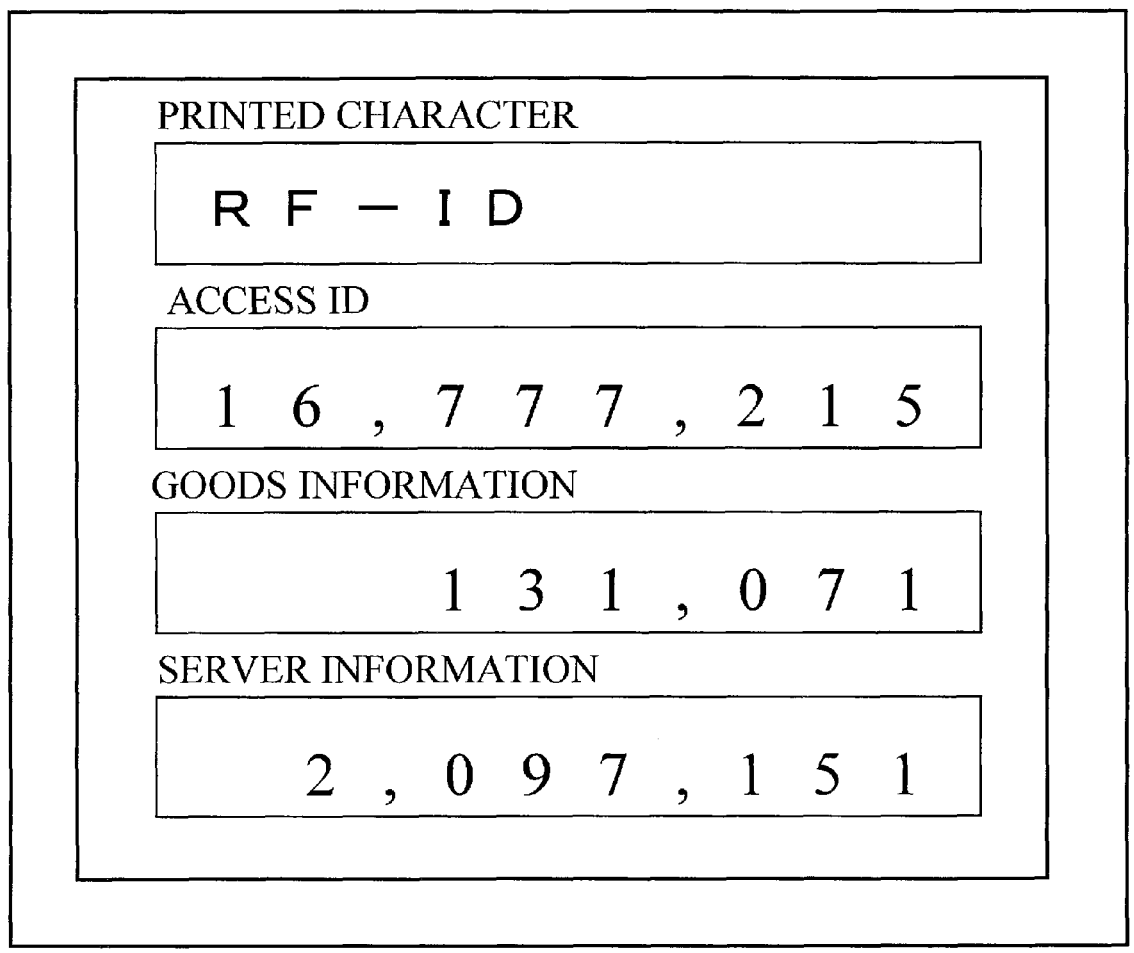
FIG. 8 is a diagram for indicating an example of a screen displayed on a terminal, or a general-purpose computer shown in FIG. 1.

FIG. 8 is a diagram for indicating one example of a screen displayed on the terminal 5, or the general-purpose computer 6 when the RFID tag information communicating device 2 accesses (reads in this example) RFID tag information of the IC circuit part 100 of the RFID circuit element 10A.

In FIG. 8, in this example, the printing character 43 corresponding to the RFID circuit element 10A, an access (reading operation in this example) ID which corresponds to an ID specific to this RFID circuit element 10A, an address of goods information stored in the information server 7, and storage destination addresses of corresponding information thereto in the route server 4 may be displayed on either the terminal 5 or the general-purpose computer 6. Then, the RFID tag information communicating device 2 is operated by operating the terminal 5 or the general-purpose computer 6, so that the above-explained printing character 43 is printed on the cover film 23, and as will be explained later, the RFID tag information as to the goods information which has been previously stored in the IC circuit part 100 is read.

In this case, the largest feature of the RFID tag information communicating device 2 according to this first embodiment is given as follow: That is, as explained above, when the RFID tag information of the IC circuit part 100 of the RFID circuit element 10A is read which should be accessed (reading operation in this case), while the control circuit 60 increases the transmission power from the transmitting portion of the radio frequency circuit 51 in the stepwise manner, the control circuit 60 judges as to whether or not the RFID circuit element 10A can be accessed every time the transmission power is increased. As a consequence, the control circuit 60 can access (read) the RFID tag information by employing the transmission power (minimum required transmission power) as low as possible under which the accessing operation (reading operation) can be carried out.

Figure 9:
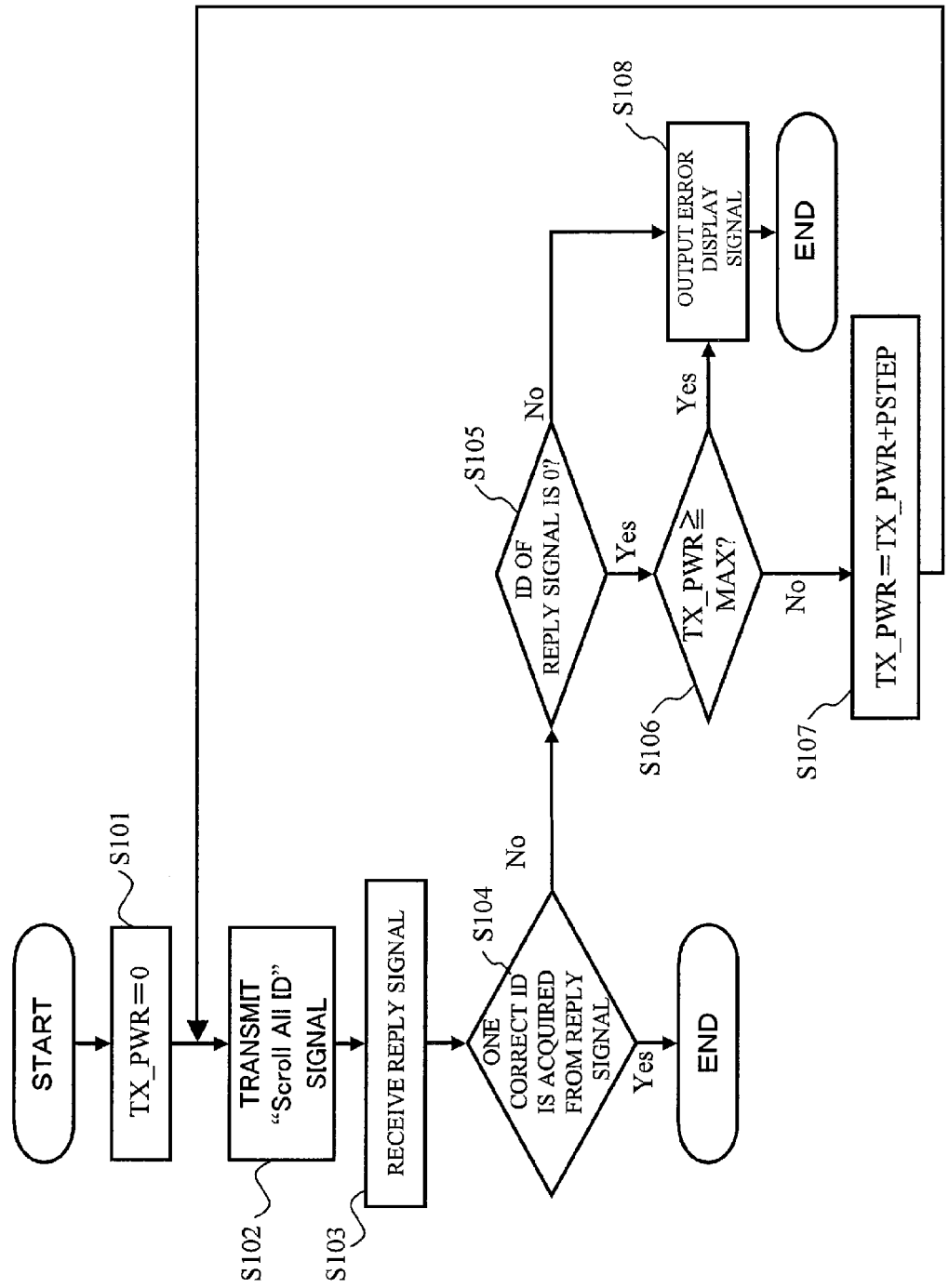
FIG. 9 is a flow chart for explaining RFID tag information reading sequential operations from an IC circuit part of an RFID circuit element among control operations executed by a control circuit indicated in FIG. 2.

FIG. 9 is a flow chart for indicating RFID tag information reading sequential operations from the IC circuit part 100 of the RFID circuit element 10A, which is related to the above-explained major portion of this first embodiment, among the control operations executed by the control circuit 60.

In FIG. 9, when a reading operation of the RFID tag information communicating device 2 is carried out, this flow operation is commenced. In a first step S101, a value of a "TX_PWR" signal is initialized to "0", while this "TX_PWR" signal determines an amplification factor in the variable transmission amplifier 72 (refer to FIG. 5) which determines an output power value of a transmission signal from the transmitting portion 53.

Then, in a step S102, a "Scroll All ID" command for requesting a response of the RFID circuit element 10A is outputted to the signal processing circuit 52. In the signal processing circuit 52, a "TX_ASK" signal is produced based upon this command, and then, this "TX_ASK" signal is outputted to the transmission multiplying circuit 71. In the transmission multiplying circuit 71, the "TX_ASK" signal is amplitude-modulated so as to become a "Scroll All ID" signal as access information (first access information). This "Scroll All ID" signal is furthermore amplified by such an amplification factor (since "TX_PWR"=0 in the beginning, amplification factor is equal to 0) determined based upon the "TX_PWR" signal entered from the control circuit 60 by the variable transmission amplifier 72, and the amplified "Scroll All ID" signal is transmitted via the transmit-receive splitter 55 and the antenna 40. If there is an RFID circuit element 10A in an accessible range, then this "Scroll All ID" signal requests this element 10A to prompt a reply operation.

Next, in a step S103, if the RFID circuit element 10A is present in the accessible range, then a reply signal (RFID tag information such as goods information) as a first reply signal transmitted from the RFID circuit element 10A to be accessed in response to the "Scroll All ID" signal is received via the antenna 40, and then, is acquired by the receiving portion 54 and the signal processing circuit 52.

Next, in a step S104, a judgment is made as to whether or not one correct ID can be acquired based upon the known method using CRC (error detecting code) of the reply signal received in the step S103. As previously explained, in the beginning, since the "TX_PWR" signal is zero and also the reply signal is zero, the judgment cannot be satisfied, and then, the process operation is advanced to a step S105. In the step S105, another judgment is made as to whether or not an ID of the reply signal received in the step S103 is equal to zero, depending upon such a condition as to whether or not an RSSI power value of this received reply signal is smaller than, or equal to a predetermined value. As a result, this judgment can be satisfied, and the process operation is advanced to a step S106.

In this step S106, a judgment is made as to whether or not the value of the "TX_PWR" signal at this time is larger than, or equal to a previously set upper limit value (for example, upper limit value determined by either allowable maximum power of device or Japanese electromagnetic wave law). When the "TX_PWR" signal is smaller than the predetermined upper limit value, this judgment cannot be satisfied, and then, the process operation is advanced to a step S107.

In the step S107, a predetermined adding operator "Pstep" for increasing the transmission power from the transmitting portion 53 in the stepwise manner is added to the value of the "TX_PWR" signal, and then, the process operation is returned to the step S102 in which a similar sequential operation is repeatedly carried out.

Figure 10:
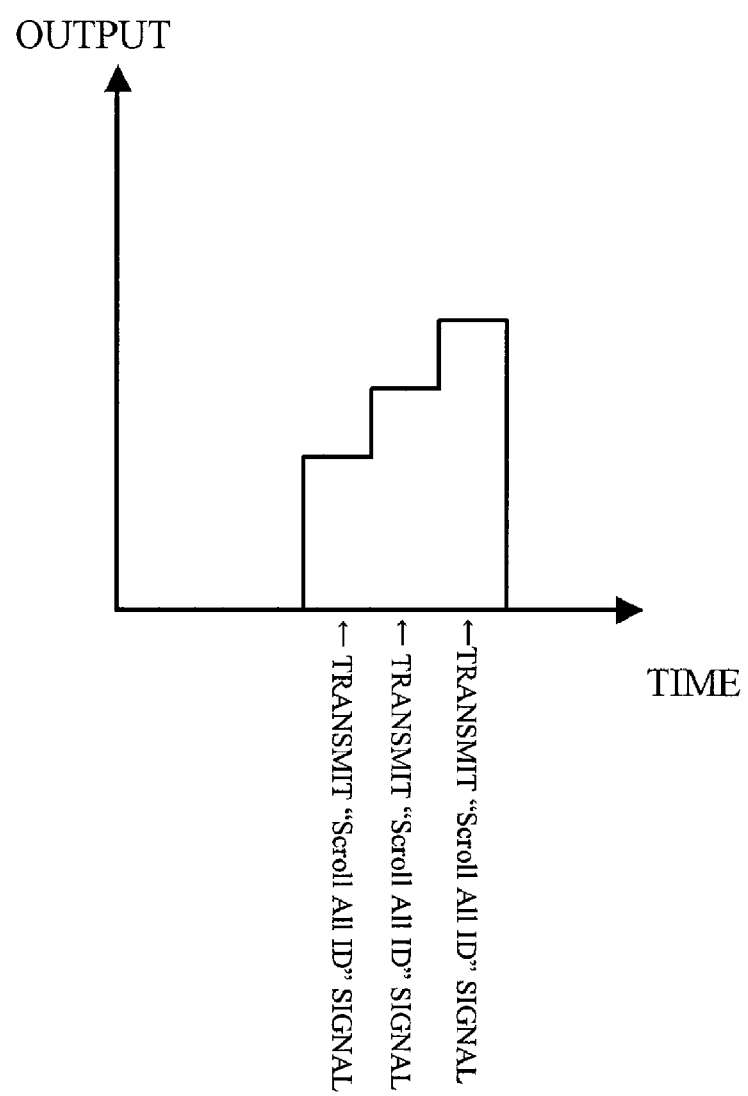
FIG. 10 is a diagram for schematically indicating such a condition that transmission power of a "Scroll All ID" signal from a transmitting portion is increased in a stepwise manner in a time elapse.

While the value of the "TX_PWR" signal is increased in the stepwise manner in the above-explained manner and also the transmission power of the "Scroll All ID" signal from the transmitting portion 53 is increased in the stepwise manner, the process operations defined from the step S102 to the step S107 are repeatedly carried out. As a result, the closer the RFID circuit element 10A is located near the device antenna 40, the lower this element 10A can be accessed by transmission power, so that such an RFID circuit element 10A located at the nearest position with respect to the device antenna 40 resends a reply signal at any one of steps. When this reply signal is received in the step S103, the judgment of the step S104 can be satisfied, and then, this flow operation is ended. FIG. 10 is a diagram for schematically showing such a condition that the transmission power of the "Scroll All ID" signal from the transmitting portion 53 at this time is increased in the stepwise manner while a time elapses.

In the case that there a plurality of RFID circuit elements 10A which are located at the nearest position and two, or more reply signals are received in the step S103, both the judgments of the step S104 and the step S105 cannot be satisfied, and then, the process operation is advanced to a step S108. In this step S108, an error display signal is outputted via the input/output interface 61 and the communication line 3 to either the terminal 5 or the general-purpose computer 6 so as to display a reading failure (error) corresponding thereto, and then, this flow operation is ended.

The RFID tag information communicating device 2 can access the RFID tag information of the IC circuit part 100 of one RFID circuit element 10A located at the nearest position thereto and can read this RFID tag information in accordance with the above-explained manner.

It should also be noted that when the above-explained reading operation is carried out, a corresponding relationship between the ID of the manufactured RFID tag label 10 and the information read from the IC circuit part 100 of this RFID tag label 10 has been stored in the above-explained route server 4, and may be observed, if necessary.

In the above description, both the signal processing circuit 52 and the transmitting portion 53 of the radio frequency circuit 51 constitute an access information producing means for producing the first access information for accessing the RFID tag information of the IC circuit part, and further, the transmitting portion 53 also constitutes a first information transmitting means which transmits the first access information produced by the access information producing means via the device antenna to the tag antenna in the non-contact manner so as to access the RFID tag information of the IC circuit part.

Also, the control circuit 60 (in particular, both step S104 and step S105 of flow operation shown in FIG. 9) constitutes a first judging means for judging as to whether or not an access operation to an IC circuit part after the access operation has been executed can succeed. Also, the control circuit 60 (in particular, both step S106 and step S107 of flow operation indicated in FIG. 9) constitutes a first power control means for controlling a magnitude of transmission power from the first information transmitting means in response to a judging result for judging as to whether or not the access operation can succeed by the first judging means.

The receiving portion 54 of the radio frequency circuit 51 constitutes a first information receiving means for receiving a first response signal (reply signal) transmitted from the IC circuit part in response to the transmitted first access information after the first access information has been transmitted by the first information transmitting means via the tag antenna by the device antenna in the non-contact manner, and then, for reading the received first reply signal.

As previously explained, in the RFID tag information communicating device 2 of this first embodiment, when the RFID circuit element 10A is accessed (reading operation in this example), in order to reduce the transmission power to the minimum necessary value, the control circuit 60 performs the control operations as follows: That is, until it is so judged in the step S104 of the flow chart shown in FIG. 9 that the reply signal from one RFID circuit element 10A is received, while the value of the "TX_PWR" signal is gradually increased in the stepwise manner in the step S105 to the step S107, the process operation is returned to the step S102 in which the output value of the "Scroll All ID" signal from the transmitting portion 53 is increased in the stepwise manner. As a consequence, the access operation can be carried out by the minimum required transmission power from the transmitting portion 53 as low as possible under which the reading operation can be carried out with respect to the RFID circuit element 10A which should be accessed (should be read in this example), so that the radio communication operation can be carried out in a higher efficiency. As a result, the leakage power to the external region except for the mutual space between the device antenna 40 and the antenna 101 of the RFID circuit element 10A can be suppressed as much as possible, and also, the power consumption can be suppressed.

It should also be noted that in the above-described first embodiment, as represented in FIG. 9, when the plurality of RFID circuit elements 10A return the reply signals at once in such a case that the transmission power is increased from such a condition that a total number of reply signals is equal to zero (namely, there is no responding RFID circuit element 10A), the control circuit 60 handles this condition as the not controllable condition and displays the error, and then, the flow operation is accomplished. Alternatively, even in such a case, the control circuit 60 may perform the control operation.

Figure 11:
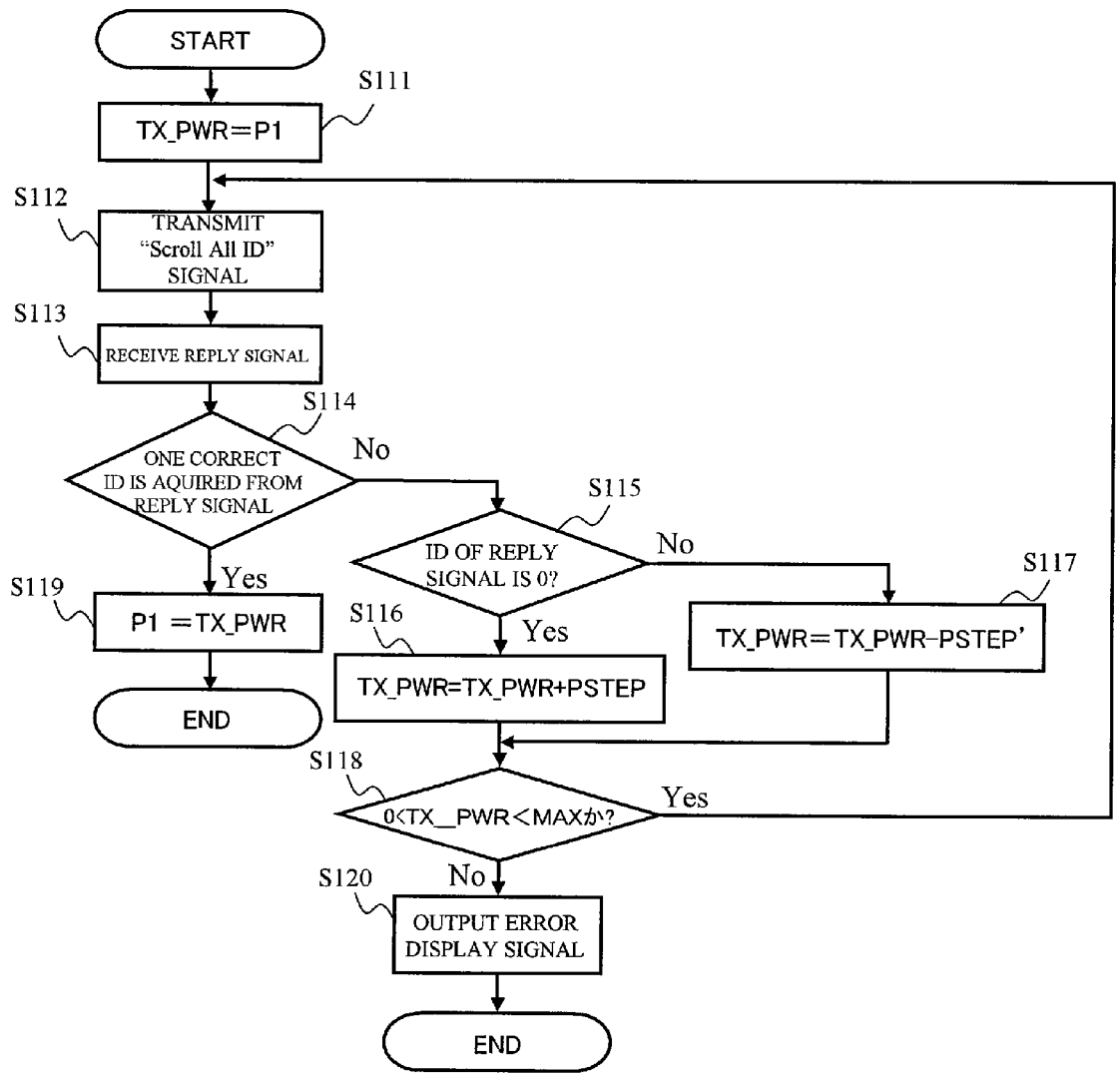
FIG. 11 is a flow chart for explaining RFID tag information reading sequential operations executed by the control circuit in a modification according to the first embodiment of the present invention, capable of accepting a plurality of reply signals.

FIG. 11 is a flow chart for indicating RFID tag information reading sequential operations executed by the control circuit 60 in such a modification, and this flow chart corresponds to that of FIG. 9.

In FIG. 11, when a reading operation of the RFID tag information communicating device 2 is carried out, this flow operation is commenced. In a first step S111, a value of a "TX_PWR" signal is initialized as "P1", while this "TX_PWR" signal determines an amplification factor in the variable transmission amplifier 72 (refer to FIG. 5) which determines an output power value of a transmission signal from the transmitting portion 53. As to this signal value "P1", in the case that the transmission power minimizing control operation has already been carried out to store this signal value "P1" as the optimum value (refer to below-mentioned step S119), this stored value is employed during the previous control operation (namely, when one preceding reading operation is performed for RFID circuit element 10A derived from cartridge 20). It should also be noted that when such a stored value is not present, such a predetermined value may be employed which has been previously measured as a substantially suitable value.

Thereafter, a step S112, a step S113, a step S114, and a step S115 are similar to the step S102, the step S103, the step S104, and the step S105 of FIG. 9, respectively. That is to say, in the step S112, a "Scroll All ID" command is outputted to the signal processing circuit 52, so that a "TX_ASK" signal is produced, and is outputted to the transmission multiplying circuit 71. The "Scroll All ID" signal from the transmission multiplying circuit 71 is amplified by the variable transmission amplifier 72 based upon the "TX_PWR" signal from the control circuit 60; in the step S113, a rely signal is received and is acquired via the receiving portion 54 and the signal processing circuit 52. In the step S114, a judgment is made as to whether or not an ID of the reply signal received in the step S113 corresponds to 1. In the step S115, a judgment is made as to whether or not an ID of the reply signal is equal to zero.

When the judgment can be satisfied in the step S115, since the reply signal is zero, the process operation is advanced to a step S116. In this step S116, similar to the step S107 of FIG. 9, a predetermined adding operator "Pstep" for increasing the transmission power from the transmitting portion 53 in the stepwise manner is added to the value of the "TX_PWR" signal. On the other hand, when the judgment cannot be satisfied in the step S115, since the reply signals are two, or more signals, the process operation is advanced to a step S117. In this step S117, a predetermined subtracting operator "Pstep'" for decreasing the transmission power from the transmitting portion 53 in the stepwise manner is subtracted from the value of the "TX_PWR" signal. When either the step S116 or the step S117 is accomplished, the process operation is advanced to a step S118.

Similar to the step S106 of FIG. 9, in this step S118, a judgment is made as to whether or not the value of the "TX_PWR" signal at this time is smaller than, or equal to a previously set upper limit value (for example, upper limit value determined by Japanese electromagnetic wave law), and is larger than, or equal to 0 as an allowable upper limit. While the "TX_PWR" signal is smaller than the predetermined upper limit value, this judgment can be satisfied, and then, the process operation is returned to the step S112 in which a similar sequential operation is repeatedly carried out.

As previously explained, while the reply signal is 0, while the "TX_PWR" signal value is increased in the stepwise manner and the transmission power of the "Scroll All ID" signal from the transmitting portion 53 is increased in the stepwise manner, the process operations defined by step S112→step S113→step S114→step S115→step S116→step S118 are repeatedly executed. In the case that a total number of the reply signals from the RFID circuit elements 10A is increased larger than, or equal to 2, while these reply signals are larger than, or equal to 2, the processing route becomes step S115→step S117→step S118, so that the "TX_PWR" signal value is stepwisely decreased, whereas while the transmission power of the "Scroll All ID" signal from the transmitting portion 53 is stepwisely decreased, the process operations defined by step S112→step S113→step S114→step S115→step S116→step S118 are repeatedly executed. While these process operations are repeated, the reply signal becomes 1. When one piece of the RFID ID tag circuit element 10A to be accessed is specified, the judgment of the step S114 is satisfied, so that the process operation is advanced to a step S119. In this step S119, in order that the value of the "TX_PWR" signal related to the optimum transmission value (minimum necessary transmission value) at this time is used in the next step S111, this signal value is stored as "P1", and then, this flow operation is accomplished. In other words, this signal value "P1" is used in order that the RFID circuit element 10A is read which is subsequently derived from the cartridge 20 (refer to foregoing description).

In such a case that the value of the "TX_PWR" signal becomes larger than, or equal to the predetermined upper limit value, or becomes 0, while the above-described process operations defined by step S112→step S113→step S114→step S115→step S116→step S118 are repeatedly executed, the RFID circuit element 10A becomes empty, or the device becomes abnormal. Thus, the judgment of the step S118 cannot be satisfied, and then, the process operation is advanced to a step S120. In this step S120, an error display signal is outputted via the input/output interface 61 and the communication line 3 to either the terminal 5 or the general-purpose computer 6 so as to display a reading failure (error) corresponding thereto, and then, this flow operation is ended.

Also, the control circuit 60 (in particular, both step S114 and step S115 of flow operation shown in FIG. 11) constitutes a first judging means for judging as to whether or not an access operation to an IC circuit part after the access operation has been executed can succeed. Also, the control circuit 60 (in particular, step S116, step S117, step S118, and step S119 of flow operation indicated in FIG. 11) constitutes a first power control means for controlling a magnitude of transmission power from the first information transmitting means in response to a judging result for judging as to whether or not the access operation can succeed by the first judging means.

In this modification, even in such a case that while the transmission power from the transmitting portion 53 is gradually increased in the stepwise manner, a total number of the RFID circuit elements 10A to be recognized is suddenly increased from 0 piece to 2, or more pieces, conversely, the transmission power is stepwisely decreased in a finer step than that for increasing the transmission power until it is so judged that a total number of the RFID circuit element 10A to be recognized is 1 piece (if it becomes 0 piece, then control sequence similar to first control sequence is repeated). Since the above-described process operation is performed, the RFID tag information may be further surely read by the minimum necessary transmission power, as compared with that of the first embodiment (while avoiding error display in the case that total recognized number becomes from 0 piece to 2, or more pieces).

Also, after it is so judged in the step S114 that a total number of the reply signal is 1 piece and the minimum output value is determined, the value of the "TX_PWR" signal at this time is stored/learned as "P1" in the step S119 (namely, final output value of "Scroll All ID" signal as +first access information is stored/learned). As a consequence, when a reading operation is carried out from an RFID circuit element 10A which is subsequently derived from the cartridge 20 and is to be read, the control circuit 60 reads this stored/learned value P1 in the step S111, and can stepwise increase, or decrease the transmission power of the "TX_PWR" signal based upon this read value "P1" in either the step S116 or the step S117. As previously explained, since the stored/learned result obtained in the present tag information reading operation is reflected to the succeeding tag information reading operation, the minimum value of the transmission power can be easily determined within a short time, for instance, as compared with such a case that the transmission power of the "TX_PWR" signal is stepwise increased in an independent manner every time.

Figure 12:
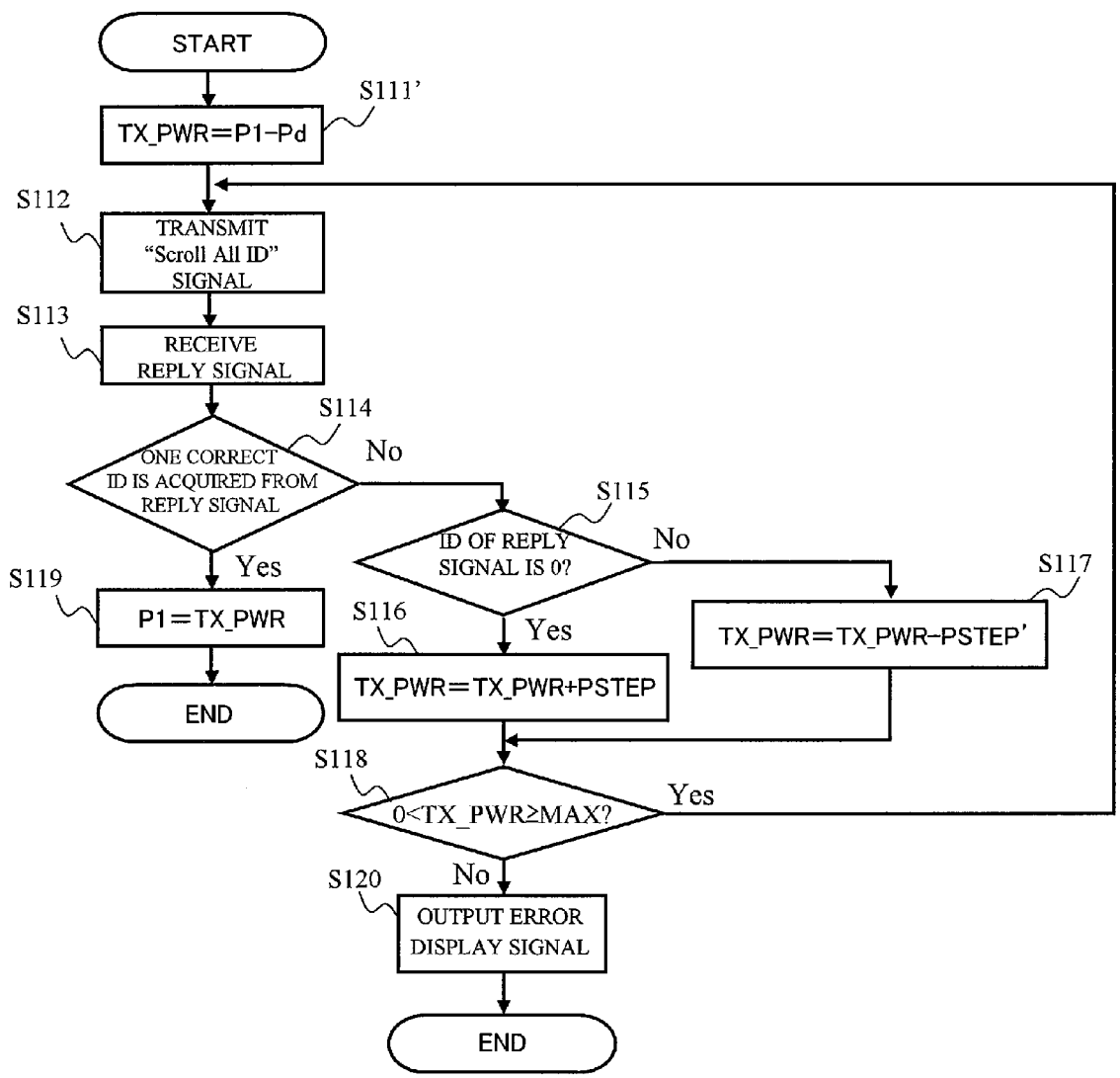
FIG. 12 is a flow chart for explaining RFID tag information reading sequential operations executed by the control circuit in a modification according to the first embodiment of the present invention with employment of a value smaller than P1.

In the above-described modification, while using the "P1" stored/learned in the step S119, the power value control operation during the next reading operation is commenced (step S111). However, the present invention is not limited only thereto, may be modified. That is, apparently, either a value smaller than P1 or a value slightly larger than P1 may be employed. FIG. 12 is a flow chart for indicating RFID tag information reading sequential operations executed by the control circuit 60 in a modification using the value smaller than P1, and corresponds to the flow charts shown in FIG. 9 and FIG. 11. In FIG. 12, instead of the step S111 of FIG. 11, another step S111' is employed. Also, the value of the "TX_PWR" signal for determining the amplification factor in the variable transmission amplifier 72 (refer to FIG. 5), which determines the power value of the transmission signal from the transmitting portion 53, is initialized not by the value P1, but by such a value (P1−Pd) smaller than P1. Other sequential operations are the same as those of FIG. 11. It should also be noted that this value "Pd" may be defined, for example, as a predetermined value which has been determined as a substantially suitable value by way of a measurement.

As previously explained, since the power control operation is carried out not from the previously stored value P1, but from a slightly smaller value, the minimum power value of the "TX_PWR" signal without leakage can be determined within a relatively short time.

As previously explained, such a power control operation that the previously stored value P1, the value larger than P1, and the value smaller than P1 are presently employed implies that the following control operation is carried out. That is, while the value corresponding to the previously stored/learned value of the "TX_PWR" signal is employed as the reference value of "TX_PWR" of the present power control, the power is stepwise increased based upon this reference value (namely, corresponding to that final power value is stepwise increased from reference value of stored/learned "Scroll All ID" signal).

It should also be understood that while the above-explained stored/learned value is employed in the next control operation, this technical idea may be applied not only to the modifications shown in FIG. 12 and FIG. 11, but also to the above-described first embodiment of the present invention explained by using FIG. 9. That is, in FIG. 9, when the judgment of the step S104 is satisfied, the flow operation is not immediately ended, but the value of "TX_PWR" signal at this time may be learned/stored as P1 similar to the step S119 of FIG. 11 and FIG. 12. Then, in the step S101 of FIG. 9, it is not set that TX_PWR=0, but such a step that TX_PWR=P1, or P1−Pd is newly provided similar to the step S112 of FIG. 11 and the step S111' of FIG. 12. Then, the learned value may be employed in the next control operation.

Also, while the stored value P1 is employed in the previous control operation, such a case has been exemplified that the power control operation is commenced based upon TX_PWR=P1, or P1−Pd during the present control operation. For instance, when the cartridge 20 is replaced, these stored/learned values may be preferably initialized (for example, P1=0). This reason is given as follows:

That is, when the cartridge 20 is replaced, since the sorts (shape of antenna 101, use frequency, communication protocol, manufacturing method of IC circuit part 100) of the RFID circuit elements 10A are changed (different), there are some possibilities that the validly of the previously stored/learned values is deteriorated. In such a case, for example, the transmission power from the transmitting portion 53 is started to be increased by employing such a value larger than the proper value of the "TX_PWR" signal by which one RFID circuit element 10A is originally specified so as to be accessed. As a result, the transmission power cannot be reached to the proper power value, and thus, there are some possibilities of the error end. As previously explained, when the cartridge 20 is replaced, if the stored/learned values are entirely initialized, then the above-explained defect may be firmly prevented.

Figure 13:
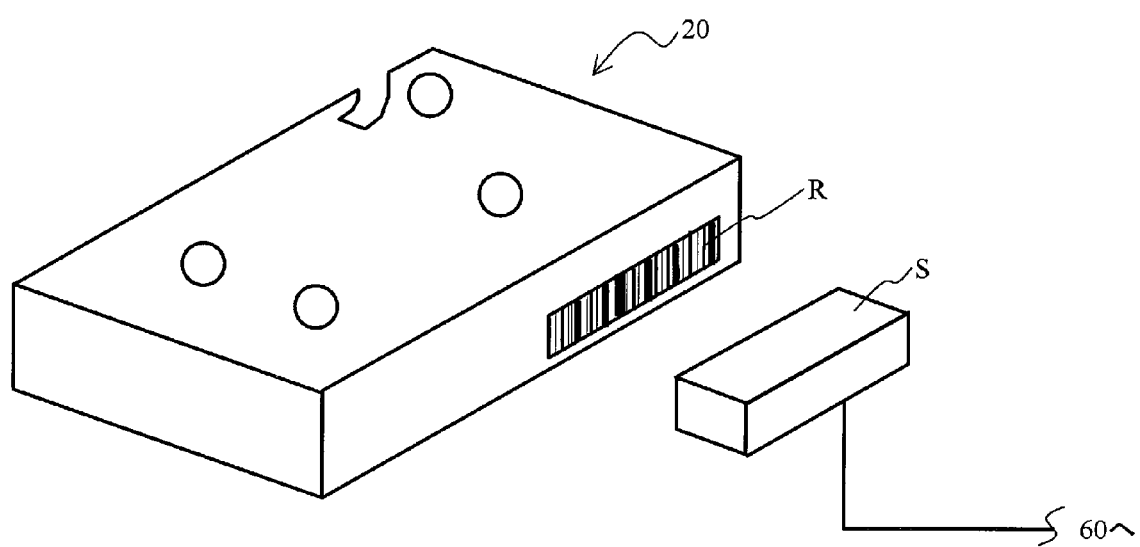
FIG. 13 is a perspective view for indicating a modification according to the first embodiment of the present invention, in which a value of P1 is described in a cartridge.

Furthermore, while considering the replacement of the cartridge 20, the value of P1 in this cartridge 20 may be alternatively described in the cartridge 20. FIG. 13 is a perspective view for indicating such a modification.

In FIG. 13, a readable information recording portion (bar code in this example) "R" has been provided on a side plane portion of the cartridge 20, and the above-explained value "P1" (otherwise, information directly coupled to P1) has been recorded on this information recording portion "R", while this value "P1" has been learned/stored in the information reading operation from the RFID circuit element 10A in this cartridge 20. Since the information recording portion "R" is scanned by a predetermined information reading device (so-called "bar code scanner" in this example) "S", the above-explained value P1 corresponding to this cartridge 20 is read by the control circuit 60 connected to the information reading device S. Similar to the above-described case, even in this modification, the above-explained defect occurred when the cartridge 20 is replaced can be prevented.

It should also be understood that the first embodiment and the modifications have exemplified such a case that the present invention has been applied to the manufacturing system for manufacturing the readable (writing operation is not allowed) RFID tag. However, the present invention is not limited only this case, but may be alternatively applied to another system for manufacturing an RFID tag in which RFID tag information is written in the IC circuit portion 100 of the RFID circuit element 10A. Such an embodiment will be explained.

A second embodiment of the present invention will now be explained with reference to FIG. 14 to FIG. 17. As explained above, this embodiment is such an embodiment that the present invention is applied to a system for manufacturing such an RFID tag that RFID tag information is written in the IC circuit part 100 of the RFID circuit element 10A. It should be understood that the same reference numerals shown in the first embodiment will be employed as those for denoting the same portions of the second embodiment, and explanations thereof are omitted.

Although not shown in detail and not explained, in the above-described arrangement of the RFID tag information communicating device 2 according to the first embodiment, the radio frequency circuit 51 plays a function capable of accessing (writing) the RFID tag information of the IC circuit unit 100 of the RFID circuit element 10A via the antenna 40, the crystal oscillator 56A, the PLL 56B, and the VCO 56C of this transmitting portion 53 functions as a carrier wave generating unit for generating a carrier wave which is used to access (write) the RFID tag information of the IC circuit part 100. Also, the signal processing circuit 52 functions as an access information producing means for producing first access information ("Program" signal, "Verify" signal, and the like, will be explained later) used to access the IC circuit part 100.

As previously explained with reference to FIG. 8, in this case, the print character 43, the access (writing operation in this case) ID of the RFID circuit element 10A, the address of the goods information, the storage destination address of the corresponding information are displayed on either the terminal 5 or the general-purpose computer 6. Then, the RFID tag information communicating device 2 is operated by operating either the terminal 5 or the general-purpose computer 6, the print character 43 is printed on the cover film 23, and such information as the write ID and the goods information is written in the IC circuit part 100.

Figure 14:
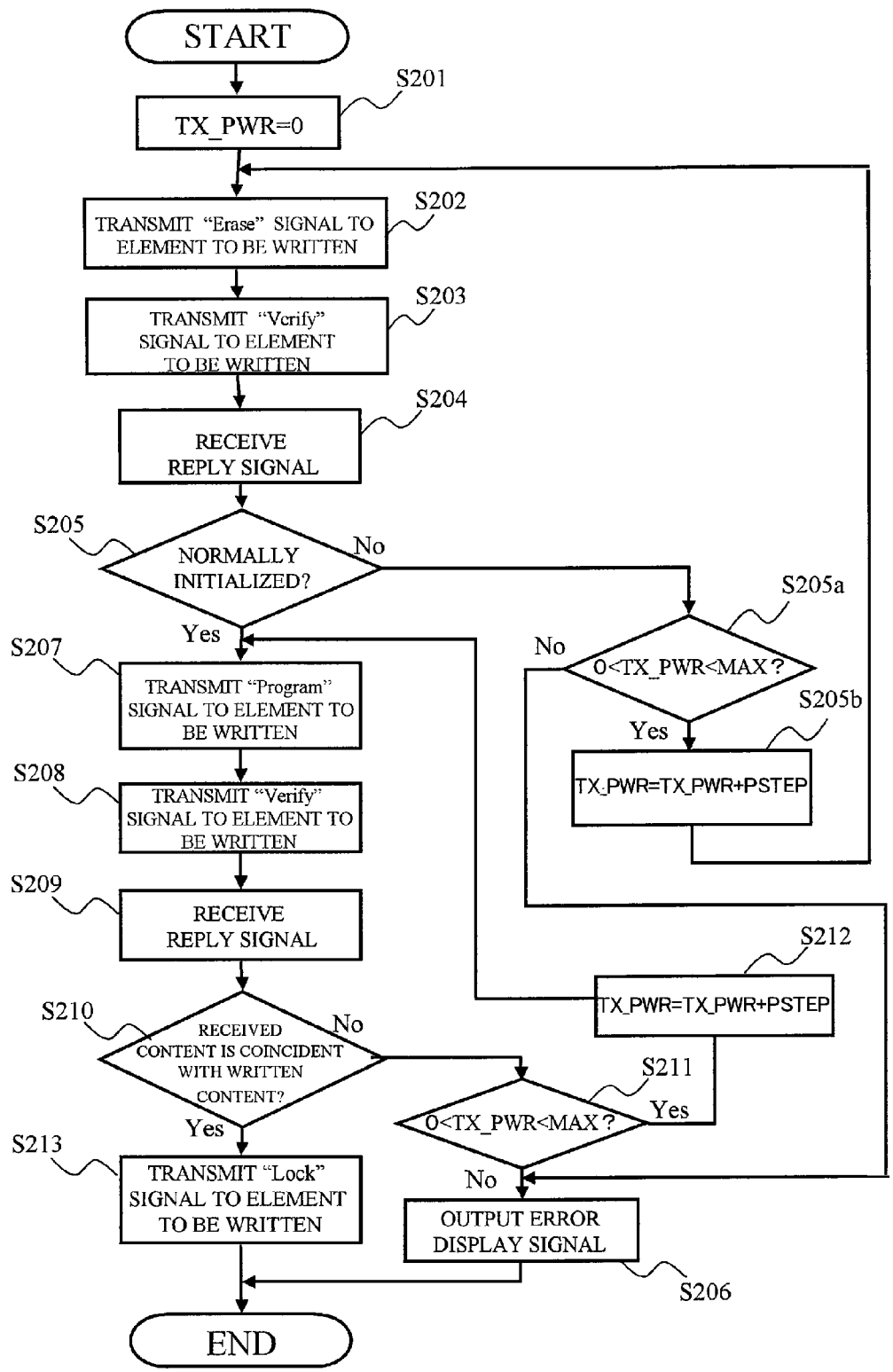
FIG. 14 is a flow chart for indicating RFID tag information writing sequential operations to an IC circuit part of an RFID circuit element, among control operations executed by a control circuit employed in an RFID tag information communicating device according to a second embodiment of the present invention.

FIG. 14 is a flow chart for indicating RFID tag information writing sequential operations to the IC circuit part 100 of the RFID circuit element 10A among the control operations executed by the control circuit 60 of this second embodiment.

In FIG. 14, when a writing operation of the RFID tag information communicating device 2 is carried out, this flow operation is commenced. This flow operation has been established as such an initial condition that the RFID circuit element 10A to be written (namely, circuit element 10A is present within accessible range) has been specified by way of a certain method including the known method, this writing subject is specified so as to transmit/receive a signal.

Firstly, in a step S201, a value of a "TX_PWR" signal is initialized as "0", while this "TX_PWR" signal determines an amplification factor in the variable transmission amplifier 72 which determines an output power value of a transmission signal from the transmitting portion 53 (refer to FIG. 5, similar to below-mentioned explanation).

Then, in a step S202, an "Erase" command is outputted to the signal processing circuit 52. In the signal processing circuit 52, a "TX_ASK" signal is produced based upon this command, and then, this "TX_ASK" signal is outputted to the transmission multiplying circuit 71. In the transmission multiplying circuit 71, the "TX_ASK" signal is amplitude-modulated so as to become an "Erase" signal. This "Erase" signal is furthermore amplified by such an amplification factor (since "TX_PWR"=0 in the beginning determined in first step S201, and amplification factor is equal to 0) determined based upon the "TX_PWR" signal entered from the control circuit 60 by the variable transmission amplifier 72, and the amplified "Erase" signal is transmitted via the transmit-receive splitter 55 and the antenna 40 to such an RFID circuit element 10A to be written, and the memory part 115 thereof is initialized.

Next, in a step S203, a "Verify" command is outputted to the signal processing circuit 52. The signal processing circuit 52 produces a "TX_ASK" signal based upon this command, and outputs this "TX_ASK" signal to the transmission multiplying circuit 71. In this transmission multiplying circuit 71, the corresponding amplitude-modulating operation is carried out to become a "Verify" signal. This "Verify" signal is furthermore amplified by an amplification factor based upon the "TX_PWR" signal entered from the control circuit 60 by the variable transmission amplifier 72, and then, the amplified "Verify" signal is transmitted via the transmit-receive splitter 55 and the antenna 40 to the RFID circuit element 10A to be written so as to prompt a reply operation.

In the subsequent step S204, a reply signal transmitted from the RFID circuit element 10A to be written is received via the antenna 40 in correspondence with the above-explained "Verify" signal, and is acquired via the radio frequency circuit 51 and the signal processing circuit 52.

Next, in a step S205, information stored in the memory part 115 of this RFID circuit element 10A is confirmed based upon the reply signal received in the step S204 in order to confirm as to whether or not the memory part 115 can be initialized under normal condition.

When the judgment cannot be satisfied, the process operation is advanced to a step S205a. In the step S205a, similar to the step S118 of FIG. 11 and FIG. 12, a judgment is made as to whether or not the value of the "TX_PWR" signal at this time is smaller than, or equal to a previously set upper limit value (for example, upper limit value determined by Japanese electromagnetic wave law), and is larger than, or equal to 0 as an allowable upper limit.

In the case that the "TX_PWR" signal is a small value but is not equal to 0, the judgment of the step S205a can be satisfied, and the process operation is advanced to a step S205b. In this step S205b, similar to the step S107 of FIG. 9 and the step S116 of FIG. 11 and FIG. 12, after a predetermined adding operator "Pstep" for increasing the transmission power from the transmitting portion 53 in the stepwise manner is added to the value of the "TX-PWR" signal, the process operation is returned to the step S202 in which a similar process operation is repeated.

When the judgment of the step S205a cannot be satisfied, and then, the process operation is advanced to a step S206. In this step S206, an error display signal is outputted via the input/output interface 61 and the communication line 3 to either the terminal 5 or the general-purpose computer 6 so as to display a writing failure (error) corresponding thereto, and then, this flow operation is ended.

In the case that the judgment of the step S205 can be satisfied, the process operation is advanced to a step S207 in which a "Program" command is outputted to the signal processing circuit 52. The signal processing circuit 52 produces a "TX_ASK" signal based upon this command, and outputs the "TX_ASK" signal to the transmission multiplying circuit 71. In this transmission multiplying circuit 71, the amplitude modulation corresponding thereto is carried out, so that this "TX_ASK" signal becomes a "Program" signal as access information (first access information) which is originally wanted to be written. This "Program" signal is further amplified by the variable transmission amplifier 72 by the amplification factor based upon the "TX_PWR" signal entered from the control circuit 60, and then, the amplified "Program" signal is transmitted via the transmit-receive splitter 55 and the antenna 40 to the RFID circuit element 10A to be written. As a result, the information is written in the memory part 115 thereof.

Thereafter, in a step S208, a "Verify" command as a confirmation instruction signal for confirming as to whether or not a writing operation is correctly carried out is outputted to the signal processing circuit 52. The signal processing circuit 52 produces a "TX_ASK" signal based upon this command, and outputs the "TX_ASK" signal to the transmission multiplying circuit 71. In this transmission multiplying circuit 71, the amplitude modulation corresponding thereto is carried out, so that this "TX_ASK" signal becomes a "Verify" signal as access information (first access information). This "Verify" signal is further amplified by the variable transmission amplifier 72 by the amplification factor based upon the "TX_PWR" signal entered from the control circuit 60, and then, the amplified "Verify" signal is transmitted via the transmit-receive splitter 55 and the antenna 40 to the RFID circuit element 10A to be written so as to prompt a reply operation.

Then, in a step S209, a reply signal as a first answer signal transmitted from the RFID circuit element 10A to be written in correspondence with the above-explained "Verify" signal is received via the antenna 40, and then, is acquired via the radio frequency circuit 51 and the signal processing circuit 52.

Next, in a step S210, the information stored in the memory part 115 of this RFID circuit element 10A is confirmed based upon the reply signal received in the step S209, and a judgment is made as to whether or not the predetermined information which is transmitted in the step S207 and is originally wanted to be written is stored in the memory part 115 under normal condition.

When the judgment cannot be satisfied, the process operation is advanced to a step S211. In the step S211, similar to the step S118 of FIG. 11 and FIG. 12, a judgment is made as to whether or not the value of the "TX_PWR" signal at this time is smaller than, or equal to a previously set upper limit value (for example, upper limit value determined by Japanese electromagnetic wave law), and is larger then, or equal to 0, as an allowable upper limit.

In the case that the "TX_PWR" signal is a small value but is not equal to 0, the judgment of the step S211 can be satisfied and the process operation is advanced to a step S212. In this step S212, similar to the step S107 of FIG. 9 and the step S116 of FIG. 11 and FIG. 12, after a predetermined adding operator "Pstep" for increasing the transmission power from the transmitting portion 53 in the stepwise manner is added to the value of the "TX_PWR" signal, the process operation is returned to the step S207 in which a similar process operation is repeated.

In such a case that the value of the "TX_PWR" signal becomes larger than, or equal to the above-explained predetermined upper limit value, or becomes 0 in the step S211, the judgment of the step S211 cannot be satisfied, and the process operation is advanced to the step S206 in which the writing failure (error) display is performed, and then, this flow operation is ended.

In such a case that the judgment of the step S210 can be satisfied, the process operation is advanced to a step S213. In this step S213, a "Lock" command is outputted to the signal processing circuit 52. The signal processing circuit 52 produces a "TX_ASK" signal based upon this command, and outputs this "TX_ASK" signal to the transmission multiplying circuit 71. In this transmission multiplying circuit 71, the corresponding amplitude-modulating operation is carried out to become a "Lock" signal. This "Lock" signal is furthermore amplified by an amplification factor based upon the "TX_PWR" signal entered from the control circuit 60 by the variable transmission amplifier 72, and then, the amplified "Lock" signal is transmitted via the transmit-receive splitter 55 and the antenna 40 to the RFID circuit element 10A to be written so as to prohibit that information is newly written in this RFID circuit element 10A, and then, this flow operation is ended.

In the above description, both the signal processing circuit 52 and the transmitting portion 53 of the radio frequency circuit 51 constitute an access information producing means for producing the first access information for accessing the RFID tag information of the IC circuit part, and further, the transmitting portion 53 also constitutes a first information transmitting means which transmits the first access information produced by the access information producing means via the device antenna to the tag antenna in the non-contact manner so as to access the RFID tag information of the IC circuit part.

Also, the signal processing circuit 52 and the transmitting portion 53 of the radio frequency circuit 51 constitute an access confirmation instruction transmitting means which transmits a confirmation instruction signal for confirming as to whether or not an access operation can be succeeded after the first access information has been transmitted by the first information transmitting means via the device antenna to the tag antenna in the non-contact manner.

Further, the control circuit 60 (in particular, both step S205 and step S210 of flow operation shown in FIG. 14) constitutes a first judging means for judging as to whether or not an access operation to an IC circuit part after the access operation has been executed can succeed. Also, the control circuit 60 (in particular, steps S205a and 205b, step S211 and step S212 of flow operation indicated in FIG. 14) constitutes a first power control means for controlling a magnitude of transmission power from the first information transmitting means in response to a judging result for judging as to whether or not the access operation can succeed by the first judging means. Also, the control circuit 60 (in particular, step S208 of flow operation shown in FIG. 14) constitutes an instruction transmission power control means for controlling transmission power from the access confirmation instruction transmitting means.

Figure 15:
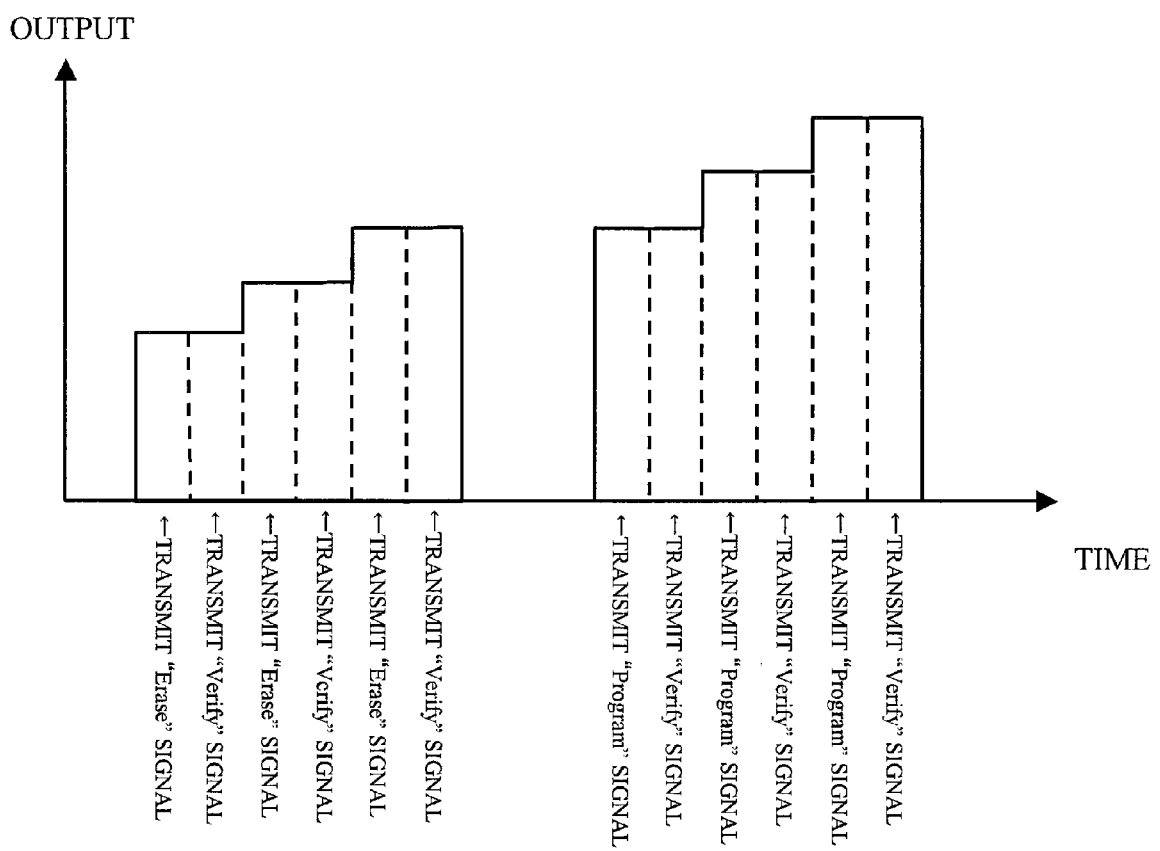
FIG. 15 is a diagram for schematically showing such a condition that transmission power of both a "Program" signal and a "Verify" signal from the transmitting portion are increased in a stepwise manner while a time elapses.

As previously explained, in this second embodiment, while the judgment cannot be satisfied in either the step S205 or the step S210, the "TX_PWR" signal value is stepwisely increased, and while the transmission power of either the "Erase" signal or the "Program" signal from the transmitting portion 53 is stepwisely increased, the process operations defined from the step S202→step S203→S204→step S205→step S205a→step S205b, or from the step S207→step S208→step S209→step S210→step S211→step S212 are repeatedly carried out. In other words, while the transmission power of the "Erase" signal outputted from the transmitting portion 53 becomes short and thus the initialization cannot be sufficiently performed, which erases the memory content of the memory part 115 of the RFID circuit element 10A, or while the transmission power of the "Program" signal becomes short and thus the writing operation cannot be preformed under normal operation, the above-described "TX_PWR" signal value is stepwisely increased. FIG. 15 is a diagram for schematically indicating such a condition that the transmission power of the "Erase" signal, the "Program" signal, and the "Verify" signal from the transmitting portion 35 are stepwisely increased in a time elapse. While the above-explained process operations are repeated, when the transmission power of the "Erase" signal and the "Program" signal becomes a certain high power value, and thus, the writing operation to the RFID circuit element 10A to be accessed is carried out under normal condition, the judgment of the step S210 can be satisfied, and then, the flow operation is accomplished through the step S213. As a consequence, the access operation can be carried out by the minimum required transmission power from the transmitting portion 53 as low as possible under which the writing operation can be carried out with respect to the RFID circuit element 10A which should be accessed (should be written in this example), so that the radio communicating operation can be carried out in a higher efficiency. As a result, similar to the first embodiment, the leakage power to the external region except for the mutual space between the device antenna 40 and the antenna 101 of the RFID circuit element 10A can be suppressed as mush as possible, and also, the power consumption can be suppressed.

Also, as previously explained, when the transmission power of the "Erase" signal and the "Program" signal is stepwisely increased, since the transmission power of the "Verify" signal is also made substantially equal to the transmission power of the "Erase" signal and the "Program" signal, there is such an effect that the control operation can be simplified, as compared with such a case that the control operations are performed based upon separate values (refer to below-mentioned modification).

In the above-described second embodiment, as explained in FIG. 15 and FIG. 14, while the control circuit 60 increases the power of the "Erase" signal, the "Program" signal, and the "Verify" signal in the stepwise manner, when the signals are transmitted, the control circuit 60 makes the values of the "TX_PWR" signals equal to each other in the respective steps (namely, values of "Erase" signal, "Program" signal, and "Verify" signal from transmitting portion 53 are made equal to each other). The present invention is not limited only to the above example, but may be modified. That is, the "Verify" signal may be controlled to become such a value different from the "Erase" signal and the "Program" signal.

Figure 16:
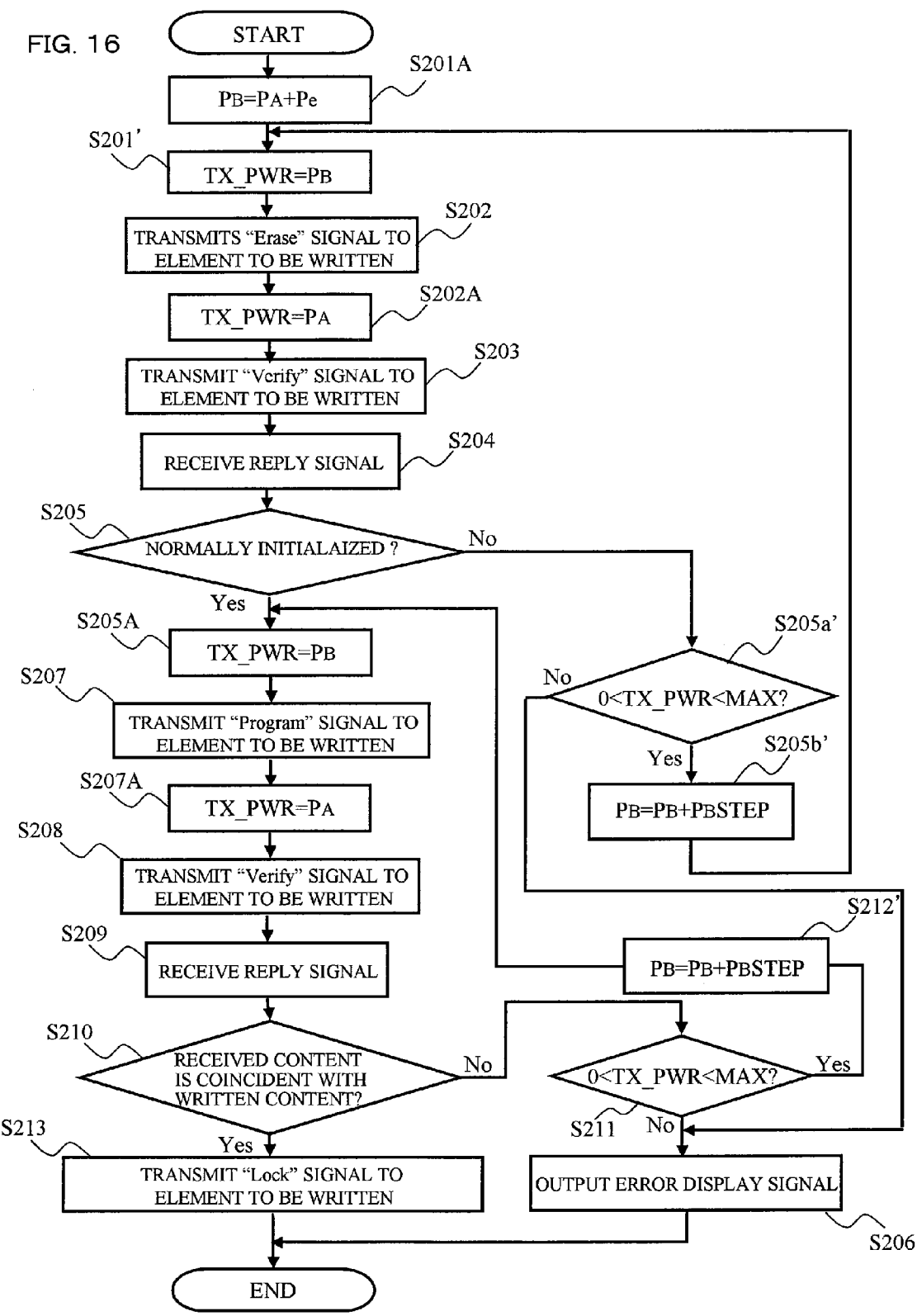
FIG. 16 is a flow chart for representing RFID tag information writing sequential operations executed by the control circuit in a modification according to the second embodiment of the present invention, which controls the "Verify" signal to become a value which is different from the "Program" signal.

FIG. 16 is a flow chart for showing RFID tag information writing sequential operations executed by the control circuit 60 in such a modification, and corresponds to the above-explained flow chart of FIG. 14.

In FIG. 16, in this flow chart, both a step S201A and a step S201' are provided instead of the step S201 of FIG. 14. In the step S201A, a value "PB" which becomes a reference power value of a "TX_PWR" signal is determined as PB=PA+Pe. In this formula, symbol "PA" indicates a predetermined constant value (for instance, value equal to P1 in first embodiment) which is relatively close to, for example, PB. Symbol "Pe" indicates, for example, a predetermined value which is determined as a previously measured suitable value similar to the previously explained "Pd." While the value of PB determined in this step S201A is employed, it is set TX_PWR=PB in the step S201'.

When the step S201' is ended, the process operation is advanced to a step S202 in which an "Erase" command is transmitted while it is set to TX_PWR=PB. Thereafter, in the newly provided step S202A, the value of the "TX_PWR" signal is again defined, so that it is set to TX_PWR=PA. In a step S203, a "Verify" command is outputted to the signal processing circuit 52. Thereafter, in a step S204, a reply signal transmitted from the RFID circuit element 10A to be written is received.

When the normal initialization is not carried out, the judgment of the step S205 cannot be satisfied, and then, the process operation is advanced to the step S205a'. In the step S205a', similar to the step S118 of FIG. 11 and FIG. 12, a judgment is made as to whether or not the value of the "TX_PWR" signal at this time is smaller than, or equal to a previously set upper limit value (for example, upper limit value determined by Japanese electromagnetic wave law), and is larger than, or equal to 0, as an allowable upper limit. In the case that the "TX_PWR" signal is a small value but is not equal to 0, the judgment of the step S205a' can be satisfied, and the process operation is advanced to a step S205b'. In this step S205b', after a predetermined adding operator "Pbstep" for increasing the transmission power from the transmitting unit 53 in the stepwise manner is added to the value of PB, the process operation is returned to the step S201' in which a similar process operation is repeated. When the judgment of the step S205a' cannot be satisfied, and then, the process operation is advanced to a step S206. In this step S206, an error display signal is outputted.

When the normal initialization is carried out, the process operation is advanced from the step S205 to the newly provided step S205A in which the value of the "TX_PWR" signal is again defined as TX_PWR=PB. Then, in a step S207, a "Program" command is outputted to the signal processing circuit 52. In the signal processing circuit 52, a "TX_ASK" signal is produced based upon this command, and then, this "TX_ASK" signal is outputted to the transmission multiplying circuit 71. In the transmission multiplying circuit 71, the "TX_ASK" signal is amplitude-modulated so as to become a "Program" signal. This "Program" signal is furthermore amplified by such an amplification factor determined based upon the "TX_PWR" signal (TX_PWR=PB at this time) and the amplified "Program" signal is transmitted to such an RFID circuit element 10A to be written.

When this step S207 is ended, the process operation is advanced to the newly provided step S207A. In the step S207A, the value of the "TX_PWR" signal is again defined, so that it is set to TX_PWR=PA.

When this step S207A is ended, the process operation is advanced to a step S208. The step S208 to a step S211 are similar to those of the above-explained second embodiment of FIG. 14. That is to say, in a step S208, a "Verify" command is outputted to the signal processing circuit 52. The signal processing circuit 52 produces a "TX_ASK" signal based upon this command, and outputs this "TX_ASK" signal to the transmission multiplying circuit 71. In this transmission multiplying circuit 71, the corresponding amplitude-modulating operation is carried out to become a "Verify" signal. This "Verify" signal is furthermore amplified by an amplification factor based upon the "TX_PWR" signal entered from the control circuit 60 by the variable transmission amplifier 72, and then, the amplified "Verify" signal is transmitted to the RFID circuit element 10A to be written so as to prompt a reply operation. The "TX_PWR" signal becomes TX_PWR=PA at this time, as indicated in the previous step S207A.

Thereafter, a reply signal is received which is transmitted from the RFID circuit element 10A to be written in a step S209. In a step S210, a judgment is made as to whether or not a writing operation is carried out under normal condition. When the judgment cannot be satisfied, another judgment is made as to whether or not the value of the "TX_PWR" signal at this time is smaller than, or equal to a previously set upper limit value and is larger than, or equal to 0, as an allowable upper limit in a step S211.

In this flow operation, instead of the step S212 of the flow chart of FIG. 14, a step S212' is provided. That is to say, in the case that the "TX_PWR" signal is a small value but is not equal to 0, the judgment of the step S211 can be satisfied, and the process operation is advanced to a step S212'. In this step S212', after a predetermined adding operator "Pbstep" for increasing the transmission power from the transmitting unit 53 in the stepwise manner is added to the value of PB, the process operation is returned to the step S205A in which a similar process operation is repeated. When the judgment of the step S210 cannot be satisfied, and then, the process operation is advanced to a step S213 which is similar to that of FIG. 14.

Figure 17:
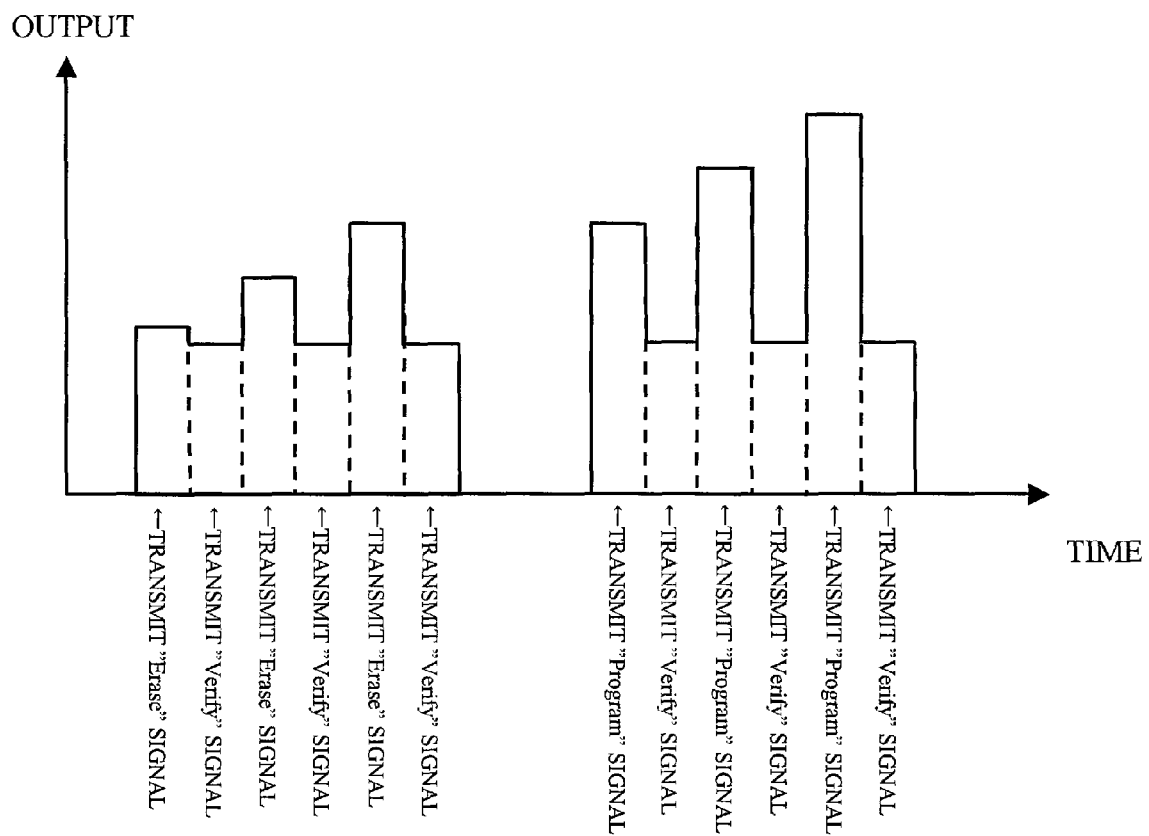
FIG. 17 is a diagram for schematically showing such a condition as to transmission power of both a "Program" signal and a "Verify" signal from the transmitting circuit.

Similar to FIG. 14, in accordance with the above-explained flow operation, in either the step S205 or the step S210, while the judgment cannot be satisfied (namely, either initiating operation or writing operation is not performed under normal condition) and the value of PB is stepwisely increased, the process operations defined from the step S201'→step S202→step S202A→step S203→step S204→step S205→step S205a→step S205b' are repeatedly executed, or the process operations defined from the step S205A→step S207→step S207A→step S208→step S209→step S210→step S211→step S212' are repeatedly executed. At this time, since the process operations defined in the step S205b' and the step 201', or the step S212' and the step S205A are executed, the transmission power value of "TX_PWR" signal when either the "Erase" signal of the step S202 or the "Program" signal of the step S207 is transmitted is stepwisely increased (namely, transmission power value of "Erase" signal, or "Program" signal is stepwisely increased), whereas the transmission power value of "TX_PWR" signal when the "Verify" signal of the step S202A, or the step S207A, the step S203, or step S208 is transmitted is continuously constant (namely, transmission power value of "Verify" signal is continuously constant). FIG. 17 is a diagram for schematically showing conditions of transmission power of the "Erase" signal, the "Program" signal, and "Verify" signal from the transmitting portion 53 at this time. When the transmission power of the "Erase" signal and the "Program" signal become certain magnitudes while these process operations are repeated and the RFID circuit element 10A to be accessed are initialized and written under normal condition, the judgment of the step S210 can be satisfied similar to FIG. 14, and then, the flow operation is accomplished via a step S213.

It should be understood that in this modification, the control circuit 60 (in particular, step S207A of flow chart shown in FIG. 16) constitutes an instruction transmission power control means for controlling transmission power from the access confirmation instruction transmitting means.

Also, in this modification, an effect similar to that of the second embodiment may be achieved. This modification may own the above-described other effects.

That is, in such a case that a writing operation is performed with respect to the IC circuit part 100 of the RFID circuit element 10A in the non-contact manner in the radio communicating operation, the magnitude (communication strength) of the transmission power of the "Program" signal required to write the information is different from the magnitude of the transmission power required from the device side when the "Verify" signal is thereafter transmitted. Normally, the latter-mentioned transmission power may be made lower. In this modification, in response to this transmission power requirement, in order to write the information by the minimum required transmission power, as previously explained, the transmission power when the "Program" signal is transmitted is stepwisely increased so as to seek this power value, whereas the transmission power when the "Verify" signal is transmitted is set to the substantially constant value, or a predetermined value. As a consequence, the leakage power and the power consumption related to the transmission of the "Verify" signal can be suppressed, and also, the process operation can be carried out in a high speed.

As apparent from the foregoing description, the method for using the stored/learned value in the next control operation, which has been explained in the modification of the first embodiment with reference to FIG. 12 and FIG. 11, may be similarly employed in the above-explained modification of the second embodiment. That is, in FIG. 16, when the judgment of the step S213 can be satisfied, the flow operation is not immediately ended, but the value of PB at this time may be learned/stored as, for example, PA in a similar manner to the step S119 of FIG. 11 and FIG. 12. Then, in the step S201A of FIG. 16, since it is so defined as PB=PA+Pe by employing this value PA, the value learned in the above manner may be employed in the next control operation.

Alternatively, in the step S201 of FIG. 14 of the second embodiment, the value PA may be employed as "TX_PWR=PA." In this alternative case, not only the previously stored value of "PA" itself may be employed, but also a value larger than PA (refer also to step S201A of FIG. 16), and another value smaller than PA may be employed in the present power control operation. These control operations must be recognized as the following control operations. That is, while such a value corresponding to the previously stored/learned value of "TX_PWR" signal is employed as the reference value of "TX_PWR" for the present power control operation, the power is stepwisely increased from this reference value (namely, which corresponds to such a control that final power value is stepwisely increased from reference value of stored/learned "Program" signal).

The above-described second embodiment has exemplified such a case that the value PA stored in the preceding control operation is employed when the power control operation is commenced in the present control operation. Furthermore, as same as the above case, when the cartridge 20 is replaced, these stored/learned values may be initialized (for example, PA=0). Also, as explained in the modification using FIG. 13, the value of PA in this cartridge 20 may be alternatively described in the cartridge 20. A similar effect may be achieved in these alternative cases.

As previously explained, in the second embodiment and the modifications thereof, the following initial condition is established that the RFID circuit element 10A to be written is specified by a certain method containing the known method. In this case, the reading sequence explained in the first embodiment may have such a similar meaning that one RFID circuit element 10A is specified, since the power control is carried out in order that the reply signal responding to the "Scroll All ID" signal finally becomes 1 signal. As a consequence, the control sequential operations in the first embodiment may be employed so as to specify an RFID tag which constitutes the initial condition of the second embodiment. Such an embodiment will now be explained.

A third embodiment of the present invention will now be described with reference to FIG. 18 to FIG. 20. As previously explained, this third embodiment corresponds to such an embodiment that an RFID circuit element 10A to be written is specified by employing the method of the first embodiment, and then, RFID tag information is written with reference to an IC circuit part 100 of this specified RFID circuit element 10A by employing the method of the second embodiment. It should be understood that the same reference numerals shown in either the first embodiment or the second embodiment will be employed as those for denoting the same structural portions of the third embodiment, and explanations thereof are omitted.

Figure 18:
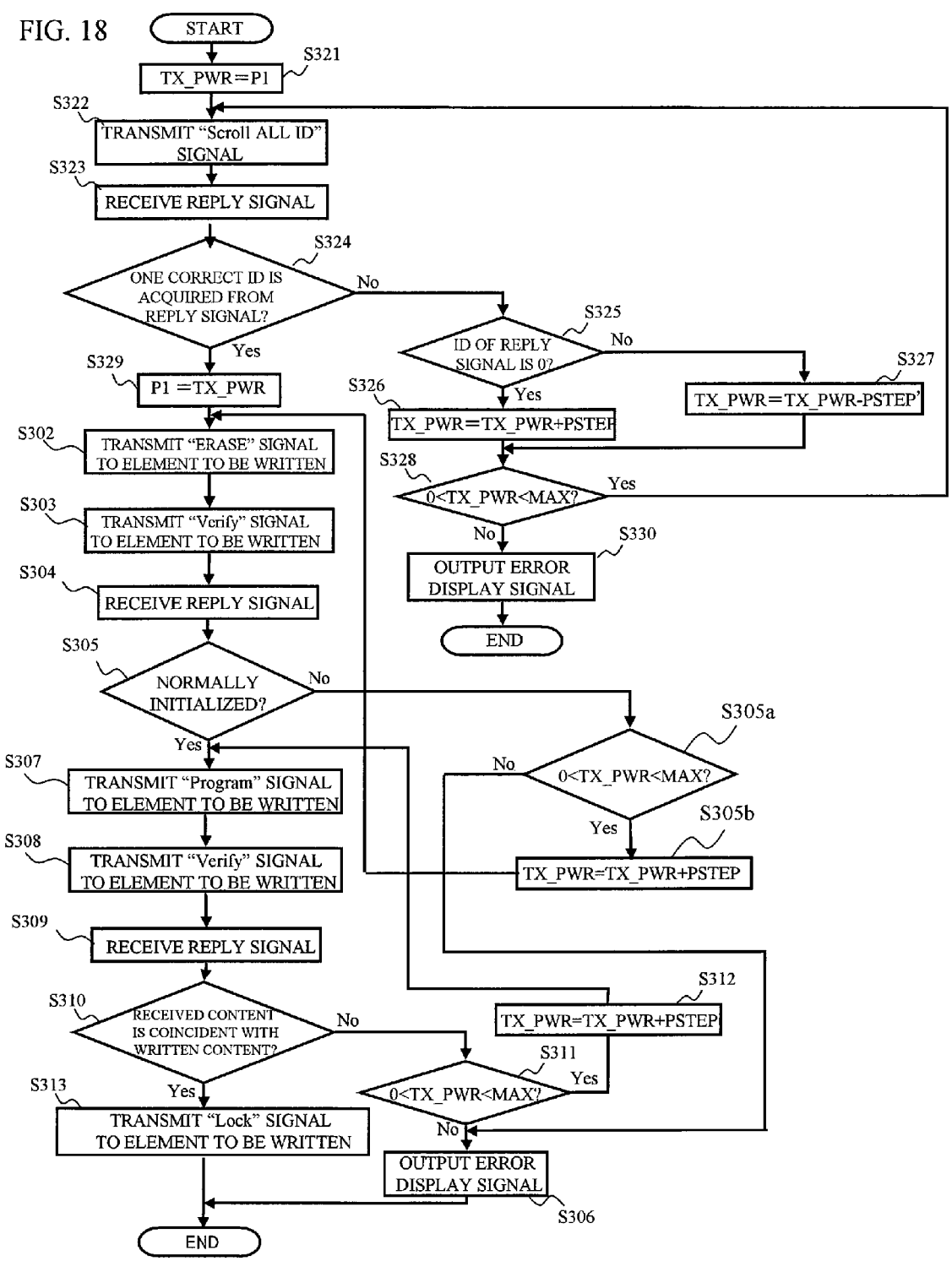
FIG. 18 is a flow chart for representing a specifying operation of an RFID circuit element to be written, and an RFID tag information writing sequential operation of this specified RFID circuit element, among control operations executed by a control circuit in an RFID tag information communicating device according to a third embodiment of the present invention.

FIG. 18 is a flow chart for representing such sequential process operations that the RFID circuit element 10A to be written is specified, and then, the RFID tag information is written into the IC circuit part 100 of this specified RFID circuit element 10A among control operations executed by a control circuit 60 in an RFID tag information communicating device 2 of this third embodiment.

In FIG. 18, when a writing operation of the above-explained RFID tag information communicating device 2 is carried out, this flow operation is commenced. It should be noted that process operations defined from a step S321 via a step S322, a step S323, a step S324, a step S325, a step S326, a step S317, a step S328, a step S329 up to a step S330 are similar to the above-described step S111 to step S120, respectively, shown in the modification of FIG. 11.

That is, in the first step S321, a value of a "TX_PWR" signal is initialized as "P1." Similar to the modification of FIG. 11, as to this value "P1", in the case that a tag specifying control operation (will be explained later) has already been carried out to store this signal value "P1" as the optimum value (refer to below-mentioned step S329), this stored value is employed during the previous control operation (namely, when one preceding reading operation is performed for RFID circuit element 10A derived from cartridge 20). It should also be noted that such a predetermined value may be employed which has been previously measured as a substantially suitable value.

Thereafter, in the step S322, a "Scroll All ID" command is outputted to the signal processing circuit 52, and in correspondence with a "TX_ASK" signal from the signal processing circuit 52. In the transmission multiplying circuit 71, the "TX_ASK" signal is amplitude-modulated so as to become a "Scroll All ID" signal as access information (second access information). This "Scroll All ID" signal is furthermore amplified by such an amplification factor ("TX_PWR"=P1 in the beginning) determined based upon the "TX_PWR" signal, and the amplified "Scroll All ID" signal is transmitted. If there is an RFID circuit element 10A in an accessible range, then this "Scroll All ID" signal requests this element 10A to prompt a reply operation.

Next, in the step S323, a reply signal as a first reply signal transmitted from the RFID circuit element 10A in the accessible range is received via the antenna 40, and then, is acquired by the receiving portion 54 and the signal processing circuit 52.

Thereafter, in the step S324, a judgment is made as to whether or not one correct ID can be acquired based upon the known method using CRC (error detecting code) of the reply signal received in the step S323. When the judgment cannot be satisfied, then the process operation is advanced to the step S325. In the step S325, another judgment is made as to whether or not an ID of the reply signal received is equal to zero, depending upon such a condition as to whether or not an RSSI power value of this received reply signal is smaller than, or equal to a predetermined value.

When this judgment of the step S325 can be satisfied, the process operation is advanced to the step S326. In this step S326, similar to the step S116 of FIG. 11, a predetermined adding operator "Pstep" is added to the value of the "TX_PWR" signal. On the other hand, when the judgment cannot be satisfied in the step S325, the process operation is advanced to the step S327. In this step S327, a predetermined subtracting operator "Pstep'" is subtracted from the value of the "TX_PWR" signal.

When either the steps S326 or the step S327 is accomplished, the process operation is advanced to the step S328. Similar to the step S118 of FIG. 11, in this step S328, a judgment is made as to whether or not the value of the "TX_PWR" signal at this time is smaller than, or equal to a previously set upper limit value, and is larger than, or equal to 0 as an allowable upper limit. While the "TX_PWR" signal is smaller than the predetermined upper limit value, this judgment can be satisfied, and then, the process operation is returned to the step S322 in which a similar sequential operation is repeatedly carried out.

As previously explained, while the reply signal is 0, the "TX_PWR" signal value is increased from P1 in the stepwise manner, and while the transmission power of the "Scroll All ID" signal from the transmitting portion 53 is increased in the stepwise manner, the process operations defined by the step S322 to step S325→step S326→step S328 are repeatedly executed. In the case that a total number of the reply signals increased larger than, or equal to 2, while these reply signals are larger than, or equal to 2, "TX_PWR" signal value is stepwisely decreased, and while the transmission power of the "Scroll All ID" signal from the transmitting portion 53 is stepwisely decreased, the process operations defined by the step S32 to S325→step S327→step S328 are repeatedly executed. While these process operations are repeated, the reply signal becomes 1. When one piece of the RFID ID tag circuit element 10A to be accessed is specified, the judgment of the step S324 is satisfied, so that the process operation is advanced to a step S329.

In this step S329, in order that the value of the "TX_PWR" signal related to the minimum transmission value as long as an RFID tag at this time can be specified (recognized) is used in the next step S321, this signal value is stored as "P1" (in other words, this signal value is used so as to specify (recognize) RFID circuit element 10A which is subsequently derived from cartridge 20, refer to foregoing decryption). When this step S329 is ended, the process operation is advanced to a step S302.

It should also be noted that process operations defined from a step S302, a step S303, a step S304, a step S305, a step S306, a step S307, a step S308, a step S309, a step S310, a step S311, a step S312, and a step S313 are similar to those defined from the step S202 to the step S213 shown in the above-described modification of FIG. 14.

That is to say, in the step S302, an "Erase" command is outputted to the signal processing circuit 52. In the signal processing circuit 52, a "TX_ASK" signal is produced, and in the transmission multiplying circuit 71, the "TX_ASK" signal is amplitude-modulated so as to become an "Erase" signal. This "Erase" signal is amplified by such an amplification factor ("TX_PWR"=P1 in this time in the step S329) determined based upon the "TX_PWR" signal by the variable transmission amplifier 72, and the amplified "Erase" signal is transmitted to such an RFID circuit element 10A to be written which is specified in the above-explained step S321 to step S329 (this specifying operation will be similarly carried out in the below-mentioned descriptions) so as to initialize the memory part 115.

Thereafter, in the step S303, a "Verify" command is outputted to the signal processing circuit 52. The signal processing circuit 52 produces a "TX_ASK" signal based upon this command. In the transmission multiplying circuit 71, the corresponding amplitude-modulating operation is carried out to become a "Verify" signal. This "Verify" signal is amplified by the amplification factor based upon the "TX_PWR" signal by the variable transmission amplifier 72, and then, the amplified "Verify" signal is transmitted to the RFID circuit element 10A to be written so as to prompt a reply operation. Then, in the subsequent step S304, a reply signal transmitted from the RFID circuit element 10A to be written is acquired, and then in the step S305, a check is made as to whether or not the memory part 115 can be initialized under normal condition.

When the judgment cannot be satisfied, the process operation is advanced to a step S305a. In the step S305a, a judgment is made as to whether or not the value of the "TX_PWR" signal at this time is smaller than, or equal to a previously set upper limit value (for example, upper limit value determined by Japanese electromagnetic wave law), and is larger than, or equal to 0 as an allowable upper limit.

In the case that the "TX_PWR" signal is a small value but is not equal to 0, the judgment of the step S305a can be satisfied, and the process operation is advanced to a step S305b. In this step S305b, after a predetermined adding operator "Pstep" for increasing the transmission power from the transmitting portion 53 in the stepwise manner is added to the value of the "TX_PWR" signal, the process operation is returned to the step S306 in which a similar process operation is repeated. When the judgment of the step S305a cannot be satisfied, and then, the process operation is advanced to a step S306. In this step S306, an error display is performed.

In the case that the judgment of the step S305 can be satisfied, the process operation is advanced to a step S307 in which a "Program" command is outputted to the signal processing circuit 52. The signal processing circuit 52 produces a "TX_ASK" signal based upon this command. In this transmission multiplying circuit 71, the amplitude modulation corresponding thereto is carried out, so that this "TX_ASK" signal becomes a "Program" signal as access information (first access information). This "Program" signal is amplified by the variable transmission amplifier 72 by the amplification factor based upon the "TX_PWR" signal, and then, the amplified "Program" signal is transmitted to the RFID circuit element 10A to be written. As a result, predetermined information is written in the memory part 115 thereof.

Thereafter, in a step S308, a "Verify" command as a confirmation instruction signal outputted to the signal processing circuit 52. The signal processing circuit 52 produces a "TX_ASK" signal based upon this command. In the transmission multiplying circuit 71, the amplitude modulation corresponding thereto is carried out, so that this "TX_ASK" signal becomes a "Verify" signal as first access information. This "Verify" signal is amplified by the variable transmission amplifier 72 by the amplification factor based upon the "TX_PWR" signal, and then, the amplified "Verify" signal is transmitted to the RFID circuit element 10A to be written so as to prompt a response operation.

Then, in a step S309, a reply signal as a first answer signal transmitted from the RFID circuit element 10A to be written is received, and then, is acquired. Thereafter, in a step S310, a judgment is made as to whether or not the predetermined information is written under normal condition. When the judgment cannot e satisfied, the process operation is advanced to a step S311. In the step S311, a judgment is made as to whether or not the value of the "TX_PWR" signal at this time is smaller than, or equal to a previously set upper limit value, and is larger then, or equal to 0, as an allowable upper limit.

In the case that the "TX_PWR" signal is a small value but is not equal to 0, the judgment of the step S311 can be satisfied and the process operation is advanced to a step S312. In this step S312, after a predetermined adding operator "Pstep" is added to the value of the "TX_PWR" signal, the process operation is returned to the step S307 in which a similar process operation is repeated. In such a case that the value of the "TX_PWR" signal becomes larger than, or equal to the above-explained predetermined upper limit value, or becomes 0 in the step S311, the judgment of the step S311 cannot be satisfied, and the process operation is advanced to the step S306 in which an error display is performed, and then, this flow operation is ended.

In such a case that the judgment of the step S310 can be satisfied, the process operation is advanced to a step S313. In this step S313, a "Lock" command is outputted to the signal processing circuit 52. The signal processing circuit 52 produces a "TX_ASK" signal. In this transmission multiplying circuit 71, the corresponding amplitude-modulating operation is carried out to becomes a "Lock" signal. This "Lock" signal is amplified by an amplification factor based upon the "TX_PWR" signal by the variable transmission amplifier 72, and then, the amplified "Lock" signal is transmitted to the RFID circuit element 10A to be written so as to prohibit that information is newly written in this RFID circuit element 10A, and then, this flow operation is ended.

In the above-described explanations, the "Scroll All ID" signal transmitted in the step S322 corresponds to the second access information for confirming as to whether or not the accessible (writable in this example) RFID circuit element is present in the communication range. The transmitting portion 53 also constitutes the second information transmitting means which transmits the second access information via the device antenna to the tag antenna in the non-contact manner. Also, the receiving portion 54 constitutes the second information receiving means which receives the second reply signal transmitted from the IC circuit part in response to the second access information via the tag antenna by the device antenna in the non-contact manner, and then reads the received second reply signal.

Also, the control circuit 60 (in particular, steps S324 and S325 of flow operation shown in FIG. 18) constitutes the second judging means for judging a total number of the accessible RFID circuit elements present in the communication range by checking as to whether or not the reply signal read by the second information receiving means is present. Also, the control circuit 60 (in particular, step S326, step S327, and step S328 of FIG. 18) constitutes the second power control means which controls the magnitude of the transmission power from the second information transmitting means in response to the judgment result obtained by this second judging means.

As previously explained, in this third embodiment, in the tag specifying sequential operations, similar to the first embodiment, such a control operation is carried out that while the reply signal is zero piece, the value of the "TX_PWR" signal is stepwisely increased; and while the reply signals are increased to become larger than, or equal to 2 pieces, the value of the "TX_PWR" signal is stepwisely decreased, and the transmission power of the "Scroll All ID" signal from the transmitting portion 35 is stepwisely decreased. While these control operations are repeatedly carried out, a total number of the reply signal becomes 1 piece, and if one RFID circuit element 11A to be accessed is specified, then the value of the "TX_PWR" signal related to the optimum transmission value (minimum required transmission power) at this time is stored as "P1" in order to use this value of P1 in the next process operation.

Thereafter, in the writing sequential operation to the specified tag in accordance with the above-described tag specifying operation, while the transmission power of the "Erase" signal becomes insufficient so that the initialization cannot be sufficiently carried out, and while the transmission power of the "Program" signal from the transmitting portion 53 becomes insufficient so that the writing operation is not performed under normal operation, the value of the "TX_PWR" signal is stepwisely increased, and while either the transmission power of the "Erase" signal or the transmission power of the "Program" signal from the transmitting portion 53 are stepwisely increased, either the process operations defined from the step S302→step S303→step S304→step S305→step S305a→step S305b, or the process operations defined from the step S307 through the step S310→step S311→step S312 are repeated. While these process operations are repeatedly carried out, if the transmission power of the "Erase" signal and of the "Program" signal are increased to some extent and the writing operation to the RFID circuit element 10A to be accessed is carried out under normal operation, then the judgment of the step S310 can be satisfied, and the process operation is advanced via the step S313, and then, the flow operation is accomplished.

Figure 19:
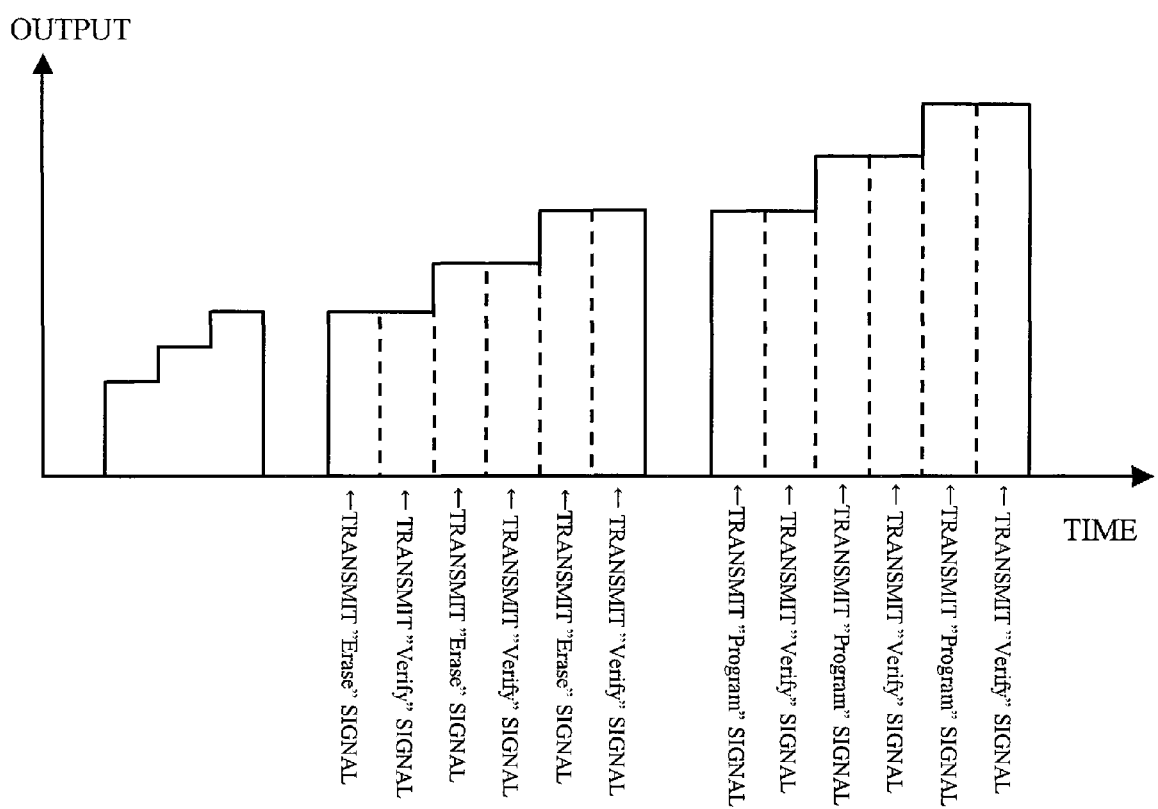
FIG. 19 is a diagram for schematically showing such a condition that transmission power of a "Scroll All ID" signal, a "Program" signal, and a "Verify" signal from the transmitting circuit are increased in a stepwise manner while a time elapses.
Figure 20:
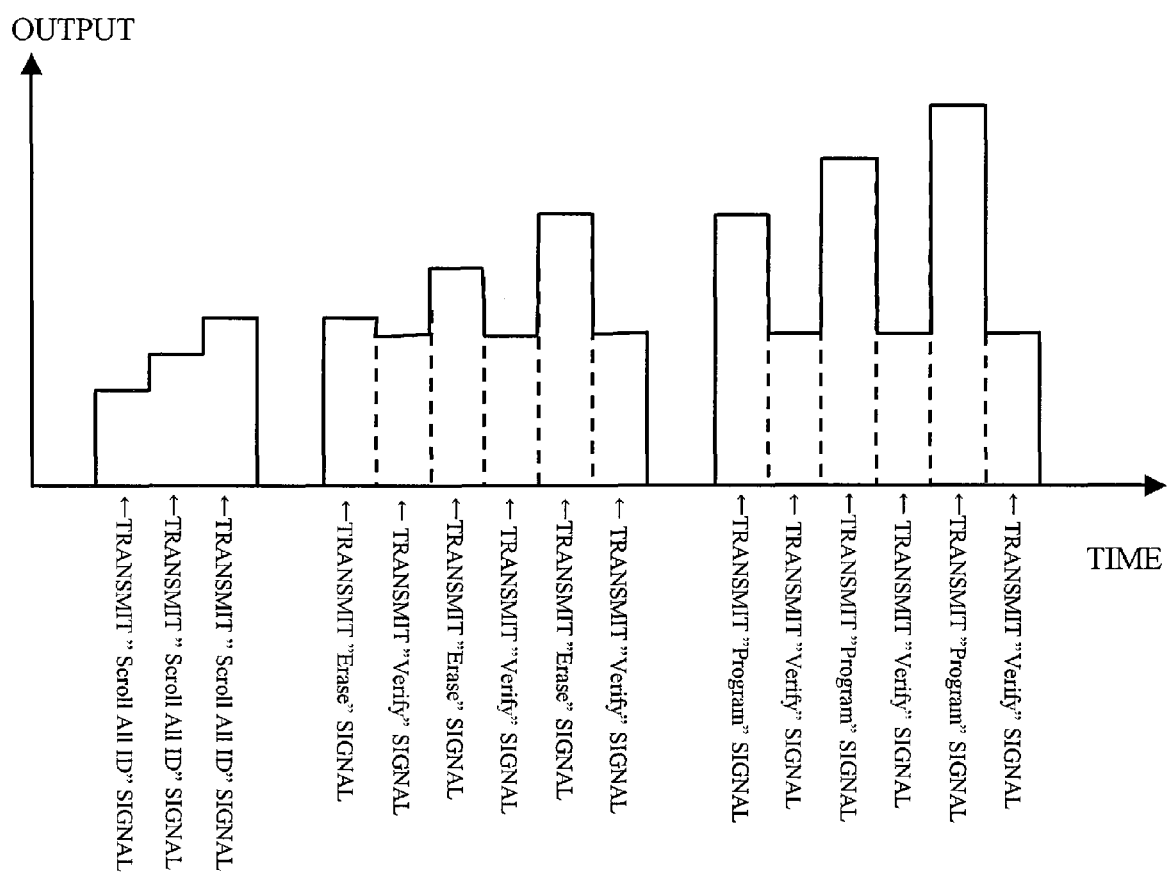
FIG. 20 is a diagram for schematically showing behavior of transmission power of both the "Program" signal and the "Verify" signal from the transmitting portion in a modification according to the third embodiment of the present invention, in which the "Program" signal is increased in the stepwise manner whereas the "Verify" signal is made substantially constant.

FIG. 19 is a diagram for schematically showing such a condition that the transmission power of the "Scroll All ID" signal, "Erase" signal, and "Verify" signal from the transmitting portion 53; and also, the transmission power of the "Program" signal and the "Verify" signal from the transmitting portion 53 are stepwisely increased in a time elapse.

In this third embodiment with employment of the above-explained arrangement, an RFID circuit element 10A is specified with the minimum required transmission power in accordance with a basic idea similar to that of the first embodiment; and then, such a specified RFID circuit element 10A to be written can be accessed with the minimum required transmission power from the transmitting portion 53 as low as possible as long as the writing operation can be carried out similar to the second embodiment. As a result, the radio communicating operation can be realized in the higher efficiency.

Also, similar to the modification of the first embodiment related to FIG. 11 and FIG. 12, when the tag specifying operation is performed, even in such a case that a total number of the RFID circuit elements 10A to be recognized is suddenly increased from 0 piece to 2, or more pieces, conversely, the transmission power is stepwisely decreased until it is so judged that a total number of the RFID circuit element 10A to be recognized is 1 piece. Since the above-described process operation is performed, the RFID tag specifying operation may be surely performed by the minimum necessary transmission power.

Also, after it is so judged in the step S324 that a total number of the replay signal is 1 piece and the minimum output value is determined, the value of the "TX_PWR" signal at this time is stored/learned as "P1" (namely, final output value of "Scroll All ID" signal as second access information is stored/learned). As a consequence, when a specifying operation is carried out for an RFID circuit element 10A which is subsequently derived from the cartridge 20, the control circuit 60 reads this stored/learned value P1 in the step S321, and can stepwisely increased, or decrease the transmission power of the "TX_PWR" signal based upon this read value "P1" in either the step S326 or the step S327. As previously explained, since the stored/learned result obtained in the present tag specifying operation is reflected to the succeeding tag specifying operation, the minimum value of the transmission power can be easily determined within a short time, for instance, as compared with such a case that the transmission power of the "TX_PWR" signal is stepwisely increased in an independent manner every time the tag specifying operation is performed.

Also, in this third embodiment, in the RFID tag information writing sequential operations (step S302 to step S313) after the tag specifying sequential operations (step S321 to step S330), the power values of the "TX_PWR" signal when the "Erase" signal, the "Program" signal, and the "Verify" signal are transmitted are stepwisely increased from the transmission power value P1 of the "TX_PWR" signal when one RFID circuit element 10A is specified in the previously explained tag specifying sequential operations. This operation contains the following implication.

That is, the magnitude of the transmission power which is required to transmit the "Scroll All ID" signal in order to perform the tag specifying operation is different from the magnitudes of the transmission power required to transmit both the "Erase" signal and the "Program" signal, namely, the magnitude of the first-mentioned necessary transmission power is larger than the magnitude of the last-mentioned necessary transmission power.

In correspondence with this power condition, in this third embodiment, when the value of the "TX_PWR" signal is stepwisely increased so as to increase the transmission power of the "Program" signal in the stepwise manner in the above-explained RFID tag information writing sequential operation in order that the writing operation is performed with respect to the RFID circuit element 10A to be written, the transmission power is stepwisely increased from such a "TX_PWR" signal value which is equivalent to the transmission power of the "Scroll All ID" signal when the specifying operation of this tag circuit element can succeed in the tag specifying sequential operation. As a consequence, the RFID tag information can be easily written in a short time, as compared with such a case that the transmission power is stepwisely increased from, for example, the power "0." At this time, while such a "TX_PWR" signal value itself is not used which is transmission power of the "Scroll All ID" signal when the specifying operation of this tag circuit element can succeed in the tag specifying sequential operation, if the value of "TX_PWR" signal is stepwisely increased from a value slightly larger than this value, then the writing operation can be carried out in a shorter time.

In the above-described third embodiment, as explained in FIG. 19, while the control circuit 60 increases the power of the "Erase" signal and the "Verify" signal, or the "Program" signal and the "Verify" signal in the stepwise manner, when the signals are transmitted in the writing sequential operation, the control circuit 60 makes the values of the "TX_PWR" signals equal to each other in the respective steps (namely, values of "Erase" signal and "Verify" signal, or "Program" signal and "Verify" signal from transmitting portion 53 are made equal to each other). The present invention is not limited only to the above example, but may be modified. That is, the "Erase" signal and the "Verify" signal may be controlled to become such a value different from the "Program" signal. FIG. 20 is one of such modifications, and corresponds to a diagram for schematically representing behavior of transmission power as to either both the "Erase" signal and the "Verify" signal or both the "Program" signal and the "Verify" signal in combination with the "Scroll All ID" signal in such a case that the "Erase" signal and the "Verify" signal are stepwisely increased, whereas the "Verify" signal is made substantially constant, namely corresponds to FIG. 19.

Similar to the above-described modification shown in FIG. 16, in this modification, while the transmission power when the "Erase" signal and the "Program" signal are transmitted is stepwisely increased, the transmission power when the "Verify" signal is transmitted is made equal to a substantially constant value. As a result, there is an effect that the leakage power related to the transmission of the "Verify" signal, and the power consumption can be suppressed.

In the above-described third embodiment of the present invention, while using the "P1" stored/learned in the step S329, the power value control operation during the next tag specifying operation is commenced (step S321). However, the present invention is not limited only thereto, may be modified. That is, apparently, either a value smaller than P1 or a value slightly larger than P1 may be employed. For instance, since the power control operation during the tag specifying operation is carried out not from the previously stored value P1, but from a slightly smaller value, the tag specifying operation without leakage can be determined within a relatively short time. As previously explained, such a tag specifying operation that the previously stored value P1, the value larger than P1, and the value smaller than P1 are presently employed implies that the following tag specifying operation is carried out. That is, while the value corresponding to the previously stored/learned value of the "TX_PWR" signal is employed as the reference value of "TX_PWR" of the present tag specifying operation.

Furthermore, in the above-described third embodiment, in the step S325 containing the tag specifying sequential operations within the flow chart of FIG. 18, when there are two pieces of the reply signals, the process operation is advanced to the step S327. In this step S327, since the transmission power of the "TX_PWR" signal is stepwisely decreased, the total number of the reply signal is limited to 1 piece so as to specify the RFID tag. However, the present invention is not limited only thereto. That is, in the case that a plurality of RFID circuit elements 10A are present in the communicatable range with respect to the "Scroll All ID" signal transmitted from the antenna 40, in the step S327' provided instead of the step S327, such an RFID circuit element 10A whose signal strength (=, as explained above, signal is inputted via RSSI circuit 81 to signal processing circuit 52) within two, or more pieces of rely signals becomes maximum may be alternatively specified as a writing subject based upon the following basic idea. That is, the shorter the distance from the antenna 40 becomes the stronger the communication strength of the rely signal becomes. Subsequent to this step S327', the process operation is advanced to the step S302 in which "Quiet" signals for temporarily stopping the function may be transmitted to the RFID circuit elements other than the above-described RFID circuit element 10A whose signal strength is maximum, and various sorts of signals may be transmitted to such a specified RFID circuit element 10A (namely, signal strength of rely signal becomes maximum). As a result, the RFID tag information may be more firmly and quickly written into the RFID circuit element 10A which should be originally written.

The above embodiment has exemplified such an example that the value P1 stored in the preceding control operation is used when the power control operation is commenced during the present control operation. Furthermore, when the cartridge 20 is replaced these stored/learned values may be alternatively initialized (for example, P1=0). Also, as previously explained modification in FIG. 13, the value of P1 in the relevant cartridge 20 may be alternatively described in the cartridge 20. A similar effect may be achieved also in these cases.

Also, in the modification of the first embodiment and the third embodiment, the above-explained subtracting operator "Pstep'" is made smaller than "Pstep." The present invention is not limited only thereto. For instance, such a value of Pstep' (defined as Pstep'>Pstep) may be alternatively employed, and the same value "Pstep" may be alternatively employed.

Furthermore, in the respective operation flows, the feeding guides 83 have been held in the access area with respect to the tag tape 28 with print under transportation so as to access thereto. However, the present invention is not limited only thereto. In other words, the access operation may be carried out under such a condition that this tag tape 28 with print is stopped at a predetermined position, and is held by the feeding guides 83.

It should also be understood that in the above-explained embodiment, such a cartridge 20 is employed in which the base tape 21 where a plurality of RFID circuit elements 10A have been sequentially formed along the longitudinal direction as the storage member of the RFID circuit elements is wound on the first roller 22, as the RFID circuit element storage member. However, the present invention is not limited thereto. That is, such a tray member (so-called "stack type member") may be alternatively employed. In this tray member, a plurality of flat sheet-shaped label materials are stacked along a stacking direction and the stacked label materials are stored in this tray member, while a single RFID circuit element 10A has been formed on one label material.

Also, the RFID circuit element storage means is not limited only such a storage member which is detachably mounted on the main body of the RFID tag information communicating device such as the cartridge and the tray member, but also to a so-called "standalone type storage member", or a so-terminated "internal type storage member" which cannot be mounted on the device main body. Even in this case, a similar effect may be obtained.

Also, in the above description, the RFID tag information communication apparatus 2 reads, or writes the RFID tag information from the IC circuit part 10 of the RFID circuit element 10A, and the thermal head 41 prints in order to identify this RFID circuit element 10A. Alternatively, this printing operation is not always carried out, but the RFID tag information may be written, or read with respect to the RFIF tag circuit element 10A.

Referring now to FIG. 21 to FIG. 28, a fourth embodiment of the present invention will be explained. This fourth embodiment corresponds to such an embodiment that a continuous information writing process operation to a plurality of RFID circuit elements is carried out in an effective manner by using minimum required transmission power. For the sake of clearly indicating a structure, the same reference numerals shown in the first to third embodiments will be employed as those for indicating the same structural elements of this fourth embodiment, and explanations thereof are made with reference to the same drawings.

An RFID tag manufacturing system to which an RFID tag information communicating device 2' of this fourth embodiment is applied is equivalent to the RFID tag manufacturing system show in FIG. 1 in the first embodiment. That is to say, in the RFID tag manufacturing system 1 shown in FIG. 1, the RFID tag information communicating device 2' (namely, writer, noted that writer is also equipped with reading function in this example) is connected via a communication line 3 in either a wired manner or a wireless manner to a route server 4, a terminal 5, a general-purpose computer 6, and a plurality of information severs 7.

Figure 21:
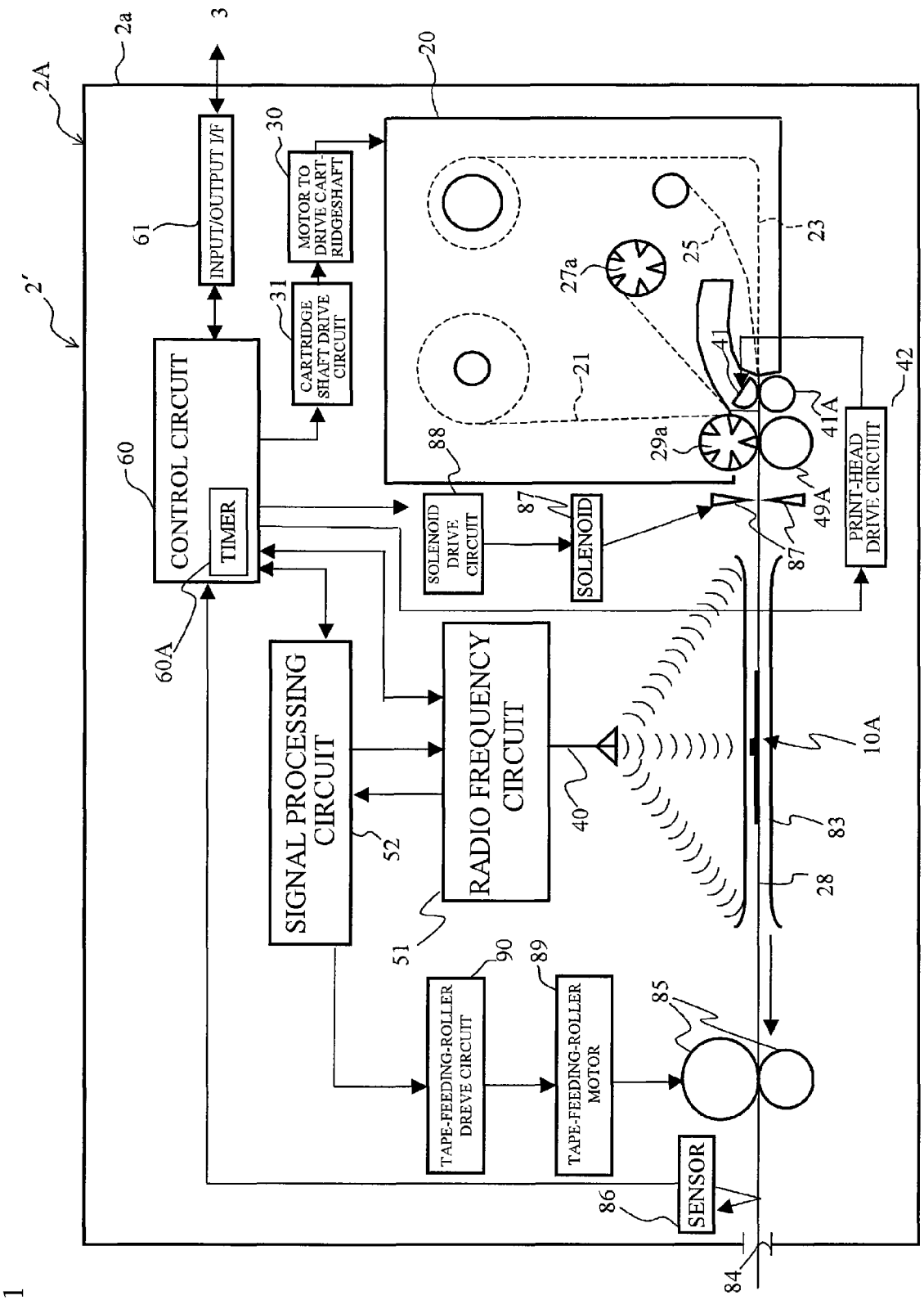
FIG. 21 is a conceptional structural diagram for indicating a detailed structure of an RFID tag information communication device according to a fourth embodiment of the present invention.

FIG. 21 is a conceptional diagram for showing a detailed structure of the above-explained RFID tag information communicating device 2'.

In FIG. 21, a cartridge holder unit (not shown) is provided as a concave portion in a main body 2A of the RFID tag information communicating device 2', and a cartridge 20 is detachably mounted on this holder unit.

The main body 2A is equipped with the cartridge holder unit to which the cartridge 20 is fitted. Also, the main body 2A contains a housing 2a which constitutes an outer housing; a print head (thermal head) 41 for performing a a predetermined printing operation to a cover film 23; a driving shaft 27a for driving an ink ribbon where printing operation to the cover film 23 is ended; and a tape-feed-roller drive shaft 29a for feeding a tag tape 28 with print from the cartridge main body 2A. The main body 2A further contains an antenna 40; a cutter 87; one pair of feeding guides 83; a carry-out roller 85; and a tape end sensor 86. The antenna 40 transmits and receives a signal by way of a radio communication manner by using a radio frequency such as the UHF frequency band between an RFID circuit element "10A" (will be explained later in detail) equipped in the tag tape 28 with print and the own antenna 40. The cutter 87 cuts the tag tape 28 with print at predetermined timing by a predetermined length so as to manufacture a label-shaped RFID tag label "10A." One pair of feeding guides 83 passes the RFID circuit element "10A" within a predetermined writing area (will be explained in detail) which is located opposite to the antenna 40 when a signal is transmitted/received in the radio communication manner, and further, guide the cut RFID tag labels "10." The carry-out roller 85 feeds the guided RFID tag label "10" to a carry-out exit 84 so as to carry out this RFID tab label "10." The tape end sensor 86 detects as to whether or not the RFID tag label "10" is present at the carry-out exit 84.

The tape end sensor 86 is a reflection type photoelectric sensor which is arranged by, for example, a light projecting device and a light receiving device. In the case that the RFID tag label 10 is not present between the light projecting device and the light receiving device, light output from this light projecting device is entered to the light receiving device. On the other hand, when the RFID tag label 10 is present between the light projecting device and the light receiving device, the light outputted from the light projecting device is shielded, so that a control output from the light receiving device is inverted.

On the other hand, the main body 2A contains a radio frequency circuit 51 for accessing (in this example, operation) the RFID circuit element 10A via the antenna 40; a signal processing circuit 52 for processing a signal read from the RFID circuit element 10A; a cartridge driving motor 30 for driving the driving shaft 27a and the tape-feed-roller drive shaft 29a; and a print-head drive circuit 42 for controlling a supply of electric power to the print head 41. The main body 2A further contains a solenoid 87 for driving the cutter 87 so as to perform a cutting operation; a solenoid driving circuit 88 for controlling the solenoid 87; a tape-feeding-roller motor 89 for the feeding roller 85; a tape-feeding-roller drive circuit for controlling the tape-feeding-roller motor 89; a cartridge shaft drive circuit 31 for controlling driving operation of the motor to drive cartridge shaft 30; and a control circuit 30. The control circuit 30 controls entire operations of the RFID tag information communicating device 2' via the radio frequency circuit 51, the signal processing circuit 52, the cartridge shaft drive circuit 31, the print-head drive circuit 42, the solenoid driving circuit 88, the tape-feeding-roller drive circuit 90, and the like.

The control circuit 60 corresponds to a so-called "microcomputer." Although a detailed illustration is omitted, the control circuit 60 is arranged by a control processing unit (CPU), a ROM, a RAM, and the like. While the control circuit 60 utilizes a temporary storage function of the RAM, the control circuit 60 executes a signal process operation in accordance with a program previously stored in the ROM, and also contains a timer circuit 60A (refer to FIG. 5). Also, this control circuit 60 is connected via an input/output interface 61 to, for example, the communication line 3, and then, can transmit/receive information with respect to the route server 4, the terminal 5, the general-purpose computer 6, the information server 7, and the like, which are connected to this communication line 3.

The cartridge 20 of this fourth embodiment is equivalent to the cartridge shown in FIG. 3 in the above-explained first embodiment. In other words, this cartridge 20 is provided with: a first roll 22 on which the above-described base tape 21 (tag tape) having a belt shape has been wound; a second roll 24 on which a transparent cover film 23 having the substantially same width as that of the base tape 21 has been wound; an ink ribbon supply-side role 26; a ribbon take-up roller 27 for taking up a printed ink ribbon 25; and a pressure roller 29 (feeding means), and a cartridge housing (cartridge main body) 20A which contains these members. The ribbon take-up roller 27 takes up the ink ribbon 25 with print along a direction of an arrow "B." The ribbon supply-side role 26 feeds out the above-described ink ribbon 25 along a direction of an arrow "A." The pressure roller 29 depresses the base tape 21 against the cover film 23 so as to adhere the cover film 23 to the base tape 21 to constitute a tag tape 28 with print, and feeds this tag tape 28 with print along a direction indicated by an arrow "C."

Among these members, both the take-up roller 27 and the pressure roller 29 are rotated by such a drive force of the cartridge driving motor 30 (refer to FIG. 21) corresponding to, for example, a pulse motor provided outside the cartridge 20, since thus drive force is transferred to a take-up roller driving shaft 27a for driving the ribbon take-up roller 27, and a pressure roller driving shaft 29a for driving the pressure roller 29.

In the first roll 22, the base tape 21 has been wound around a reel member 22a, where a plurality of RFID circuit elements 10A have be sequentially formed along a longitudinal direction.

The base tape 21 which is wound on the first roll 22 is made of a 4-layer structure (refer to partially enlarged view in FIG. 3). The base tape 21 has been constituted by stacking an adhesive layer 32 for a cover film; a colored base film 33 made of PET (polyethyleneterephthalate), or the like; another adhesive layer 34; and a separation sheet 35 in this order from the inside wound side (namely, wound in inner side, right side in FIG. 3) toward the opposite side (namely, left side in FIG. 3). The adhesive layer 34 is provided with an adhesive material used to adhere the RFID tag label 10 onto an adhering subject. The separation sheet 35 covers the adhesive side of this adhesive layer 34. Also, the IC circuit part 100 for storing information has been provided on a rear side (left side in FIG. 3) of the base film 33 in an integral body; an antenna (tag antennas) 152 has been formed on a surface of the rear side of the base film 33. The RFID circuit element 10A has been constituted by the IC circuit part 100 and the antenna 101 (refer also to FIG. 4). The antenna 101 is connected to the IC circuit part 100 so as to transmit/receive information. The cover film-purpose adhesive layer 32 which will adhere the cover film 23 later is formed on the front side (right side in FIG. 3) of the base film 33. Also, the separation sheet 35 has been adhered to the rear side of the base film 33 by the adhesive layer 34. It should be understood that when an RFID tag label 10 which has been finally accomplished in a label shape is adhered to a predetermined commercial goods, or the like, this separation sheet 35 is separated, so that the RFID tag label 10 can be adhered to this commercial goods, or the like by the adhesive layer 34.

In the second roll 24, the cover film 23 has been wound around a reel member 24a, and the cover film 23 is fed.

Both the ribbon supply-side role 26 and the ribbon take-up roller 27 have been arranged on the rear surface side of the cover film 23 (namely, on the side adhered to the base tape 21). The ink ribbon 25 is driven by these rollers. Since the ink ribbon 25 is depressed by this print head 41, this ink ribbon 25 may abut against the rear surface of the cover film 23. A plurality of heating elements of the print head 41 are energized by the print-head drive circuit 42. As a result, such a print "R" (refer to FIG. 13(a), will be explained later) as predetermined character, symbol, and bar code is printed on the rear surface (surface of cover film 23 on the side adhered to adhesive layer 32) of the cover film 23 (it should be noted that since print is printed from rear surface, character and the like are printed which are mirror-symmetrical, as viewed from printing side). It should also be noted that the ink ribbon 25 whose printing operation to the cover film 23 has been accomplished is taken up by the ribbon take-up roller 27 by the drive force of the ribbon take-up roller driving shaft 27a.

When the cartridge 20 having such a structure is mounted on the main body 2A, and a roller holder (not shown) is moved from a separated position to an abutting position, both the cover film 23 and the ink ribbon 25 are sandwiched between the print head 41 and the platen roller 41A, and further, both the base tape 21 and the cover film 23 are sandwiched between the pressure roller 29 and the sub-roller 29A. Then, both the ribbon take-up roller 27 and the pressure roller 29 are rotated in respective synchronism modes along directions indicated by an arrow "B" and a arrow "D" by drive force of the cartridge driving motor 30. Furthermore, the sub-roller 29A and the platen roller 41A are rotated in conjunction with the drive force.

As a result, the base tape 21 is fed out from the first roll 22 so as to be supplied to the pressure roller 29, and while the cover film 23 is fed out from the second roll 24, the ink ribbon 25 is fed out from the ribbon supply-side role 26, as explained above. Thus a printing operation is performed on the cover film 23. Then, both the base tape 21 and the cover film 23 where the printing operation has been accomplished are adhered to each other by the pressure roller 29 and the sub-roller 29A so as to be formed in an integral body as a tag label tape 28 with print. This tag label tape 28 with print is carried out from the cartridge 20.

A detailed function of the radio frequency circuit 51 of this fourth embodiment is equivalent to that shown in FIG. 5 in the first embodiment. In other words, in FIG. 5, the radio frequency circuit 51 is arranged by a transmitting portion 53, a receiving portion 54, and a transmit-receive splitter 55. The transmitting portion 53 transmits a signal via the antenna 40 to the RFID circuit element 10A. The receiving portion 54 inputs a reflection wave from the RFID circuit element 10A received by the antenna 40.

The transmitting portion 53 is provided with a crystal oscillator 56A, a PLL (Phase-Locked Loop) 56B, a VCO (Voltage-Controlled Oscillator) 56C, a transmission multiplying circuit 71, and a variable transmission amplifier 72. The crystal oscillator 56A generates a carrier wave which is used to access (read/write operations) RFID tag information stored in the IC circuit part 100 of the RFID circuit element 10A. The transmission multiplying circuit 71 modulates the generated carrier wave based upon the signal supplied from the signal processing circuit 52. In this example, the transmission multiplying circuit 71 modulates the carrier wave based upon a "TX_ASK" signal supplied from the signal processing circuit 52 in this example, and an amplification factor variable amplifier may be employed in the case of the amplitude modulation. The variable transmission amplifier 72 determines an amplification factor by a "TX_PWR" signal supplied from the control circuit 60, and amplifies the modulation wave modulated by the transmission multiplying circuit 72. Then, the generated carrier wave may preferably use a frequency of the UHF band. The output signal of the variable transmission amplifier 72 is transmitted to the antenna 40 via the transmit-receive splitter 55, and then, is supplied to the IC circuit part 100 of the RFID circuit element 10A.

The receiving portion 54 is equipped with a first receiving signal multiplying circuit 73, a first band-pass filter 74, a first receiving signal amplifier 76, a second receiving signal multiplying circuit 77, a second band-pass filter 78, and a second receiving signal amplifier 80. The first receiving signal multiplying circuit 73 multiplies the reflection wave from the RFID circuit element 10A received by the antenna 40 by the generated carrier wave. The first band-pass filter 74 is used to derive only a signal of a required frequency band from the first receiving signal multiplying circuit 73. The first receiving signal amplifier 76 amplifies the output signal filtered by the first band-pass filter 74, and supplies the amplified signal to a first limiter 75. The second receiving signal multiplying circuit 77 multiplies the reflection wave from the RFID circuit element 10A received by the antenna 40 by a carrier wave whose phase has been shifted by 90 degrees after the carrier wave has been generated. The second band-pass filter 78 is used to derive only a signal of a required band from the output of the second receiving signal multiplying circuit 77. The second receiving signal amplifier 80 inputs the output filtered by the second band-pass filter 78, and amplifies this inputted signal to be supplied to a second limiter 79. Then, a signal "RXS-I" outputted from the first limiter 75 and a signal "RXS-Q" outputted from the second limiter 79 are inputted to the signal processing circuit 52 so as to be processed.

Also, the output signals from the first receiving signal amplifier 76 and the second receiving signal amplifier 80 are inputted to an RSSI (Received Signal Strength Indicator) circuit 81, and thus, signals "RSSI" indicative of the strengths of these signal are entered to the signal processing circuit 52. As previously explained, in the RFID tag information communicating device 2' of this first embodiment, a demodulating operation of the reflection wave from the RFID circuit element 10A is carried out by an I-Q quadrature demodulating operation.

A functional structure of an RFID circuit element 10A provided on the above-explained tag tape 28 with print is equivalent to that shown in FIG. 4 of the first embodiment. That is to say, in FIG. 4, the RFID circuit element 10A contains an antenna 40, the antenna (tag antenna) 104, and an IC circuit part 100 connected to the antenna 101. The antenna 104 transmits and receives a signal in a non-contact manner by employing a radio frequency of the UHF band, or the like, and also the antenna 40 is provided on the side of the RFID tag information communicating device 2'.

The IC circuit part 100 is equipped with a rectification part 111, a power source part 112, a clock extraction part 114, a memory part 115, a modem part 116 connected to the antenna 101, and a control unit 113. The rectification part 111 rectifies a carrier wave received from the antenna 101. The power source part 112 stores thereinto energy of the carrier wave rectified by the rectification part 111 so as to use the stored energy as a drive power source. The clock extraction part 114 extracts a clock signal from the carrier wave received from the antenna 101 and supplies the extracted clock signal to the above-described control unit 113. The memory part 115 functions as an information storage means capable of storing thereinto a predetermined information signal. The control unit 113 is employed so as to control operations of the RFID circuit element 10A via the rectification part 111, the clock extraction part 114, the modem part 116, and the like.

The modem part 116 demodulates a communication signal from the antenna 40 of the RFID tag information communicating device 2' received by the antenna 101, and also, modulates/reflects a carrier wave received by the antenna 101 based upon a response signal supplied from the control unit 113.

The control unit 113 executes a basic control operation. That is, the control unit 113 interprets the receiving signal demodulated by the modem part 116, produces a reply signal based upon the information signal stored in the memory part 116, and returns the return signal by the modem part 116.

Figure 23:
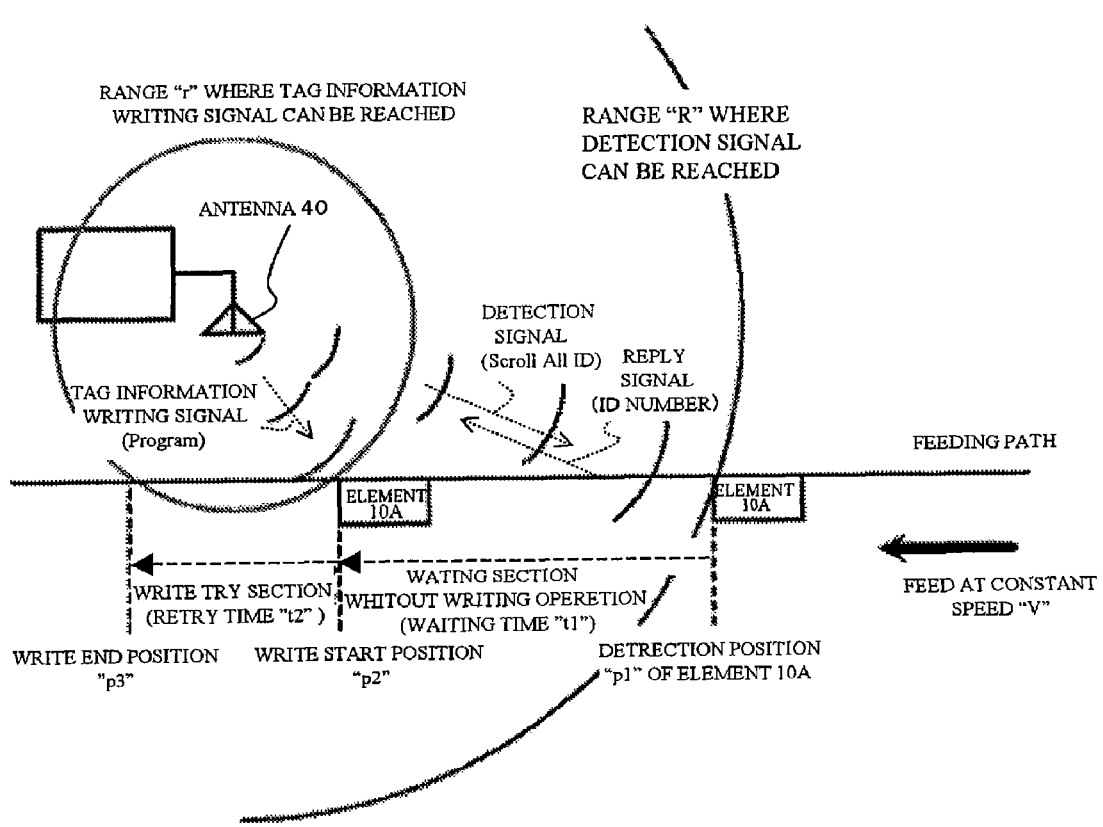
FIG. 23 is an explanatory diagram for indicating a transmission of a position detecting signal to an RFID circuit element and transmission behavior of an RFID tag information writing signal.

When the above-described RFID tag information communicating device 2' accesses (namely, writes in this example) the RFID tag information of the IC circuit part 100 of the RFID circuit element 10A, a screen which is displayed on either the terminal 5 or the general purpose computer 6 is similar to that shown in FIG. 23 in the above-described first embodiment.

That is, in FIG. 23, in this example, a print character "R" printed in correspondence with an RFID circuit element 10A; an access (writing in this example) ID which is an ID specific to this RFID circuit element 10A; an address of goods information which is stored in the information server 7; and a storage destination address of information corresponding thereto in the route server 4 may be displayed on either the terminal 5 or the general-purpose computer 6. Then, the RFID tag information communicating device 2' is operated by operating either this terminal 5 or the general-purpose computer 6, so that the above-described print character "R" is printed on the cover film 23, and the RFID tag information such as the corresponding goods information is written in the IC circuit part 100.

In the above-explained basic arrangement, the largest feature of this fourth embodiment is given as follows: That is, a position of an RFID circuit element 10A is detected based upon a reply signal (will be explained later) sent from the RFID circuit element 10A with respect to a position detecting signal (will be described later) transmitted from the antenna 40. Furthermore, RFID tag information is transmitted from the antenna 40 to the RFID circuit element 10A so as to be written in this circuit element 10A based upon this positional detection. A detailed explanation of this largest feature will be made with reference to FIG. 22 and FIG. 23.

Figure 22:
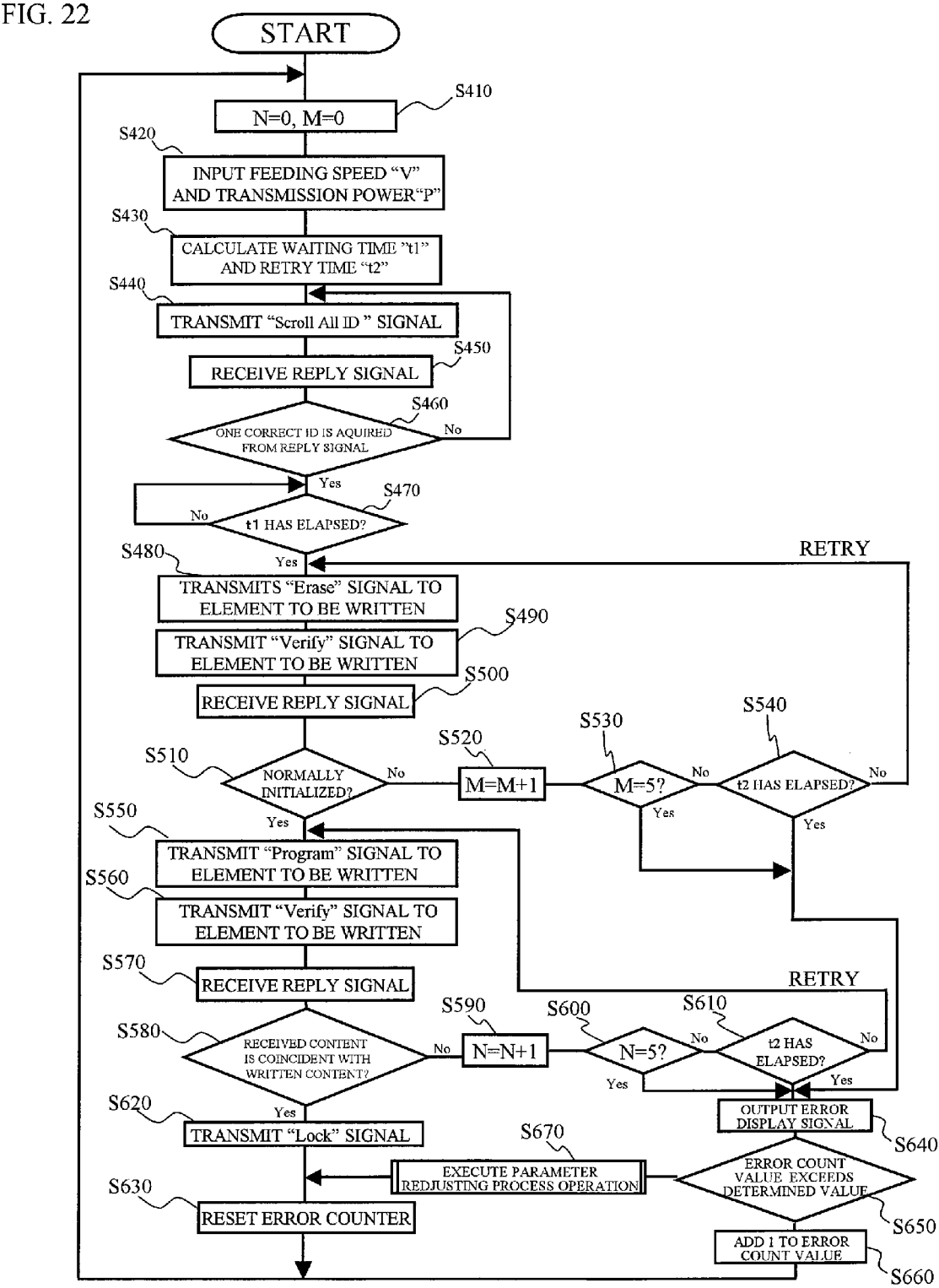
FIG. 22 is a flow chart for describing RFID tag information writing sequential operations to the IC circuit part of the RFID circuit element among control operations executed by a control circuit shown in FIG. 21.

FIG. 22 is a flow chart for representing RFID tag information writing sequential operations into the IC circuit part 100 of the RFID circuit element 10, among control operations executed by the control unit 60.

In FIG. 22, as previously explained, when the writing operation of the RFID tag information communicating device 2' is carried out, by an input (writing instruction input) by the terminals 5, or the general-purpose computer 6, this flow is commenced.

First, in a step S420, variables "N" and "M" are initialized as "0" respectively, while the variables "N" and "M" count a retry time when a communication failure is questioned.

Thereafter, in a step S420, both a feeding speed "V" of a printed tag tape 28 fed by both the tape-feeding-roller 85 and the pressure roller 29, and power "P" of transmission electromagnetic waves generated from the antenna 40 are read which have been previously set by performing an input operation of either the terminal 5 or the general purpose 6. The above-described power "P" is a constant value, precisely speaking, power "Pr" used during a writing operation, and power "PR" used during a reading operation. Alternatively, instead of the above-explained power "P", a tag sensitivity as to each of the RFID circuit elements 10A, and a gain of the antenna 101 may be employed.

Then, in a step S430, both a waiting time "t1" and a retry time "t2" are calculated based upon the feeding speed "V" and the power value "P" entered in the step S420. The waiting time "t1" is defined by that a reply signal from the RFID circuit element 10A is received, and thereafter, a writing signal corresponding to this reply signal is transmitted. The retry time "t2" is defined by that the writing signal is continuously transmitted predetermined times after the writing operation has been commenced until the writing operation is completed.

As indicated in FIG. 23, in this fourth embodiment, since the transmission power "PR" during the detecting operation is made as a constant value, a range where a detection signal can be reached is set to such a range which is expressed by a circle having a relatively large radius while the antenna 40 is positioned at a center of this circle. Also, such a range which is expressed by another circle "r" having a relatively small radius while the antenna 40 is set to a range where RFID tag information is written; transmission power during a writing operation corresponding thereto is set to "Pr" (namely, while receiving of signal from range of the above-described circle "R" is defined as initial condition, transmission power is fixedly set to "Pr" corresponding to circle "r"); and, writing operation of RFID tag information into the RFID circuit element 10A is tried to be executed only predetermined times only within this writing range "r" along the feeding path.

As a consequence, as represented in FIG. 23, the above-described waiting time "t1" corresponds to such a time which is required to feed an RFID circuit element 10A at the feeding speed "V" along the feeding path from a detection position "P1" of the RFID circuit element 10A up to a writing start position "P2" (=section during which RFID circuit element 10A waits writing operation), the above-described retry time "t2" corresponds to such a time which is required to feed an RFID circuit element 10A at the feeding speed "V" along the feeding path from the above-explained writing start position "P2" of the RFID circuit element 10A up to a writing end position "P3" (=writing try section).

After the above-explained times "t1" and "t2" are calculated, the process operation is advanced to a step S440.

In the step S440, a "Scroll All ID" command for requesting an RFID circuit element within the communication area to reply is outputted to the signal processing circuit 52. A "Scroll All ID" signal (note that if RFID circuit element to be detected has been specified, then "Scroll All ID" may be employed) is produced based upon this command. Then, the produced "Scroll All ID" signal is transmitted via the transmitting portion 53 of the radio frequency circuit within a detectable range by the above-explained output power PR. It should be noted that the above-described detectable range implies such a range that the above-explained position detecting signal is reached, namely, corresponds to the circle having the radius "R" while the antenna 40 is located at the center thereof since the transmission power "P" is constant in this example (refer to FIG. 23). As a consequence, as indicated in FIG. 23, at such a stage that an RFID circuit element 10A which is taken out from the cartridge 20 and then is fed at the constant speed "V" along the feeding path of the printed tag tape 23 is reached within the range having the radius "R", the position detecting signal is reached to this RFID circuit element 10A so as to prompt a reply signal. It should also be understood that as previously explained, an amplification factor of the variable transmission amplifier 72 is controlled based upon the "TX_PWR" signal supplied from the control circuit 60 in such a manner that this radius "R" during the position detecting operation becomes larger than the radius "r" during a writing operation (will be explained in detail), and transmission power also becomes relatively large during the position detecting operation, and becomes relatively small when the "Erase" signal and the "Program" signal are written.

When a response signal (=reply signal; for example, ID number, or goods information corresponding to this ID number) is returned from the antenna 101 of the RFID circuit element 10A, this reply signal is received via the antenna 40 in the next step S450, and then, is acquired via the receiving portion 54 of the radio frequency circuit 51 and the signal processing circuit 52.

Thereafter, in a step S460, a judgment is made as to whether or not one correct ID is acquired from the reply signal received in the above step S450. In other words, a check is made as to whether or not the RFID circuit element 10A which has reached within the circle having the radius "R" can be correctly detected.

When the judgment cannot be satisfied, the process operation is returned to the step S440 in which a similar sequential operation is repeatedly until one correct ID can be detected. When the judgment can be satisfied, the process operation is advanced to a step S470.

In the step S470, while the timer circuit 60A contained in the control circuit 60 is employed, a judgment is made as to whether or not an elapsed time after the reply signal is received in the step S450 becomes the above-explained waiting time "t1." When the time has passed for "t1", this judgment can be satisfied, and the process operation is advanced to a step S480.

In the step S480, since the judgment of the step S470 can be satisfied, the RFID circuit element 10A to be written may be reached to the writing try section. As a result, as a first sequence of the writing operation, an "Erase" command for erasing a memory content of the memory part 115 is outputted to the signal processing circuit 52. In response to this "Erase" command, an "Erase" signal is produced in the signal processing circuit 52. The "Erase" signal is transmitted via the transmitting portion 53 of the radio frequency circuit 51 to the RFID circuit element 10A to be written so as to initialize this memory part 115. As previously explained, the transmission power at this time has been fixedly set to the power "Pr" corresponding to the circle "r" by receiving the reply signal from the range of the circle "R" under initial condition.

Next, in a step S490, a "Verify" command is outputted to the signal processing circuit 52, while the "Verify" command confirms as to whether or not the command (namely, "Erase" command) which has been executed just before can succeed. In response to this "Verify" command, a "Verify" signal is produced by the signal processing circuit 52, and then, is transmitted by the above-explained transmission power "Pr" via the transmitting portion 53 of the radio frequency circuit 51 to the RFID circuit element 10A to which information should be written so as to prompt a reply operation.

Thereafter, in a step S500, a reply signal transmitted from the RFID circuit element 10A to be written in response to the "Verify" signal is received via the antenna 40, and is acquired via the receiving portion 54 of the radio frequency circuit 51 and the signal processing circuit 52.

Next, in a step S510, information stored in the memory part 115 of the RFID circuit element 10A is confirmed based upon the reply signal, and a judgment is made as to whether or not the memory part 115 is initialized under normal condition.

When the judgment cannot be satisfied, the process operation is advanced to a step S520. In this step S520, 1 is added to M. Further, in a step S530, a judgment is made as to whether or not M=5.

In the case that M≦4, the judgment cannot be satisfied, and then, the process operation is advanced to a step S540. In the step S540, a check is made as to whether or not the retry time "t2" is elapsed after the time "t1" has passed in the above step S470 by employing the timer circuit 60A contained in the control circuit 60. If the time "t2" has not yet elapsed, then it is so regarded that the RFID circuit element 10A is still present within the write try section, and then, the process operation is returned to the step S480 in which a similar sequential operation is repeated. Even when the initialization of the memory part 115 cannot be completed under better condition, as long as the RFID circuit element 10A is present within the writing try section, retry operations are carried out up to 5 times. It should also be noted that when M=5 in the step S530, or when the time "t2" has passed in the step S540, the process operation is advanced to the below-mentioned step S640.

In the case that the initialization of the memory part 115 is accomplished under normal condition and the judgment of the step S510 can be satisfied, the process operation is advanced to a step S550 in which a "Program" command for writing target data into the memory part 115 is outputted to the signal processing circuit 52. In response to this "Program" command, such a "Program" signal is produced in the signal processing circuit 25, while this "Program" signal corresponds to such an information which is originally wanted to be written (=RFID tag information; for instance, new ID number, or goods information related thereto). The "Program" signal is transmitted via the transmitting portion 53 of the radio frequency circuit 51 to the RFID circuit element 10A which should be written by the above-explained transmission power Pr, so that the above-described predetermined information is written in the memory part 115.

Thereafter, in a step S560, the "Verify" command is outputted to the signal processing circuit 52. In response to this "Verify" command, a "Verify" signal is produced by the signal processing circuit 52, and then, is transmitted by the above-explained transmission power "Pr" via the transmitting portion 53 of the radio frequency circuit 51 to the RFID circuit element 10A to which information should be written so as to prompt a reply operation. Thereafter, in a step S570, a reply signal transmitted from the RFID circuit element 10A to be written in response to the "Verify" signal is received via the antenna 40, and is acquired via the receiving portion 54 of the radio frequency circuit 51 and the signal processing circuit 52.

Next, in a step S580, information stored in the memory part 115 of the RFID circuit element 10A is confirmed based upon the reply signal, and a judgment is made as to whether or not the transmitted predetermined information is stored in the memory part 115 under normal condition.

When the judgment cannot be satisfied, the process operation is advanced to a step S590. In this step S590, 1 is added to N. Further, in a step S600, a judgment is made as to whether or not N=5.

In the case that N≦4, the judgment cannot be satisfied, and then, the process operation is advanced to a step S610. Similar to the above step S540, in this step S610, a check is made as to whether or not the retry time "t2" is elapsed after the time "t1" has passed in the above step S470 by employing the timer circuit 60A. If the time "t2" has not yet elapsed, then it is so regarded that the RFID circuit element 10A is still present within the write try section, and then, the process operation is returned to the step S550 in which a similar sequential operation is repeated. Even when the initialization of the memory part 115 cannot be completed under better condition, as long as the RFID circuit element 10A is present within the writing try section, retry operations are carried out up to 5 times. It should also be noted that when N=5 in the step S600, or when the time "t2" has passed in the step S610, the process operation is advanced to the below-mentioned step S640.

When the judgment of the step S580 can be satisfied, it is so regarded that the writing operation is carried out under normal condition, and then, the process operation is advanced to a step S620. In this step S620, a "Lock" command for prohibiting a rewriting operation with respect to the memory part 115 is outputted to the signal processing circuit 52 by the transmission power "Pr." In response to this "Lock" command, a "Lock" signal is produced by the signal processing circuit 52, and is transmitted via the transmitting portion 53 of the radio frequency circuit 51 to the RFID circuit element 10A to which information should be written, so that a writing operation of new information into the RFID circuit element 10A is prohibited, and then, the process operation is advanced to a step S630 (will be explained later).

On the other hand, as previously explained, in the case that M=5 in the step S530; in the case that the time "t2" has elapsed in the step S540; in the case that N=5 in the step S600; and in the case that the time "t2" has elapsed in the step S610, the process operation is advanced to a step S640. In this step S640, an error display signal is outputted via the input/output interface 61 and the communication line 3 to either the terminal 5 or the general-purpose computer 6 so as to display a writing failure (error) indication corresponding thereto, and then, the process operation is advanced to a step S650.

In the step S650, a judgment is made as to whether or not a total number of error counts (will be discussed later) exceeds a preset determined value (for example, several times to 10 times). This error count number corresponds to a total number at which the error process operations (error display of step S640) have already been carried out. When the judgment cannot be satisfied, 1 is added to the error count number in a step S660. Thereafter, the process operation is returned to the first step S410 in which a similar sequential operation is repeated.

When the error process operations exceeds the determined value, it is so regarded that the originally set parameter values (namely, feeding speed "V" of printed tag tape, transmission electromagnetic wave power "P", or tag sensitivity) are improper. Then, in a step S670, these parameters are readjusting-processed (will be explained in detail).

When the above-explained readjusting process operation of the step S670 is ended, the process operation is advanced to a step S630.

In the step S635, the error count number is reset to be initialized as 0. After the step S630 is ended, the process operation is returned to the step S410 in which a similar sequential operation is repeated.

In accordance with the above-described flow operation, the desirable information (RFID tag information) can be written with respect to the IC circuit part 100 of the RFID circuit element 10A which should be written.

FIG. 24 to FIG. 27 represent examples as to control flow operations for indicating detailed sequential operations of the above-explained step S670.

Figure 24:
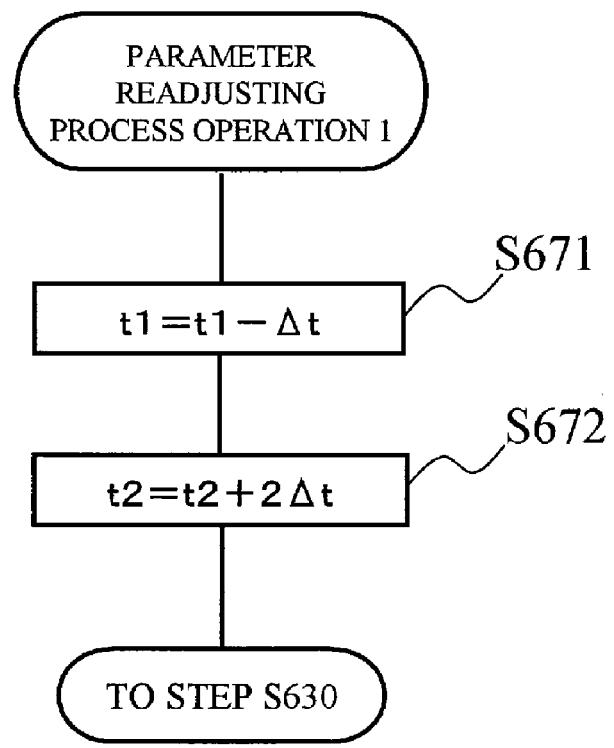
FIG. 24 is a flow chart for indicating an example as to detailed sequential operations of a step S670 shown in FIG. 22.

In the example of FIG. 24, electromagnetic wave transmission times for writing operation is firstly prolonged along forward/backward directions (irrespective of such a fact as to whether or not RFID circuit element 10A actually enters into predicted writing try section). In a step S671, the waiting time t1 is decreased by "Δt", and in a step S672, the retry time t2 is increased by "2Δt."

As a result, the electromagnetic wave transmission time for the writing operation becomes longer than the previous transmission time by "Δt" along the forward/backward directions, so that probability of an occurrence of a writing failure (error) can be lowered.

It should also be noted that since the transmission time is increased only by "Δt" in the step S672, the electromagnetic wave transmission time may be extended only by "Δt" before the writing operation. Apparently, the prolong time is not set to two times of Δt of the step S671, but may be set by a properly larger value in the step S672.

Figure 25:
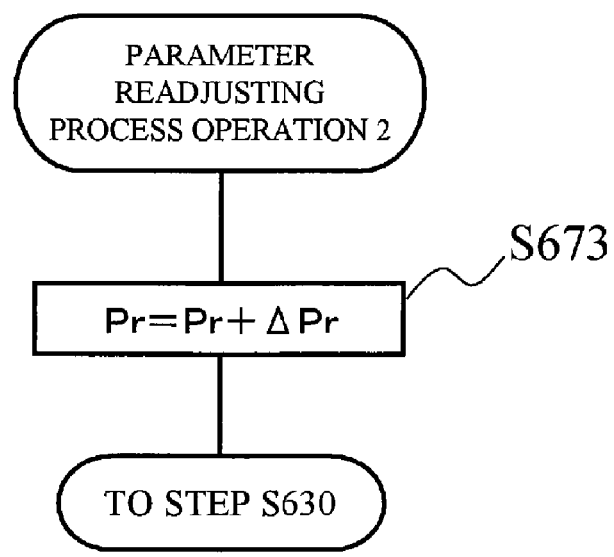
FIG. 25 is a flow chart for showing another example as to detailed sequential operations of the step S670 indicated in FIG. 22.

In the example of FIG. 25, similar to the above example, the electromagnetic wave transmission time for the writing operation is prolonged along the forward/backward directions, and the writing power Pr is increased by "ΔPr" in a step S673.

As a result, the range where the electromagnetic wave is actually reached can be enlarged rather than the predicted writing try section, and the electromagnetic wave transmission time for the writing operation becomes slightly longer than the previous transmission time along the forward/backward directions, so that probability of the occurrence of the writing failure (error) can be lowered. In this case, the writing transmission power is controlled in a variable manner (either remains in Pr, or increased by ΔPr).

Figure 26:
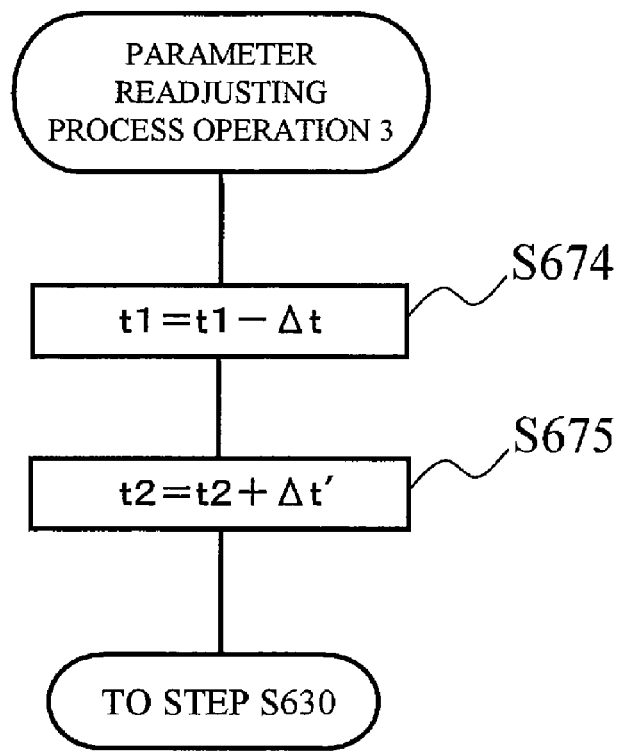
FIG. 26 is a flow chart for indicating a further example as to detailed sequential operations of the step S670 shown in FIG. 22.

On the other hand, the example of FIG. 26 corresponds to such a solution example that an RFID circuit element 10A issues a reply signal with a delay at a position which is slightly advanced from the predicted detection starting position along the feeding direction due to some reason. In other words, the waiting time is shortened in order to correct an error of the above-explained detection timing, namely, the waiting time "t1" is decreased by "Δt" in a step S674, and the retry time "t2" is increased by "Δt'" in a step S675. It should be understood that the value of Δt' may be made longer than, shorter than, or equal to the time "Δt" in response to the error. Alternatively, it is possible to set Δt'=0 in a certain case (in this case, step S675 itself is omitted).

As a result, the shift for the writing start timing based upon the above-explained detection delays is shifted by Δt earlier than the previous timing, and also, the writing end timing is properly set in response to the value of Δt', so that probability of the occurrence of the writing failure (error) can be lowered.

Figure 27:
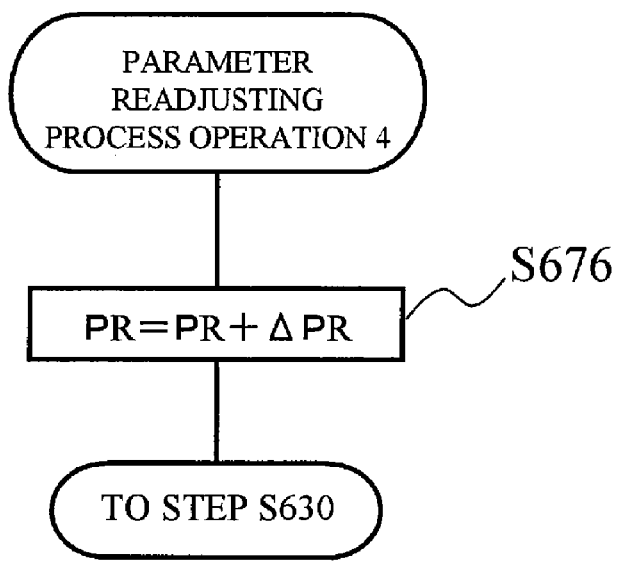
FIG. 27 is a flow chart for showing a still further example as to detailed sequential operations of the step S670 indicated in FIG. 22.

Furthermore, in the example of FIG. 27, similar to the above example, an error of detection timing is corrected, namely, the power PR during the detecting operation is increased by ΔPR in a step S676.

As a result, since the power is increased, the detection (reaction) timing of the RFID circuit element 10A can be shortened rather than the previous timing, so that probability of the occurrence of the writing failure (error) can be reduced.

An outer appearance of such an RFID tag label 10 that both the writing operation to the RFID circuit element 10A is completed and the cutting operation of the printed tag tape 28 is completed, and then is taken out is similar to views of the first embodiment in FIG. 6(a), FIG. 6(b), and FIG. 7. That is, FIG. 6(a) is an upper view of the RFID tag label 10 and FIG. 6(b) is a lower view thereof. FIG. 7 is a lateral sectional view of the RFID tag label. In FIG. 6(a), FIG. 6(b), and FIG. 7, the RFID tag label 10 is made of a 5-layer structure by adding the cover film 23 to the 4-layer structure shown in FIG. 3. The 5 layers are constituted by the cover film 23, the cover film-purpose adhesive layer 32, the base film 33, the adhesive layer 34, and the separation sheet 35 from the side of the cover film 23 (namely, upper side shown in FIG. 7) toward the opposite side thereof (namely, lower side shown in FIG. 7). Then, as explained above, the RFID circuit element 10A made of the IC circuit part 100 and the antenna 101 is provided on the rear surface of the base film 33, and a print "R" (in this example, character of "RF-ID" indicative of sort of RFID tag label 10) has been printed on the rear surface of the cover film 23.

In the above description, the transmitting portion 53 of the radio frequency circuit 51 constitutes a position detecting signal transmitting means which is recited in respective claims, and transmits a position detecting signal for detecting a position of an RFID circuit element via a device antenna to a tag antenna in a non-contact manner. The receiving portion 54 constitutes a reply signal receiving means which receives a reply signal returned from an IC circuit part in response to the position detecting signal by the position detecting signal transmitting means via the tag antenna to the device antenna in the non-contact manner. Also, the transmitting portion 53 also constitutes a writing information transmitting means which transmits RFID tag information to be written in the IC circuit part via the device antenna to the tag antenna in the non-contact manner based upon the reply signal received by the retry signal receiving means. Furthermore, the transmitting portion 53 constitutes a first information transmitting means which transmits first access information for accessing RFID information of an IC circuit part via the device antenna to the tag antenna in a non-contact manner so as to access the RFID tag information of the IC circuit part.

Also, the control circuit 60 constitutes a first control means for controlling the feeding speed by the pressure roller 29 functioning as the feeding means via the cartridge shaft drive circuit 31 and the motor to drive cartridge shaft 30. Also, the steps S480, S490, S550, S560, S620 of the flow chart of FIG. 22, which are executed by the control circuit 60, constitute a first power control means for setting a magnitude of transmission power from the first information transmitting means in response to an access. More specifically, the step S676 of the flow chart of FIG. 27 executed by the control circuit 60 constitutes a second control means for variably controlling the transmission power of the transmitting portion 53 as the position detecting signal transmitting means by the "TX_PWR" signal to the variable transmission amplifier 72. Also, in particular, the steps S671 and S674 of the flow charts shown in FIG. 24 and FIG. 26, which are executed by the control circuit 60, constitute a third control means for variably controlling the time (waiting time "t1") until the RFID tag information is transmitted by a received writing information transmitting means for the reply signal by the reply signal receiving means. More specifically, the step S673 of the flow chart of FIG. 25 also constitutes a fourth control means for controlling the transmission power by the writing information transmitting means. Further, the step S580 within the flow chart of FIG. 22, which is executed by the control circuit 60, corresponds to a judging means for judging as to whether or not a writing operation to the IC circuit part can succeed after the transmission by the writing information transmitting means is executed.

Operations/effects of this fourth embodiment with employment of the above-described arrangement will now be explained.

In the RFID tag information communicating device 2' of the fourth embodiment, the transmitting portion 53 of the radio frequency circuit 51 transmits the "Scroll All ID" signal as the position detecting signal by the power PR during the detecting operation via the antenna 40. When the RFID circuit element 10A on the printed tag tape 28 fed from the cartridge 20 is transported to the detection position (refer to FIG. 23) where this position detecting signal can be reached, the ID number as the reply signal is transmitted (returned) in response to this position detecting signal; this reply signal is received via the antenna 40 by the receiving portion 54 of the radio frequency circuit 51; and at this receiving timing, it is so detected that the RFID circuit element 10A is reached to this detecting position "p1." After this receiving, the transmitting portion 53 transmits the "Program" signal as the RFID tag information to the RFID circuit element 10A after the predetermined waiting time "t1" has passed during which the RFID circuit element 10A is reached to the writing start position "p2" of the preset writing try section.

As previously explained, the position of the RFID circuit element 10A is detected based upon the reply signal of the RFID circuit element 10A with respect to the position detecting signal. Further, based upon this position detecting operation, the writing operation is carried out by considering such a timing when the RFID circuit element 10A has reached to the optimum writing position. As a result, with respect to a plurality of RFID circuit elements 10A which are successively fed, the information writing process operation can be continuously carried out in an effective manner by the minimum required transmission power without employing the sensor, and the like.

Also, as shown in the step S670 of FIG. 22, in the case that the present condition is not proper for the writing operation, as shown in FIG. 9 to FIG. 12, the parameter readjusting process operation is carried out which corrects the waiting time t1, the retry time t2, the writing power Pr, and the power PR during detection. As a result, probability of an occurrence of a writing failure (error) can be lowered.

Figure 28:
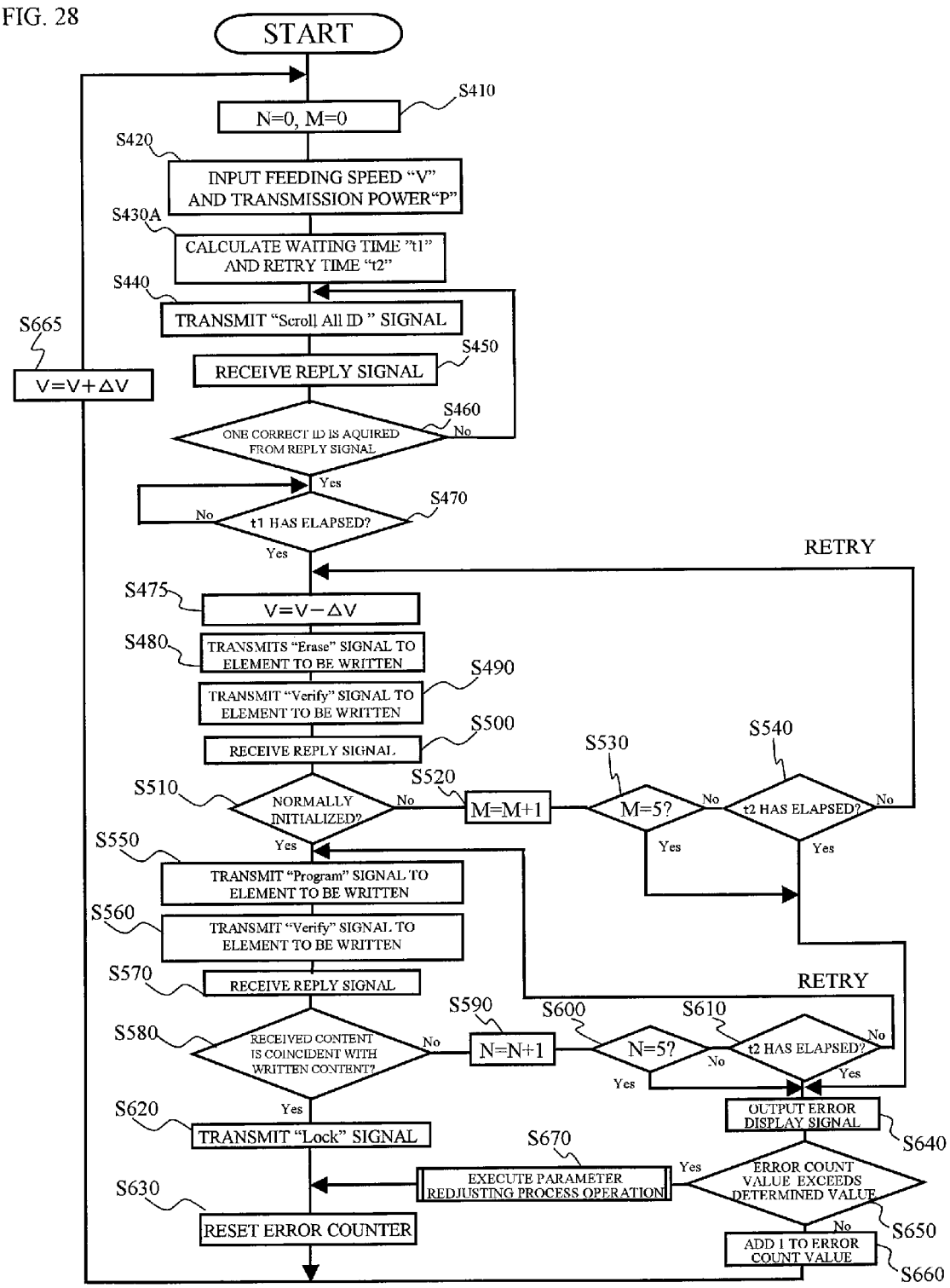
FIG. 28 is a flow chart for indicating RFID tag information writing sequential operations to an RFID circuit element in a modification in which a feeding speed is changed in a writing try section.

It should be understood that the present invention is not limited only to the above-explained embodiments, but the present invention may be modified in various manners without departing from the technical spirit and scope of the present invention. Various modifications will now be sequentially explained:

(1). In case that the feeding speed is changed in the writing try section:

FIG. 28 is a flow chart for indicating RFID tag information writing sequential operations to the RFID circuit element 10A by the control circuit 60 in this modification, and corresponds to that of FIG. 22.

In FIG. 28, a step S410 and a step S420 are identical to those of FIG. 22. Then, in a step S430A instead of the step S430, a calculation is made of a waiting time "t1" similar to the step S430, and a longer retry time (t2–t1) corresponding to a reduced speed (V→V–ΔV) of the feeding speed "V" (will be explained later) based upon the feeding speed V and the power value P entered in the step S420.

A step S440 to a step S470 are similar to those of FIG. 22. After the "Scroll All ID" signal is transmitted and the reply signal is received, the above-explained waiting time "t1" passes, and the RFID circuit element 10A enters the writing try section, and then, the process operation is advanced to a newly provided step S475 instead of the step S470.

In this step S475, the feeding speed V is reduced by "ΔV." This value "ΔV" is a value which has been previously determined and stored in the control circuit 60 in order that the writing operation is firmly carried out and the error probability is reduced. This sequence corresponds to the first control means that when the RFID circuit element fed by the feeding means is reached to a predetermined range in the vicinity of the device antenna, the feeding speed of the feeding means is changed. When this step S475 is ended, the process operation is advanced to a step S480. Subsequently, the signal is transmitted and received at this reduced feeding speed.

The step S480 to a step S660 are similar to those of FIG. 22.

In this modification, a step S665 is newly employed before the process operation is returned via the step S620 through the step S630 to the first step S610 after the writing operation has been ended under normal condition, or before the process operation is advanced to the error process operation in which 1 is increased to the error count number in the step S660, and then, the process operation is returned to the step S660. In this step S665, the feeding speed V is returned to the original speed (increased by ΔV). this sequence constitutes a first control means for controlling a feeding speed of an RFID circuit element by the feeding means. As a result, when the next detecting operation is performed, the signal can be transmitted and received at the original feeding speed V.

In this modification, when the information is written in the RFID circuit element 10A near the antenna 40, the feeding speed is relatively lowered. As a result, the time (T2–L) for writing the information can be made relatively long, and also, the RFID circuit element 10A can be located for a relatively long time period within the communicatable range near the device antenna, so that the information can be more firmly written.

Conversely, if the major point is put on the above-explained error prevention during the detecting operation, the feeding speed during the detecting operation may be made relatively low, and the feeding speed during the information writing operation may be made relatively high. In any case, there is such a common technical point that the feeding speeds are changed both when the position is detected and the information is written in order to reduce the error while the information is written.

Alternatively, such a method of varying the feeding speed "V" may be carried out in the parameter readjusting process operation of the modification in the step S670 of FIG. 28, and in the embodiment of FIG. 22. In other words, when the error count number exceeds the predetermined value, it is so considered that there is a certain difficulty in the originally set feeding speed "V", and thus, the feeding speed V may be reduced by a predetermined value.

(2). In case that various sorts of parameter values are recorded on the side of the cartridge 20 and are read by the sensor on the side of the device 2':

That is, in the step S420 of FIG. 22, or FIG. 28, the feeding speed V, the transmission electromagnetic wave power "P" (or tag sensitivity) and the like are read by operating the terminal 5, or the general-purpose computer 6 as the setting values of the input operation. Instead of this input operation, while these set values are formed as the parameter information in a portion 190 to be detected, which is provided in the cartridge 20, the parameter information is detected by a sensor (information detecting means) 200 which is separately provided on the side of another device 2, and the read parameter information is read in the control circuit 60.

Figure 29:
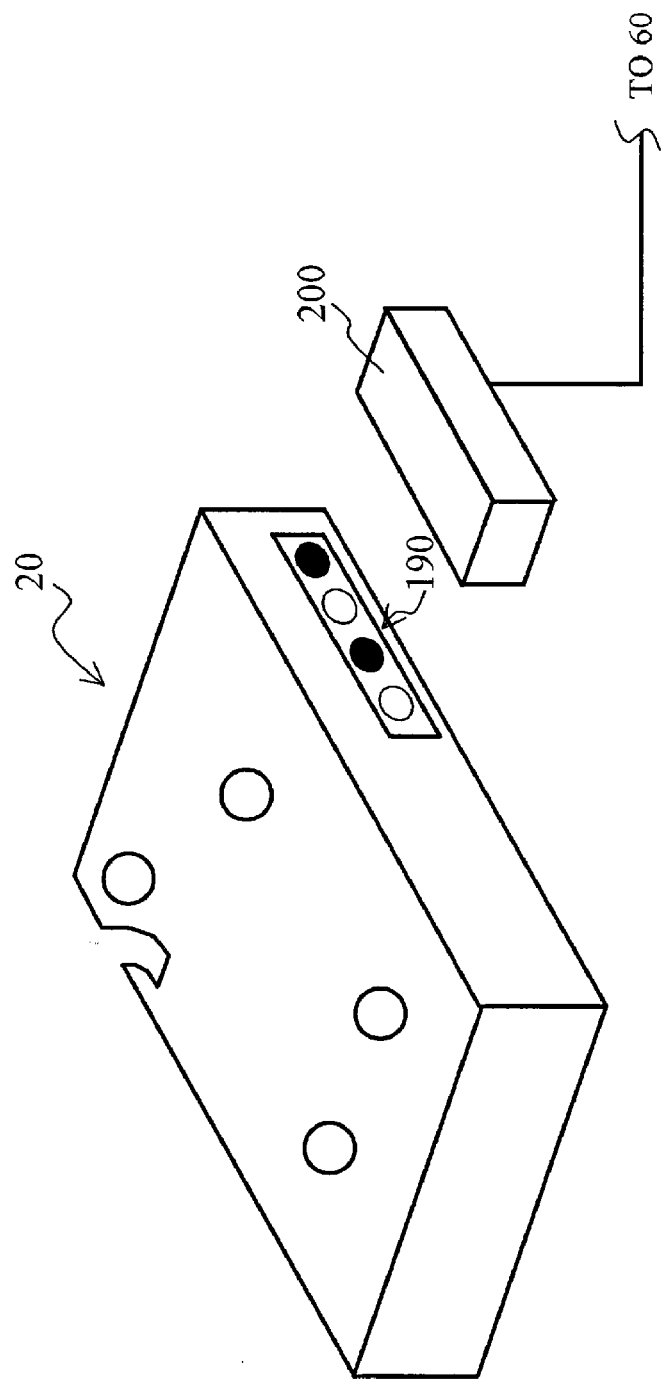
FIG. 29 is a schematic diagram for representing a positional relationship between a sensor and a portion to be detected which is formed in a cartridge in a modification in which various sorts of parameter values are recorded on the cartridge side and are read by a sensor provided on the device side.

FIG. 29 is a diagram for schematically showing a positional relationship between the sensor 200 and the portion 190 to be detected, which is formed in this cartridge 20. In FIG. 29, this portion 190 to be detected is equipped with 4 identifiers 190 in this example. The sensor 200 utilizes, for example, transmission/reflection of light. This sensor 200 is constituted by a light emitting diode (not shown) for emitting light in response to a signal from the control circuit 60, and a phototransistor (not shown). The phototransistor receives transmission/reflection light from the respective identifiers 190 in response to this light emission, and outputs detection signals corresponding thereto to the control circuit 60.

The identifiers 190 indicate the above-described various sorts of parameters (feeding speed V, transmission electromagnetic wave power P, or tag sensitivity) as the parameter information, which are optimized to the RFID circuit elements 10A contained in the cartridge 20, by such a condition as to whether or not light is reflected respectively. Moreover, this parameter information may include such tag attribute parameters as frequencies of electromagnetic waves and communication parameters such as communication protocols, which are used in the radio communication, and also, memory capacities of IC circuit parts, tape widths, and arranging intervals of elements 10A.

It should also be noted that the sensor 200 is not limited only to the above-described optical type sensor, but may be realized by other types of sensors, for example, a mechanical switch may detect identifiers of the portion 190 to be detected, which are equipped with concave and convex shapes.

In accordance with this modification, the writing process operation can be further firmly carried out by employing the feeding speed V, the transmission power P, and the waiting time t1, which are properly set to the tag attribute parameters and the communication parameters of the RFID circuit element 10A formed in the cartridge 20.

The fourth embodiment and the modifications thereof have exemplified such an example that the printed tag tape 28 during transportation is held within the access area by the feeding guides 83 in connection with the printing operation, and the position detecting operation and the information writing operation are carried out. The present invention is not limited thereto. That is, this printed tag tape 28 is stopped at a predetermined position, and is held by the feeding guides 83, under which the position detecting operation and the information writing operation may be carried out.

In the fourth embodiment and the modifications thereof, the RFID tag information communicating device 2' writes the RFID tag information into the IC circuit part 100 of the RFID circuit element 10A, and further, prints so as to identify this RFID circuit element 10A by the thermal head 41. Alternatively, this printing operation need not be carried out, but only the writing operation of the RFID tag information may be written.

Although not exemplified, the present invention may be modified in various manners without departing from the technical spirit and scope of the present invention.

What is claimed is:
1. An RFID tag information communicating device comprising:
   a device antenna for performing a transmitting/receiving operation in a radio communicating operation between a tag antenna of a specific RFID circuit element and the one antenna among a plurality of RFID circuit elements each having an IC circuit part for storing a predetermined information and said tag antenna connected to said IC circuit part and for transmitting/receiving information;
   a first information transmitting device for transmitting first access information which accesses RFID tag information of said IC circuit part via said device antenna to said tag antenna in a non-contact manner so as to access said RFID tag information of said IC circuit part;
   a first power control portion for setting a magnitude of transmission power from said first information transmitting device in response to said access operation;
   an access information producing device for producing said first access information; and
   a first judging portion for judging as to whether or not an access operation to said IC circuit part can succeed after said access operation has been executed; and wherein:
   said first information transmitting device transmits said first access information produced by said access information producing device via said device antenna to said tag antenna in the non-contact manner so as to access said RFID tag information of said IC circuit part; and
   said first power control portion controls the magnitude of the transmission power from said first information transmitting device in response to the access success/failure judging result obtained in said first judging portion, and
   the RFID tag information communication device further comprises:
   a first information receiving device operated in such a manner that after said first access information has been transmitted by said first information transmitting device, a first reply signal transmitted from said IC circuit part in response to said transmitted first access information is received via said tag antenna by said device antenna in the non-contact manner and the received first response signal is read; and
   an access confirmation instruction transmitting device for transmitting a confirmation instruction signal for confirming as to whether or not an access operation can access via said device antenna to said tag antenna in a non-contact manner after said first access information has been transmitted by said first information transmitting device; and wherein:

said first information receiving device receives information read from said IC circuit part in response to said confirmation instruction signal via said tag antenna by said device antenna in the non-contact manner, and reads the received information; and said first judging portion inputs both the information which is produced by said access information producing device and transmitted by said first information transmitting device, and the information which is read from said IC circuit part and read by said first information receiving device, and judges as to whether or not said access operation can succeed by checking as to whether or not said transmitted information is coincident with said read information; and the RFID tag information communicating device further comprises:

an instruction transmission power control portion for controlling the transmission power from said access confirmation instruction transmitting device.

2. The RFID tag information communicating device according to claim 1 wherein:

said instruction transmission power control portion continuously makes the magnitude of the transmission power from said access confirm instruction transmitting device irrespective of the magnitude of the transmission power from said first information transmitting device.

3. The RFID tag information communicating device according to claim 1 wherein:

said instruction transmission power control portion makes the magnitude of the transmission power from said access confirmation instruction transmitting device substantially equal to the magnitude of the transmission power from said first information transmitting device.

4. An RFID tag information communicating device comprising:

a device antenna for performing a transmitting/receiving operation in a radio communicating operation between a tag antenna of a specific RFID circuit element and the one antenna among a plurality of RFID circuit elements each having an IC circuit part for storing a predetermined information and said tag antenna connected to said IC circuit part and for transmitting/receiving information;

a first information transmitting device for transmitting first access information which accesses RFID tag information of said IC circuit part via said device antenna to said tag antenna in a non-contact manner so as to access said RFID tag information of said IC circuit part;

a first power control portion for setting a magnitude of transmission power from said first information transmitting device in response to said access operation;

an access information producing device for producing said first access information; and a first judging portion for judging as to whether or not an access operation to said IC circuit part can succeed after said access operation has been executed; and wherein:

said first information transmitting device transmits said first access information produced by said access information producing device via said device antenna to said tag antenna in the non-contact manner so as to access said RFID tag information of said IC circuit part; and said first power control portion controls the magnitude of the transmission power from said first information transmitting device in response to the access success/failure judging result obtained in said first judging portion, and the RFID tag information communicating device further comprises:

a first information receiving device operated in such a manner that after said first access information has been transmitted by said first information transmitting device, a first reply signal transmitted from said IC circuit part in response to said transmitted first access information is received via said tag antenna by said device antenna in the non-contact manner and the received first response signal is read; and an access confirmation instruction transmitting device for transmitting a confirmation instruction signal for confirming as to whether or not an access operation can access via said device antenna to said tag antenna in a non-contact manner after said first access information has been transmitted by said first information transmitting device; and wherein:

said first information receiving device receives information read from said IC circuit part in response to said confirmation instruction signal via said tag antenna by said device antenna in the non-contact manner, and reads the received information; and said first judging portion inputs both the information which is produced by said access information producing device and transmitted by said first information transmitting device, and the information which is read from said IC circuit part and read by said first information receiving device, and judges as to whether or not said access operation can succeed by checking as to whether or not said transmitted information is coincident with said read information; and the RFID tag information communicating device further comprises:

a second information transmitting device for transmitting second access information via said device antenna to said tag antenna in the non-contact manner, said second access information confirming as to whether or not an accessible RFID circuit element is present in a communication range;

a second information receiving device for receiving a second reply signal transmitted from said IC circuit part in response to said second access information via said tag antenna by said device antenna in a non-contact manner, and for reading said received second reply signal;

a second judging portion for judging a total number of accessible RFID circuit elements located in the communication range by checking as to whether or not there is such a response signal read by said second information receiving device; and a second power control portion for controlling the magnitude of the transmission power from said second information transmitting device in response to the judgment result by said second judging portion.

5. The RFID tag information communicating device according to claim 4 wherein:

said second power control portion stepwisely increases the transmission power from said second information transmitting device in response to the judgment result made by said second judging portion in the case that said second judging portion judges that a total number of accessible RFID circuit elements is equal to 0 piece, until said second judging portion judges that the total number of the accessible RFID circuit elements is equal to at least 1 piece.

6. The RFID tag information communicating device according to claim 5 wherein:
said second power control portion stepwisely decreases the transmission power from said second information transmitting device in the case that said second judging portion judges that a total number of accessible RFID circuit elements is larger than, or equal to 2 pieces, until said second judging portion judges that the total number of the accessible RFID circuit elements is equal to 1 piece.

7. The RFID tag information communicating device according to claim 5 wherein:
in the case that said second judging portion judges that a total number of accessible RFID circuit elements is equal to 1 piece, said first information transmitting device specifies said tag antenna of the accessible RFID circuit element, and transmits said first access information.

8. The RFID tag information communicating device according to claim 5 wherein:
said first power control portion stepwisely increases transmission power from said first information transmitting device to said tag antenna of said specified one RFID circuit element from such a value which corresponds to the magnitude of the transmission power of said second access information when said second judging portion previously specifies that said RFID circuit element is accessible.

9. The RFID tag information communicating device according to claim 8 wherein:
said first power control portion stepwisely increases transmission power from said first information transmitting device to said tag antenna of said specified one RFID circuit element from such a value which is equal to the magnitude of the transmission power of said second access information when said second judging portion previously specifies that said RFID circuit element is accessible.

10. The RFID tag information communicating device according to claim 8 wherein:
said first power control portion stepwisely increases transmission power from said first information transmitting device to said tag antenna of said specified one RFID circuit element from such a value which is larger than the magnitude of the transmission power of said second access information when said second judging portion previously specifies that said RFID circuit element is accessible.

11. The RFID tag information communicating device according to claim 5 wherein:
said second power control portion stores/learns a magnitude of transmission power of said second information transmitting device in the case that said second judging portion judges that a total number of accessible RFID circuit elements is equal to 1 piece, and further, stepwisely increases the transmission power from said second information transmitting device from such a value which corresponds to said stored/learned transmission power value with respect to an RFID circuit element which is newly derived from an RFID circuit element storage device after said RFID circuit element being judged as the accessible circuit element.

12. The RFID tag information communicating device according to claim 11 wherein:
said second power control portion stepwisely increases the transmission power from said second information transmitting device from said stored/learned transmission power value with respect to said newly derived RFID circuit element.

13. The RFID tag information communicating device according to claim 11 wherein:
said second power control portion stepwisely increases the transmission power from said second information transmitting device from such a value which is smaller than said stored/learned transmission power value by a predetermined value with respect to said newly derived RFID circuit element.

14. The RFID tag information communicating device according to claim 11 wherein:
said second power control portion initializes said stored/learned transmission power value in the case that said RFID circuit element storage device is replaced.

15. The RFID tag information communicating device according to claim 7 wherein:
in the case that said second judging portion judges that a total number of accessible RFID circuit elements is larger than, or equal to 2 pieces, said first information transmitting device specifies said tag antenna of such an RFID circuit element that a signal strength of a reply signal received by said second information receiving device becomes maximum, and transmits thereto said first access information.

16. An RFID tag information communicating device comprising:
a device antenna for performing a transmitting/receiving operation in a radio communicating operation between a tag antenna of a specific RFID circuit element and the one antenna among a plurality of RFID circuit elements each having an IC circuit part for storing a predetermined information and said tag antenna connected to said IC circuit part and for transmitting/receiving information;
a first information transmitting device for transmitting first access information which accesses RFID tag information of said IC circuit part via said device antenna to said tag antenna in a non-contact manner so as to access said RFID tag information of said IC circuit part;
a first power control portion for setting a magnitude of transmission power from a writing information transmitting device of said first information transmitting device in response to said access operation;
a reply signal receiving device for receiving a reply signal from said RFID circuit element in accordance with said first access information sent from said first information transmitting device via said tag antenna by said device antenna in the non-contact manner; and
a third control portion for controlling a time duration defined as after said reply signal has been received by said reply signal receiving device and until said RFID tag information is transmitted by said writing information transmitting device in a variable manner, wherein said first information transmitting device includes:
a position detecting signal transmitting device for transmitting a position detecting signal for detecting a position of said RFID circuit element as said first access information via said device antenna to said tag antenna in the non-contact manner; and
said writing information transmitting device for transmitting RFID tag information to be written into said IC circuit part as said first access information via said device antenna to said tag antenna in the non-contact manner; and
said first power control portion sets a magnitude of transmission power of said writing information transmitting device based upon said reply signal which is returned from said IC circuit part in response to said position detecting signal by said position detecting signal transmitting device.

17. The RFID tag information communicating device according to claim 16, further comprising:
a second control portion for controlling the transmission power by said position detecting signal transmitting device in a variable manner.

18. The RFID tag information communicating device according to claim 16, further comprising:
a fourth control portion for controlling the transmission power by said writing information transmitting device in a variable manner.

19. The RFID tag information communicating device according to claim 16, wherein the RFID tag information communicating device further comprises:
a feeding device configured to feed said RFID circuit element such that said RFID circuit element approaches proximate to said device antenna.

20. The RFID tag information communicating device according to claim 19, further comprising:
a first control portion for controlling a feeding speed of said RFID circuit element by said feeding device.

21. The RFID tag information communicating device according to claim 20 wherein:
said first control portion changes the feeding speed of said feeding device when said RFID circuit element fed by said feeding device reaches a predetermined range proximate to said device antenna.

22. The RFID tag information communicating device according to claim 21 wherein:
said first control portion reduces the feeding speed of said feeding device when said RFID circuit element fed by said feeding device reaches a predetermined range proximate to said device antenna.

23. The RFID tag information communicating device according to claim 20, further comprising:
a judging portion for judging whether or not the writing operation to said IC circuit part is successful after the transmitting operation by said writing information transmitting device has been executed; and wherein:
said first control portion controls in a variable manner any one of said corresponding feeding speed, the transmission power of said position detecting signal, and the transmission power of said writing information, in response to the result of the writing success/failure judgment made by said judging portion.

24. The RFID tag information communicating device according to claim 20, further comprising:
a housing;
a cartridge holder unit provided on said housing, for detachably holding a cartridge equipped with said plurality of RFID circuit elements; and
an information detecting device for detecting parameter information which is formed in said cartridge in correspondence with a tag attribute parameter and a communication parameter of said corresponding RFID circuit elements; and wherein:
said first control portion controls in a variable manner any one of said corresponding feeding speed, the transmission power of said position detecting signal, and the transmission power of said writing information, in response to a detection signal of said information detecting device.

25. An RFID tag information communicating device comprising:
a device antenna for performing a transmitting/receiving operation in a radio communicating operation between a tag antenna of a specific RFID circuit element and the antennae among a plurality of RFID circuit elements each having an IC circuit part for storing a predetermined information and said tag antenna connected to said IC circuit part and for transmitting/receiving information;
a first information transmitting device for transmitting first access information which accesses RFID tag information of said IC circuit part via said device antenna to said tag antenna in a non-contact manner to access said RFID tag information of said IC circuit part;
a first power control portion for setting a magnitude of transmission power from a writing information transmitting device of said first information transmitting device in response to said access operation;
a reply signal receiving device for receiving a reply signal from said RFID circuit element in accordance with said first access information sent from said first information transmitting device via said tag antenna by said device antenna in the non-contact manner; and
a feeding device configured to feed a plurality of said RFID circuit elements sequentially such that said RFID circuit element approaches proximate to said device antenna, wherein
said first information transmitting device includes:
a position detecting signal transmitting device for transmitting a position detecting signal for detecting a position of said RFID circuit element as said first access information via said device antenna to said tag antenna in the non-contact manner; and
said writing information transmitting device for transmitting RFID tag information to be written into said IC circuit part as said first access information via said device antenna to said tag antenna in the non-contact manner; and
said first power control portion sets a magnitude of transmission power of said writing information transmitting device based upon said reply signal which is returned from said IC circuit part in response to said position detecting signal by said position detecting signal transmitting device, and wherein said RFID tag information communication device further comprises:

a judging portion for judging whether or not the writing operation to said IC circuit part is successful after the transmitting operation by said writing information transmitting device has been executed; and a parameter readjust processing portion configured to readjust at least one parameter value set with respect to said first RFID circuit element when said judging portion determines that the writing operation to said IC circuit part of a first RFID circuit element approached close to said device antenna by said feeding device is not successfully executed, such that the readjusted parameter is suitable for a second RFID circuit element fed next to said first RFID circuit element by said feeding device.

26. The RFID tag information communicating device according to claim 25, wherein:

said parameter value comprises at least one of a waiting time duration defined after said reply signal has been received by said reply signal receiving device until said RFID tag information is transmitted by said writing information transmitting device, a retry time during which the writing information is transmitted continuously by said writing information transmitting device, a transmission power of said position detecting signal, and a transmission power of said writing information.

* * * * *